(12) United States Patent
Yamada et al.

(10) Patent No.: US 11,789,213 B2
(45) Date of Patent: *Oct. 17, 2023

(54) END FACE POLISHING DEVICE FOR OPTICAL FIBER FERRULE

(71) Applicant: SEIKOH GIKEN Co., Ltd., Matsudo (JP)

(72) Inventors: Atsushi Yamada, Matsudo (JP); Yuji Shibutani, Matsudo (JP)

(73) Assignee: SEIKOH GIKEN Co., Ltd., Matsudo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/939,962

(22) Filed: Sep. 8, 2022

(65) Prior Publication Data
US 2023/0039931 A1    Feb. 9, 2023

Related U.S. Application Data

(63) Continuation of application No. 16/305,059, filed as application No. PCT/JP2018/003678 on Feb. 2, 2018, now Pat. No. 11,474,305.

(30) Foreign Application Priority Data

Feb. 3, 2017  (JP) ................. 2017-018797

(51) Int. Cl.
*G02B 6/38*    (2006.01)
*B24B 19/22*   (2006.01)
(Continued)

(52) U.S. Cl.
CPC .......... *G02B 6/3863* (2013.01); *B24B 19/226* (2013.01); *B24B 41/06* (2013.01); *B24B 47/12* (2013.01)

(58) Field of Classification Search
CPC ..... B24B 19/226; B24B 41/06; B24B 41/067; B24B 41/005; B24B 13/005; B24B 37/30;
(Continued)

(56) References Cited

U.S. PATENT DOCUMENTS 4,914,867 A * 4/1990 Saito ................ B24B 41/06
                                              451/292
5,038,524 A * 8/1991 Moulin ............. B24B 19/226
                                              451/550
(Continued)

FOREIGN PATENT DOCUMENTS

JP   H06-315860 A   11/1994
JP   2787293 B       8/1998
(Continued)

OTHER PUBLICATIONS

International Search Report for PCT/JP2018/003678 dated Apr. 24, 2018.
PCT written opinion dated Apr. 24, 2018.

*Primary Examiner* — Joel D Crandall
*Assistant Examiner* — Makena S Markman
(74) *Attorney, Agent, or Firm* — Yokoi & Co., U.S.A.; Toshiyuki Yokoi

(57) ABSTRACT

An end face polishing device for optical fiber ferrule for polishing an end face of an optical fiber ferrule by applying a polishing pressure between a polishing plate driven by a polishing drive shaft and an optical fiber ferrule held by a holding portion. The end face polishing device has: a bearing portion for allowing the polishing plate to rotate relatively around the polishing drive shaft and to move relatively to the polishing drive shaft in an axial direction; a polishing plate guide supporting portion for movably supporting the polishing plate on a base portion to apply the polishing pressure to the holding portion by allowing the polishing plate to move in the axial direction; a pressing (Continued)

drive source for outputting a driving force to apply the polishing pressure; and a pressing force transmission mechanism for transmitting the driving force output from the pressing drive source as a pressing force in the axial movement direction of the polishing plate.

16 Claims, 23 Drawing Sheets

(51) Int. Cl.
*B24B 41/06* (2012.01)
*B24B 47/12* (2006.01)

(58) Field of Classification Search
CPC ...... G02B 6/25; G02B 6/3616; G02B 6/3628; G02B 6/3644; G02B 6/3608; G02B 6/38
See application file for complete search history.

(56) References Cited

U.S. PATENT DOCUMENTS

| | | | |
|---|---|---|---|
| 5,503,590 | A | 4/1996 | Saitoh et al. |
| 5,697,832 | A | 12/1997 | Greenlaw et al. |
| 6,077,154 | A | 6/2000 | Takashi et al. |
| 6,565,423 | B1 | 5/2003 | Matsunaga et al. |
| 7,942,726 | B2 | 5/2011 | Ling |
| 11,474,305 | B2 * | 10/2022 | Yamada ............... B24B 47/14 |
| 2014/0287661 | A1 | 9/2014 | Zhang et al. |

FOREIGN PATENT DOCUMENTS

| | | |
|---|---|---|
| JP | H10-235542 A | 9/1998 |
| JP | H11-033891 A | 2/1999 |
| JP | 2000-254851 A | 9/2000 |
| JP | 2002-113647 A | 4/2002 |
| JP | 2003-266288 A | 9/2003 |
| JP | 2004-017221 A | 1/2004 |
| JP | 2005-074521 A | 3/2005 |
| JP | 2006-259629 A | 9/2006 |

* cited by examiner

END FACE POLISHING DEVICE FOR OPTICAL FIBER FERRULE

TECHNICAL FIELD

The present invention relates to an end face polishing device for an optical fiber ferrule used for polishing an end face of the optical fiber ferrule.

BACKGROUND ART

An end face polishing device for an optical fiber ferrule described in Patent Document 1 has been conventionally presented.

The end face polishing device described in Patent Document 1 has a holding portion arranged to face an upper part of a polishing plate. The holding portion has a disk-shape base for holding a ferrule, and the base is movably supported. Since the base is movably supported, the base is pressed and moved downward. The base is pressed and moved by a coil spring installed in a center portion of the base side. The coil spring has a configuration to energize the base downward.

Therefore, the end face of the optical fiber ferrule supported by the base contacts a polishing material such as a polishing film on the polishing plate with the pressing force while receiving the compressive repulsive force generated by the coil spring. Since the end face of the optical fiber ferrule contacts the polishing material with the pressing force, it is possible to apply the polishing pressure to the end face of the optical fiber ferrule with respect to the polishing material. The polishing pressure applied to the polishing material contributes to obtain the optical fiber ferrule excellent in polishing accuracy.

However, in the above-described structure, since the pressing force is applied by merely the coil spring, the base may move by a polishing reaction force and the polishing pressure may be unstable, which may prevent the improvement in the polishing accuracy.

On the other hand, Patent Document 2 discloses a device for grinding and polishing workpieces by setting the processing pressure using an air cylinder.

The polishing device described in Patent Document 2 has a lower platen that is rotatable and an upper platen that is rotatable in the clockwise or counterclockwise directions at variable speeds. The upper platen is rotatable in the clockwise or counterclockwise directions at variable speeds by use of a rotational shaft that is connected to the upper platen and penetrates the shaft center portion of the lower platen. The upper platen is moved upward and downward with respect to the lower platen by the action of air cylinders that are connected to the rotation shaft system.

Accordingly, the upper platen is moved downward via the rotation shaft by the air pressure and applies the predetermined processing pressure to the workpiece between the upper platen and the lower platen.

However, the above-described configuration cannot have been simply be applied to a polishing of optical fiber ferrules since the upper platen rotates.

PRIOR ART DOCUMENTS

Patent Documents

Patent Document 1: Japanese Patent No. 2787293
Patent Document 2: U.S. Pat. No. 5,697,832

DISCLOSURE OF THE INVENTION

Problems to be Solved by the Invention

In the case where the polishing pressure is applied by use of merely the coil spring, the polishing pressure varies, which causes a problem to prevent the improvement in polishing accuracy. In the case of the polishing device capable of applying the predetermined processing pressure, the problem is that the device cannot be simply used for polishing optical fiber ferrules.

Means for Solving the Problem

The present invention relates to an end face polishing device for optical fiber ferrule capable of polishing an end face of an optical fiber ferrule with an adjusted polishing pressure to improve a polishing accuracy. The end face polishing device for optical fiber ferrule applies a polishing pressure between a polishing plate driven by a polishing drive shaft and an optical fiber ferrule held by a holding portion. The end face polishing device for optical fiber ferrule has: a bearing portion for allowing the polishing plate to rotate relatively around the polishing drive shaft and to move relatively to the polishing drive shaft in an axial direction; a polishing plate guide supporting portion movable only in an axial movement direction of the polishing plate for movably supporting the polishing plate on a base portion to apply the polishing pressure to the holding portion by allowing the polishing plate to move in the axial direction; a pressing drive source for adjustably outputting a driving force to apply the polishing pressure; and a pressing force transmission mechanism for transmitting the driving force output from the pressing drive source as a pressing force in the axial movement direction of the polishing plate via the polishing plate guide supporting portion.

The present invention also relates to an end face polishing device for optical fiber ferrule for polishing an end face of an optical fiber ferrule by applying a polishing pressure between a polishing plate driven by a polishing drive shaft and an optical fiber ferrule held by a holding portion, the end face polishing device for optical fiber ferrule has: a holding portion guiding support part for movably supporting the holding portion on a base portion to apply the polishing pressure to the polishing plate by allowing the holding portion to move in an axial direction; a pressing drive source for adjustably outputting a driving force to apply the polishing pressure; a pressing force transmission mechanism for transmitting the driving force output from the pressing drive source as a pressing force in an axial movement direction of the holding portion, wherein the holding portion guiding support part has axial movement guides, one end side of each of the axial movement guides is joined to a post for attaching a polishing jig used for fixing the optical fiber ferrule, and each of the axial movement guides is movably supported by the base portion to serve as a part of the pressing force transmission mechanism for transmitting the pressing force from the other end.

Effects of the Invention

The end face polishing device for optical fiber ferrule according to the present invention has the above-described configuration. Therefore, it is possible to adjust the polishing pressure while the optical fiber ferrule is held by the holding portion. This can be achieved in such a way that a pressing drive force input from the pressing drive source is transmitted to the polishing plate, and the polishing plate is moved in the axial direction with respect to the holding portion. Since the pressing force is adjusted, it is possible to apply the polishing pressure between the polishing plate and the end face of the optical fiber ferrule to polish the end face of the optical fiber ferrule.

Therefore, it is possible to accurately polish the end face of the optical fiber ferrule by use of the adjusted pressing force applied from the polishing plate. This contributes to the improvement of the polishing accuracy.

It is also possible to adjust the polishing pressure while the optical fiber ferrule is held by the holding portion. This can be achieved in such a way that the pressing drive force input from the pressing drive source is transmitted to the holding portion, and the holding portion is moved in the axial direction with respect to the polishing plate. Since the pressing force is adjusted, it is possible to apply the polishing pressure between the polishing plate and the end face of the optical fiber ferrule to polish the end face of the optical fiber ferrule.

Therefore, it is possible to accurately polish the end face of the optical fiber ferrule by use of the adjusted pressing force applied from the polishing plate. This contributes to the improvement of the polishing accuracy.

MODES FOR CARRYING OUT THE INVENTION

Figure 1:
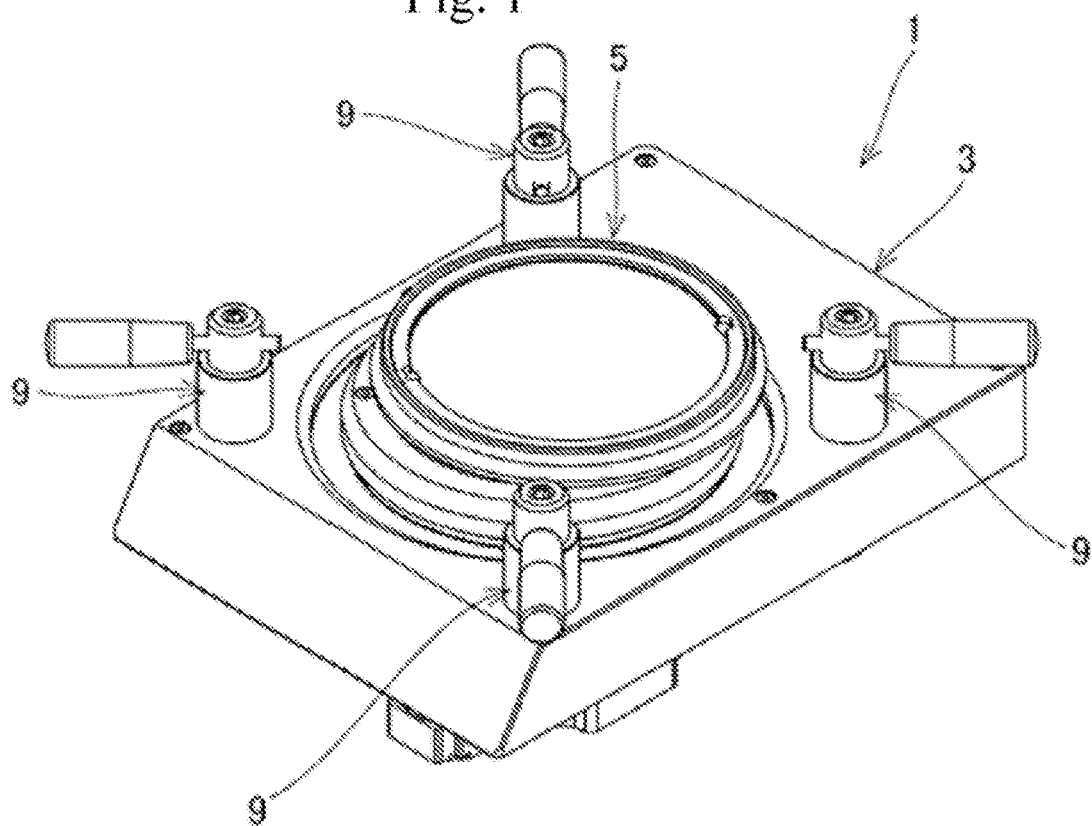
FIG. 1 is a perspective view partly showing an end face polishing device for optical fiber ferrule (Embodiment 1).

The purposes of the present invention are to polish the end face of the optical fiber ferrule by use of an adjusted polishing pressure and to improve a polishing accuracy. The purposes are achieved as follows.

[Invention of Claim 1]

In the invention of claim 1, an end face polishing device for optical fiber ferrule for polishing an end face of an optical fiber ferrule by applying a polishing pressure between a polishing plate driven by a polishing drive shaft and an optical fiber ferrule held by a holding portion, the end face polishing device for optical fiber ferrule comprising: a bearing portion for allowing the polishing plate to rotate relatively around the polishing drive shaft and to move relatively to the polishing drive shaft in an axial direction; a polishing plate guide supporting portion movable only in an axial movement direction of the polishing plate for movably supporting the polishing plate on a base portion to apply the polishing pressure to the holding portion by allowing the polishing plate to move in the axial direction; a pressing drive source for outputting a driving force to apply the polishing pressure; and a pressing force transmission mechanism for transmitting the driving force output from the pressing drive source as a pressing force in the axial movement direction of the polishing plate.

[Invention of Claim 2]

In the invention of claim 2, an end face polishing device for optical fiber ferrule for polishing an end face of an optical fiber ferrule by applying a polishing pressure between a polishing plate driven by a polishing drive shaft and an optical fiber ferrule held by a holding portion, the end face polishing device for optical fiber ferrule comprising: a bearing portion for allowing the polishing plate to rotate relatively around the polishing drive shaft and to move relatively to the polishing drive shaft in an axial direction; a polishing plate guide supporting portion for movably supporting the polishing plate on a base portion to apply the polishing pressure to the holding portion by allowing the polishing plate to move in the axial direction; a pressing drive source for outputting a driving force to apply the polishing pressure; and a pressing force transmission mechanism for transmitting the driving force output from the pressing drive source as a pressing force in an axial movement direction of the polishing plate, wherein a drive source to rotate the polishing drive shaft is fixed on the base portion.

[Invention of Claim 3]

In the invention of claim 3, the end face polishing device for optical fiber ferrule according to claim 1 or 2, wherein the polishing drive shaft includes a revolution drive shaft fitted in a center portion of the polishing plate to make the polishing plate revolve while allowing a self-rotation of the polishing plate, and the bearing portion allows the polishing plate to rotate relatively around the revolution drive shaft and to move relatively to the revolution drive shaft in the axial direction.

[Invention of Claim 4]

In the invention of claim 4, the end face polishing device for optical fiber ferrule according to any one of claims 1 to 3, wherein the polishing plate guide supporting portion has a thrust ring and an axial movement guide, the thrust ring supports an outer peripheral portion of a bottom surface of the polishing plate by a plane surface to serve as a part of the pressing force transmission mechanism for transmitting the pressing force while allowing the polishing plate to be driven, and the axial movement guide is joined to the thrust ring at one end of the axial movement guide and movably supported by the base portion to serve as a part of the pressing force transmission mechanism for transmitting the pressing force from the other end of the axial movement guide.

[Invention of Claim 5]

In the invention of claim 5, the end face polishing device for optical fiber ferrule according to claim 4, wherein the pressing force transmission mechanism includes a direct motion mechanism and a cam mechanism, the direct motion mechanism being supported by the base portion, the direct motion mechanism includes: a direct motion member which performs a linear movement in a direction crossing the axial movement direction by the transmitted pressing force; and a linear motion guide for supporting the direct motion member on the base portion to allow the linear movement, and the cam mechanism performs a cam action to convert and transmit a force generated by the linear movement of the direct motion member to a pressing force in the axial movement direction.

[Invention of Claim 6]

In the invention of claim 6, the end face polishing device for optical fiber ferrule according to claim 5, wherein the cam mechanism includes a cam portion and a cam drive portion which perform the cam action, the cam portion includes an inclined surface provided in a cam structure, the cam structure is joined to the other end of the axial movement guide to convert and transmit the force generated by the linear movement of the direct motion member, and the cam drive portion is supported by the direct motion member and abutted with the inclined surface to transmit the force generated by the linear movement of the direct motion member to the inclined surface.

[Invention of Claim 7]

In the invention of claim 7, the end face polishing device for optical fiber ferrule according to any one of claims 1 to 3, wherein the polishing plate guide supporting portion has a thrust ring and a guide ring, the thrust ring supports an outer peripheral portion of a bottom surface of the polishing plate by a plane surface to serve as a part of the pressing force transmission mechanism for transmit the pressing force while allowing the polishing plate to be driven, the guide ring movably supports the thrust ring on the base portion to transmit the pressing force in the axial movement direction, the pressing force transmission mechanism has a driving ring on the base portion, the driving ring being arranged at a bottom part of the thrust ring so as to be opposed to the thrust ring, the driving ring being driven by the driving force to rotate around a rotational shaft extending along the axial movement direction, and the thrust ring has an end face cam provided between the thrust ring and the driving ring to make the thrust ring move in the axial movement direction for transmitting the pressing force when the driving ring rotates.

[Invention of Claim 8]

In the invention of claim 8, an end face polishing device for optical fiber ferrule for polishing an end face of an optical fiber ferrule by applying a polishing pressure between a polishing plate driven by a polishing drive shaft and an optical fiber ferrule held by a holding portion, comprising: a holding portion guiding support part for movably supporting the holding portion on a base portion to apply the polishing pressure to the polishing plate by allowing the holding portion to move in an axial direction; a pressing drive source for outputting a driving force to apply the polishing pressure; and a pressing force transmission mechanism for transmitting the driving force output from the pressing drive source as a pressing force in an axial movement direction of the holding portion, wherein the holding portion guiding support part has axial movement guides, one end side of each of the axial movement guides is joined to a post for attaching a polishing jig used for fixing the optical fiber ferrule, and each of the axial movement guides is movably supported by the base portion to serve as a part of the pressing force transmission mechanism for transmitting the pressing force from the other end.

[Invention of Claim 9]

In the invention of claim 9, the end face polishing device for optical fiber ferrule according to claim 8, wherein the pressing force transmission mechanism includes a direct motion mechanism and a cam mechanism, the direct motion mechanism being supported by the base portion, the direct motion mechanism includes: a direct motion member which performs a linear movement in a direction crossing the axial movement direction by the transmitted pressing force; and a linear motion guide for supporting the direct motion member on the base portion to allow the linear movement; and the cam mechanism performs a cam action to convert and transmit a force generated by the linear movement of the direct motion member to a pressing force in the axial movement direction.

[Invention of Claim 10]

In the invention of claim 10, the end face polishing device for optical fiber ferrule according to claim 9, wherein the cam mechanism includes a cam portion and a cam drive portion which perform the cam action, the cam portion includes an inclined surface provided in a cam structure, the cam structure is joined to the other end of the axial movement guide to convert and transmit the force generated by the linear movement of the direct motion member, and the cam drive portion is supported by the direct motion member and abutted with the inclined surface to transmit the force generated by the linear movement of the direct motion member to the inclined surface.

[Invention of Claim 11]

In the invention of claim 11, the end face polishing device for optical fiber ferrule according to claim 4 or 8, wherein the pressing force transmission mechanism includes a wedge mechanism which performs a wedge effect for transmitting a force generated by a linear movement as the pressing force in the axial movement direction.

[Invention of Claim 12]

In the invention of claim 12, the end face polishing device for optical fiber ferrule according to any one of claims 4, 8, and 11, wherein the pressing force transmission mechanism has a pressing bottom member on a lower side of the base portion for transmitting the pressing force in the axial movement direction, the pressing bottom member has a flat upward coupling face which extends in a front-and-back direction of the linear movement so as to cross the axial movement direction, and the axial movement guides are fixed directly or indirectly to the upward coupling face.

[Invention of Claim 13]

In the invention of claim 13, the end face polishing device for optical fiber ferrule according to claim 12, wherein the pressing force transmission mechanism has a pressing upper member on an upper side of the base portion for transmitting the pressing force in the axial movement direction, the pressing upper member has a downward coupling face which extends in the front-and-back direction of the linear movement, the axial movement guides are fixed directly or indirectly to the downward coupling face, and the pressing bottom member, the axial movement guides and the pressing upper member form a locked linkage.

[Invention of Claim 14]

In the invention of claim 14, the end face polishing device for optical fiber ferrule according to any one of claims 1 to 13, wherein the pressing drive source is a pressing drive motor or an air cylinder.

[Invention of Claim 15]

In the invention of claim 15, the end face polishing device for optical fiber ferrule according to any one of claims 1 to 4 and 8, wherein, the pressing drive source is an air cylinder, and the pressing force transmission mechanism transmits the pressing force so that an output direction of the air cylinder coincides with the axial movement direction.

[Invention of Claim 16]

In the invention of claim 16, the end face polishing device for optical fiber ferrule according to any one of claims 1 to 15, further comprising: a sensor provided in the pressing force transmission mechanism, the sensor detecting the polishing pressure directly or indirectly, a controller for controlling the pressing drive source to adjust the polishing pressure detected by the sensor to a predetermined polishing pressure.

[Other Configuration 1]

The end face polishing device for optical fiber ferrule according to claim 6, wherein it is possible to adopt a following configuration. Two cam portions and two cam drive portions are provided and the cam portions are separately arranged on left and right sides with respect to the front-and-back direction of the linear movement so that the cam structure is formed into a frame shape. Two or more axial movement guides are separately arranged on the left and right sides and the front and back sides in the front-and-back direction. The direct motion member has two arm portions separately arranged on the outside of the left and right side of the cam structure. The cam drive portions are supported on different arm portions to abut with an inclined surface of different cam portions. The cam drive portions are abutted with the inclined surface between the axial movement guides which are arranged in the front-and-back direction of the linear movement.

[Other Configuration 2]

The end face polishing device for optical fiber ferrule according to the above-described configuration 1, wherein it is possible to adopt a configuration that the axial movement guides are arranged in a balanced manner in the circumferential direction of the thrust ring.

[Other Configuration 3]

The end face polishing device for optical fiber ferrule according to the above-described configuration 2, wherein it is possible to adopt a configuration that the cam drive portions are abutted with the inclined surface in the center position between the axial movement guides which are arranged in the front-and-back direction of the linear movement.

[Other configuration 4]

The end face polishing device for optical fiber ferrule according to any one of the above-described configurations 1 to 3, wherein it is possible to adopt a following configuration. The polishing plate is driven for polishing by revolution and self-rotation of the polishing drive shaft by a revolution motor and a self-rotation motor, the revolution motor and the self-rotation motor are arranged inside the frame shape of the cam structure, and the revolution motor and the self-rotation motor are arranged in the front-and-back direction of the linear movement.

Embodiment 1

[Schematic External Appearance of End Face Polishing Device]

Figure 2:
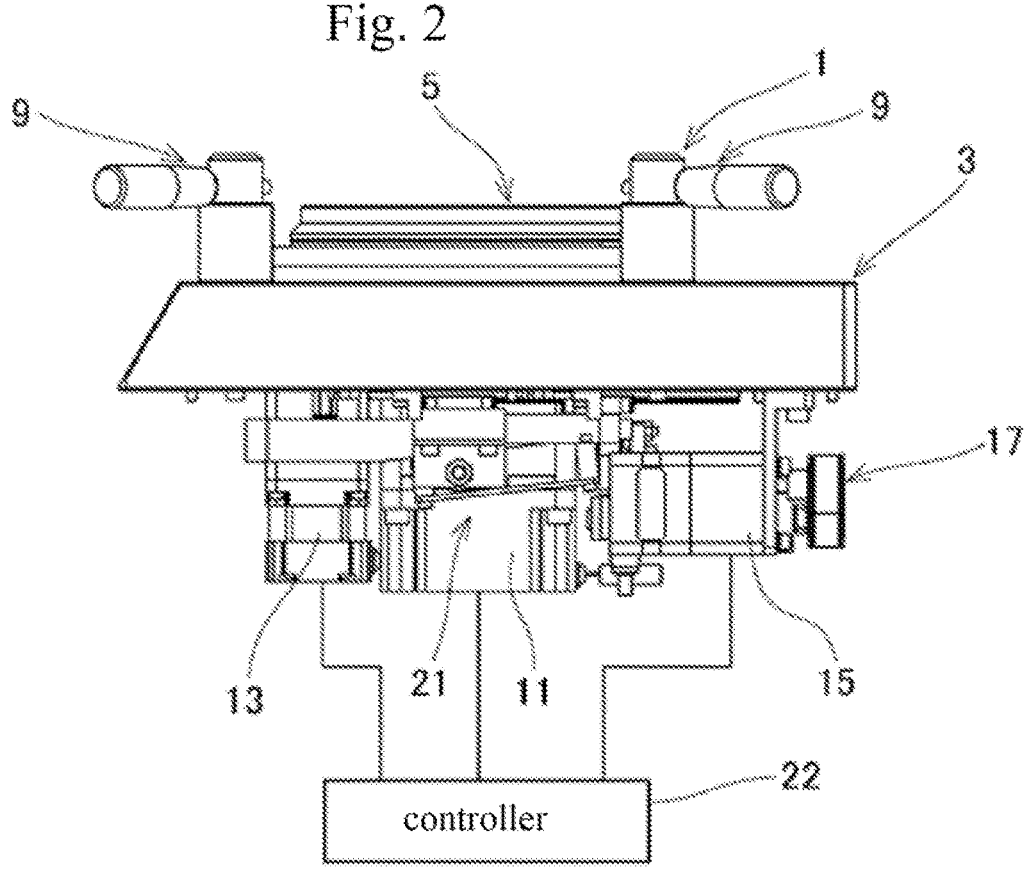
FIG. 2 is a side view partly showing the end face polishing device for optical fiber ferrule (Embodiment 1).
Figure 3:
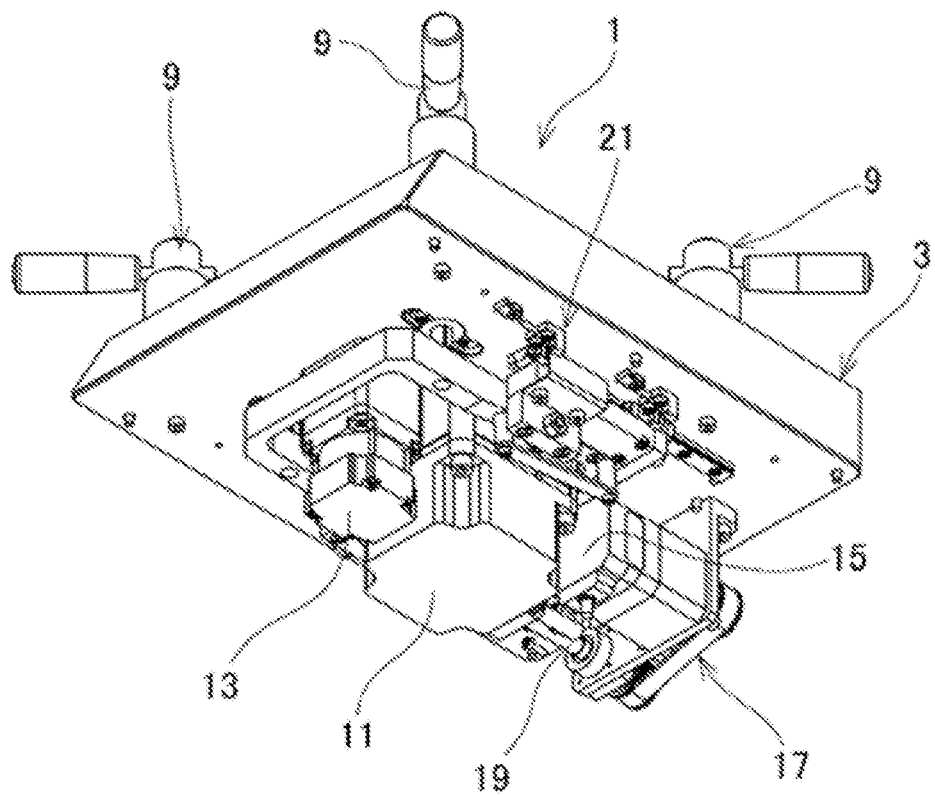
FIG. 3 is a perspective view partly showing a bottom surface of the end face polishing device for optical fiber ferrule seen from one side (Embodiment 1).
Figure 4:
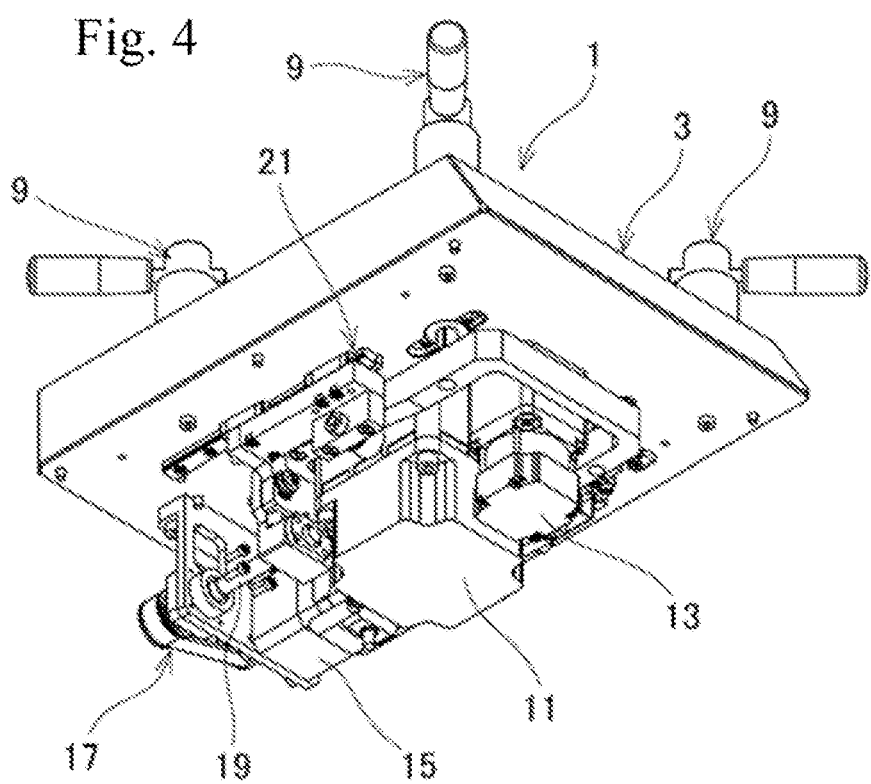
FIG. 4 is a perspective view partly showing the bottom surface of the end face polishing device for optical fiber ferrule seen from the other side (Embodiment 1).

FIG. 1 is a perspective view partly showing an end face polishing device of optical fiber ferrule. FIG. 2 is a side view partly showing the end face polishing device for optical fiber ferrule. FIG. 3 is a perspective view partly showing a bottom surface of the end face polishing device for optical fiber ferrule seen from one side. FIG. 4 is a perspective view partly showing the bottom surface of the end face polishing device for optical fiber ferrule seen from the other side.

Hereinafter, terms of front, back, left and right define positions and directions when the polishing device is seen from a front side, and terms of top and bottom define positions and directions when the polishing plate of the polishing device is arranged to laid upward.

As shown in FIG. 1 to FIG. 4, the end face polishing device 1 for optical fiber ferrule has a base plate 3 as a base portion. The base plate 3 has a polishing plate 5 and posts 9 arranged on a top surface side.

The base plate 3 is a substrate for attaching components and has a rectangle plate shape. However, the shape of the base plate 3 is not limited to the rectangle plate. The shape of the base plate 3 can be changed in accordance with the specification of the device. The polishing plate 5 has a polishing film and a polishing pad on its top surface and driven for the polishing by a polishing drive shaft. The posts 9 forms holding portions to hold optical fiber ferrules in this embodiment as described below.

The end face polishing device 1 applies a polishing pressure between the polishing plate 5 and the optical fiber ferrules held by the posts 9 to polish the end face of optical fiber ferrules using the polishing film and the like provided on the polishing plate 5 which is driven for the polishing.

The base plate 3 has a revolution motor 11 and a self-rotation motor 13 on its bottom surface. The revolution motor 11 and the self-rotation motor 13 serve as drive sources to drive for the polishing with revolution and self-rotation.

The base plate 3 has a pressing drive motor 15 on the bottom surface of the base plate 3 to serve as a pressing drive source. The pressing drive motor 15 adjustably outputs a driving force to apply polishing pressure.

The pressing drive motor 15 may be a stepping motor or a servomotor to control position and load. Alternatively, the pressing drive motor 15 may be any pressing drive sources capable of adjusting output. Any other motors may be used depending on the specification of the device. Examples of the pressing drive source may include an air drive and a hydrostatic drive. The air drive will be explained in details later.

The pressing drive motor 15 has a ball screw 19 on an output side, and the ball screw 19 is connected via an interlocking mechanism 17 such as a timing gear and a timing belt so as to be interlocked with the pressing drive motor 15. The ball screw 19 forms a part of a pressing force transmission mechanism 21. The pressing force transmission mechanism 21 transmits a driving force output from the pressing drive motor 15 as a pressing force in an axial movement direction of the polishing plate 5.

When the pressing force is transmitted by the pressing force transmission mechanism 21, the polishing plate 5 is moved upward against the posts 9. This movement allows the polishing plate 5 to adjust and apply the pressing force to the optical fiber ferrules held by the posts 9. Thus, the polishing pressure to polish the end face of the optical fiber ferrules is adjusted.

The pressing drive motor 15, the revolution motor 11 and the self-rotation motor 13 are connected to a controller 22. The controller 22 may be formed, for example, by a microcomputer which has MPU, ROM, and RAM and the like to control the pressing drive motor 15, the revolution motor 11 and the self-rotation motor 13.

The pressing drive motor 15 adjusts the polishing pressure by a feedback control as described below. The controller controls the number of rotation and the direction of rotation for both the revolution motor 11 and the self-rotation motor 13 using a preinstalled program to make the polishing plate 5 revolve and to self-rotate.

[Structure of Revolution and Self-Rotation]

Figure 5:
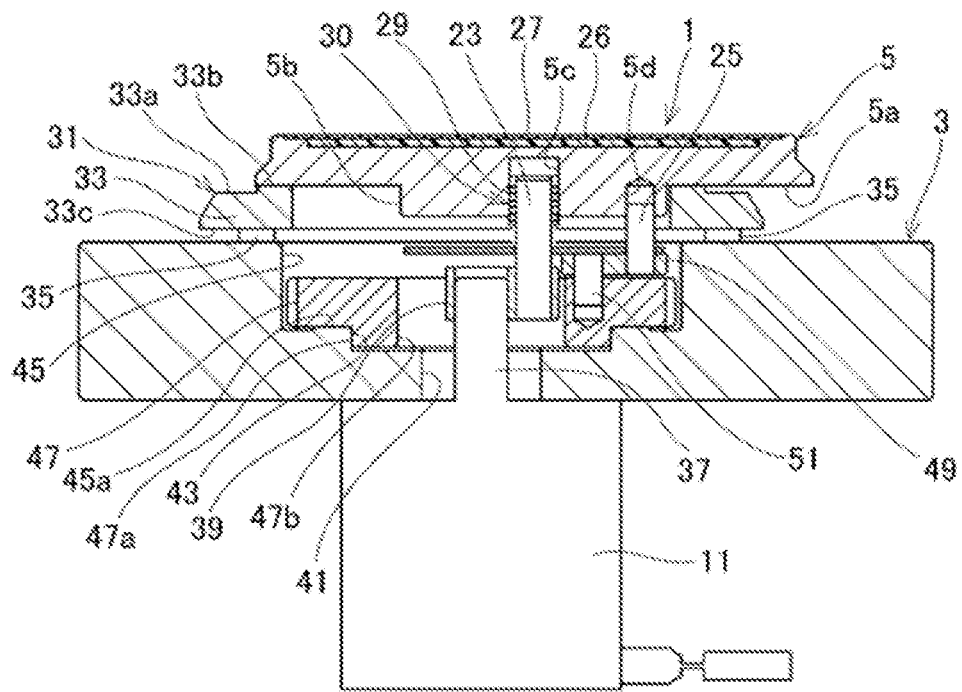
FIG. 5 is a cross-sectional view schematically and partly showing the end face polishing device for optical fiber ferrule seen from a front side (Embodiment 1).
Figure 6:
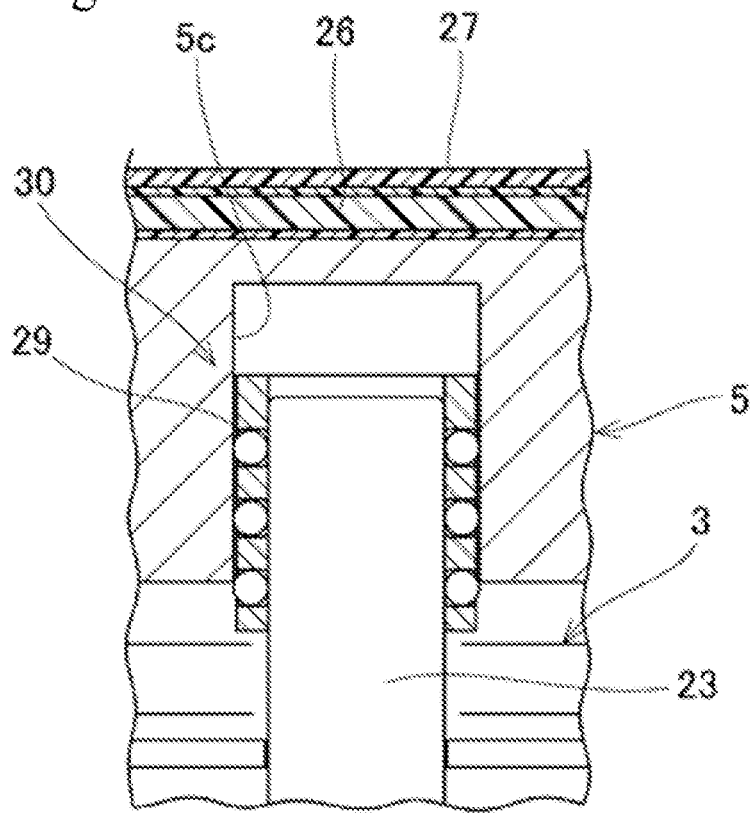
FIG. 6 is an enlarged cross-sectional view partly showing a bearing portion between a revolution drive shaft and a polishing plate (Embodiment 1).
Figure 7:
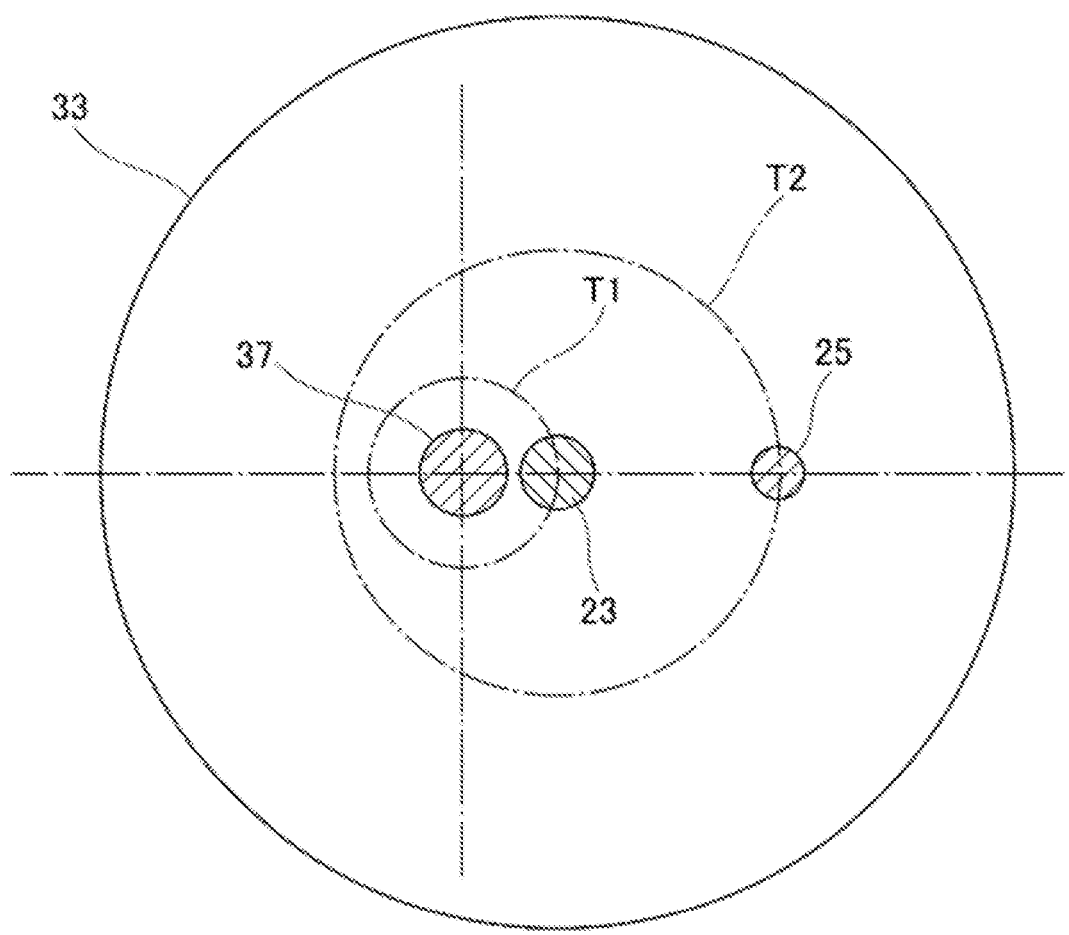
FIG. 7 is a plan view showing a relationship between the revolution drive shaft and a self-rotation drive shaft (Embodiment 1).
Figure 8:
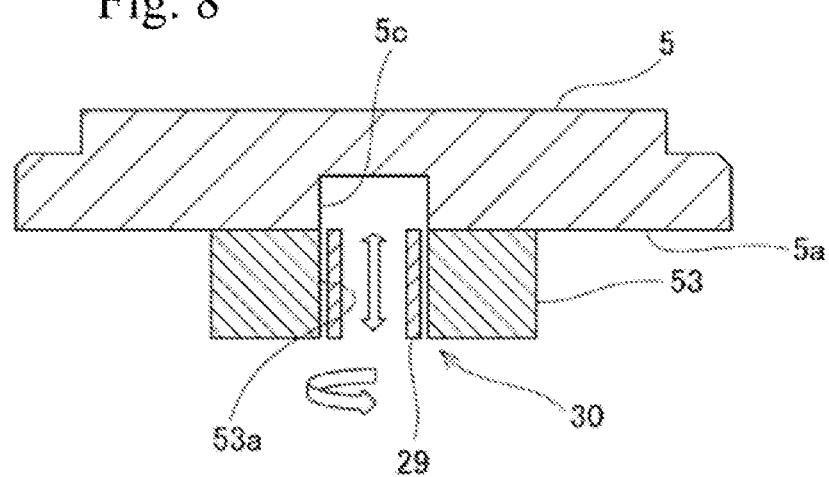
FIG. 8 is a cross-sectional view schematically showing a variation of the bearing portion between the revolution drive shaft and the polishing plate (Embodiment 1).

FIG. 5 is a cross-sectional view schematically and partly showing the end face polishing device for optical fiber ferrule seen from a front side. FIG. 6 is an enlarged cross-sectional view partly showing a bearing portion between a revolution drive shaft and a polishing plate. FIG. 7 is a plan view showing a relationship between a revolution drive shaft and a self-rotation drive shaft. FIG. 8 is a cross-sectional view schematically showing a variation of a bearing portion between a revolution drive shaft and a polishing plate.

As shown in FIG. 5, the polishing plate 5 in this embodiment is driven by a polishing drive shaft for the polishing with revolution and self-rotation.

The polishing drive shaft includes a revolution drive shaft 23 which is fitted into the center portion of the polishing plate 5 to make the polishing plate 5 revolve while allowing a self-rotation of the polishing plate 5. In this embodiment, the revolution drive shaft 23 and the self-rotation drive shaft 25 form the polishing drive shaft. The way to drive the polishing plate 5 is not limited to the revolution and the self-rotation. The polishing drive shaft may be configured by either one of the revolution drive shaft or the self-rotation drive shaft.

The polishing plate 5 is formed into a disc shape. The polishing plate 5 has a flat thrust surface 5a formed in the outer peripheral portion of the bottom surface of the polishing plate 5. The polishing plate 5 has a boss portion 5b which is projected lower than the thrust surface 5a and formed at the center portion of the bottom surface of the polishing plate 5. The polishing plate 5 has a bearing hole 5c which is located at the center portion of the polishing plate 5 and opens toward the bottom surface of the boss portion 5b. The polishing plate 5 has a shaft fitting hole 5d which is located at the off-centered position and opens toward the bottom surface of the boss portion 5b. The polishing plate 5 has a polishing pad 26 and a polishing film 27 attached to the top surface of the polishing plate 5.

(Bearing Portion)

As shown in FIG. 5 and FIG. 6, the upper part of the revolution drive shaft 23 is fitted into the bearing hole 5c of the polishing plate 5 via a ball guide 29. The bearing hole 5c and the ball guide 29 form a bearing portion 30 which is provided between the revolution drive shaft 23, which is the polishing drive shaft, and the polishing plate 5. The bearing portion 30 allows the polishing plate 5 to rotate relatively around the shaft and to move relatively to the shaft in an axial direction. Especially, the use of the ball guide 29 allows the polishing plate 5 to rotate relatively around the shaft and to move relatively to the shaft in the axial direction between the revolution drive shaft 23 and the polishing plate 5.

Examples of the bearing portion, which allows the polishing plate 5 to rotate relatively around the shaft and to move relatively to the shaft in the axial direction, may include a ball bush, an oil-less bush and the like other than the ball guide 29. Alternatively, other bearing portion may be used as long as the bearing portion allows the polishing plate 5 to rotate relatively around the shaft and to move relatively to the shaft in the axial direction even if they do not positively allow the polishing plate 5 to rotate relatively around the shaft and to move relatively to the shaft in the axial direction.

(Polishing Plate Guide Supporting Portion)

As shown in FIG. 5, the outer peripheral portion on the bottom surface of the polishing plate 5 is supported by the base plate 3 via a polishing plate guide supporting portion 31. The polishing plate guide supporting portion 31 is configured to apply the polishing pressure while allowing the polishing plate 5 to move in an axial movement direction with respect to the posts 9, which are the holding portion. Consequently, the polishing plate guide supporting portion 31 movably supports the polishing plate 5 on the base plate 3. The axial movement of the polishing plate 5 is a movement in a top-and-bottom direction (up-down direction) with respect to the base plate 3 and the post 9.

The polishing plate guide supporting portion 31 has a thrust ring 33 and an axial movement guide 35.

The thrust ring 33 serves as a part of the pressing force transmission mechanism 21 for transmitting the pressing force while allowing the polishing plate 5 to be driven for the polishing. Consequently, the thrust ring 33 supports the outer peripheral portion of the bottom surface of the polishing plate 5 by a plane surface. The pressing force transmission mechanism 21 will be further described later.

The thrust ring 33 has a thrust receiving surface 33b on a top surface 33a of the thrust ring 33. The thrust ring 33 has a flat downward coupling face 33c on a bottom surface of the thrust ring 33. The coupling face 33c is configured to extend along the front-and-back direction of the later described linear movement.

The axial movement guide 35 is formed by a splined shaft, and two or more splined shafts are disposed. Hereinafter, the axial movement guide 35 is referred to as the splined shaft 35. In this embodiment, four splined shafts 35 are disposed. However, it is possible to dispose at least two splined shafts 35.

The splined shaft 35 is directly fixed to the downward coupling face 33c of the thrust ring 33. The splined shaft 35 is movably supported by the base plate 3 and is guided in an axial movement direction of the polishing plate 5. The splined shaft 35 is movably supported by the base plate 3 with a spline bush. The spline bush will be described later.

The splined shaft 35 is joined to the thrust ring 33 at one end. The pressing force is transmitted from the other end of the splined shaft 35 in the axial movement direction of the polishing plate 5. That means the splined shaft 35 functions as a part of the pressing force transmission mechanism 21.

In other words, the thrust ring 33 a member to form a part of the pressing force transmission mechanism 21. The thrust ring 33 is arranged above the base plate 3 and has the flat downward coupling face 33c, which extends along the front-and-back direction of the later described linear movement.

Therefore, the outer peripheral portion of the bottom surface of the polishing plate 5 is supported on the thrust receiving surface 33b of the thrust ring 33. When the splined shaft 35 receives a transmitted pressing force and the splined shaft 35 is moved upward from the base plate 3, the polishing plate 5 is moved upward via the thrust ring 33 by the transmitted pressing force. When the splined shaft 35 is moved downward, the polishing plate 5 is also moved downward in conjunction with the splined shaft 35.

The splined shaft 35 is not necessarily fixedly joined to the thrust ring 33, and the use of a simple joining is possible. In the case of using the simple joining, the thrust ring 33 is energized down toward the base plate 3 by a spring and the like. The splined shaft 35 may be formed by a general shaft or the like.

In addition, the splined shaft 35 does not necessarily function as a part of the pressing force transmission mechanism 21, and it is possible to transmit the pressing force to the thrust ring 33 by a pressing rod that is separately provided on the base plate 3.

(Structure of Revolution and Self-Rotation)

The revolution drive shaft 23 is arranged so that its shaft center extends along a top-and-bottom direction of the end face polishing device 1. The top-and-bottom direction of the end face polishing device 1 is a vertical direction when the end face polishing device 1 is placed horizontally. In this case, the shaft center of the revolution drive shaft 23 is arranged along the vertical direction.

The revolution drive shaft 23 is arranged next to the revolution output shaft 37. The bottom part of the revolution drive shaft 23 is connected to the upper part of the revolution output shaft 37 with a connection member 39. A fitting interval between the connection member 39 and the revolution output shaft 37 is fixed with a locking screw, an adhesive material or the like (not illustrated). Therefore, the revolution output shaft 37 cannot be rotated relatively to the connection member 39. In this embodiment, a fitting interval between the connection member 39 and the revolution drive shaft 23 is also fixed with a locking screw, an adhesive material or the like (not illustrated). Therefore, the revolution drive shaft 23 cannot be rotated relatively to the connection member 39.

Note that it is possible to use the ball guide 29 between the connection member 39 and revolution drive shaft 23 instead of using the ball guide 29 between the polishing plate 5 and revolution drive shaft 23. Further, it is possible to adopt a support structure with a ball bearing in either one of fitting intervals between the revolution drive shaft 23 and the polishing plate 5 or between the revolution drive shaft 23 and the connection member 39 while adopting a support structure with the ball guide 29 or the like in the other fitting interval.

The revolution output shaft 37 is an output shaft of the revolution motor 11. Therefore, when the revolution motor 11 starts, the revolution output shaft 37 is rotated. This rotation is transmitted to the revolution drive shaft 23 via the connection member 39. Since the rotation is transmitted, the revolution drive shaft 23 is integrally revolved around the shaft center of the revolution output shaft 37.

The base plate 3 has a shaft insertion hole 41 that is concentrically formed around the revolution output shaft 37 so as to penetrate the base plate 3 from the bottom surface. The shaft insertion hole 41 has a larger diameter than the external diameter of the revolution output shaft 37, and a gap is formed between the shaft insertion hole 41 and the revolution output shaft 37. The revolution output shaft 37 penetrates the shaft insertion hole 41 and projects upward.

Inside the base plate 3, a shaft support hole 43 which communicates with the upper part of the shaft insertion hole 41 is concentrically formed with a larger diameter than the shaft insertion hole 41. Further, in upper part of the base plate 3 in its thickness direction, a self-rotation gear accommodation hole 45 which communicates with the upper part of the shaft support hole 43 is concentrically formed with a larger diameter than the shaft support hole 43. The self-rotation gear accommodation hole 45 penetrates to the top surface of the base plate 3. The self-rotation gear accommodation hole 45 has a gear mounting portion 45a at the bottom.

In the self-rotation gear accommodation hole 45, a self-rotation drive gear 47 is rotatably accommodated. The self-rotation drive gear 47 has a boss portion 47a which projects downward in a center portion of the bottom surface of the rotation drive gear 47. The self-rotation drive gear 47 has a large-diameter hole 47b in the center part of the rotation drive gear 47. The bottom surface of the outer peripheral portion of the self-rotation drive gear 47 is mounted on the gear mounting portion 45a formed in the self-rotation gear accommodation hole 45, and the boss portion 47a fits into the shaft support hole 43. A gap is formed between the boss portion 47a and the bottom portion of the shaft support hole 43. Since the self-rotation drive gear 47 is accommodated as described above, the self-rotation drive gear 47 can be smoothly rotated relatively in the self-rotation gear accommodation hole 45.

In the large-diameter hole 47b formed in the self-rotation drive gear 47, the revolution drive shaft 23 and the connection member 39 are movably disposed together with the revolution output shaft 37.

On the top surface of the self-rotation drive gear 47, a second connection member 49 is fixed with a pin 51. The self-rotation drive shaft 25 is fixed to the second connection member 49. The self-rotation drive shaft 25 is disposed on the outer diameter side of the self-rotation drive gear 47 with respect to the pin 51. The self-rotation drive shaft 25 is fitted to the shaft fitting hole 5d of the polishing plate 5. This fitting enables the self-rotation drive shaft 25 and the shaft fitting hole 5d to rotate relative to each other around the shaft and move relative to each other in the axial direction. It is also possible to enable the relative rotation around the shaft and the relative movement in the axial direction by inserting a bush or the like between the self-rotation drive shaft 25 and the shaft fitting hole 5d. Examples of the bush may include a ball bush and an oil-less bush.

It is also possible to enable the relative rotation around the shaft and the relative movement in the axial direction between the self-rotation drive shaft 25 and the second connection member 49 by fixing the self-rotation drive shaft 25 to the shaft fitting hole 5d. It is also possible to enable the relative rotation around the shaft and the relative movement in the axial direction by adopting a support structure with a ball bearing in either one of fitting intervals between the self-rotation drive shaft 25 and the shaft fitting hole 5d or between the self-rotation drive shaft 25 and the second connection member 49.

As shown in FIG. 5 and FIG. 7, the revolution drive shaft 23 is revolved around the revolution output shaft 37 along a track T1. If the revolution output shaft 37 is stopped relatively, the self-rotation drive shaft 25 is rotated around the revolution drive shaft 23 along the track T2.

With this structure, when the revolution motor 11 starts, the revolution output shaft 37 is rotated. This rotation force is transmitted to the revolution drive shaft 23 via the connection member 39, and the revolution drive shaft 23 integrally revolves around the shaft center of the revolution output shaft 37.

At the same time, when the self-rotation motor 13 starts, the self-rotation drive gear 47 is interlockingly rotated and the self-rotation drive shaft 25 is rotated via the pin 51 and the second connection member 49.

Due to the above described revolution and self-rotation movements driven by the revolution motor 11 and the self-rotation motor 13, the polishing plate 5 is self-rotated while being revolved around the revolution output shaft 37. Accordingly, the polishing plate 5 is driven for the polishing with revolution and self-rotation. Due to the driving for the polishing with revolution and self-rotation, the polishing plate 5 exhibits a hypotrochoid motion, for example.

In such a case, a self-rotation frequency is about 0.5 to 1.2 with respect to a revolution frequency of 100, for example. However, the self-rotation frequency and the revolution frequency may be freely set depending on the specification of the device.

The driving of the polishing plate 5 for the polishing is not limited to the hypotrochoid motion as long as the polishing plate 5 can polish the end face of the optical fiber ferrule held by the post 9. Therefore, the polishing plate 5 may exhibit any other motions including an epitrochoid motion. Similarly, the driving of the polishing plate 5 for the polishing is not limited to the self-revolution and the rotation. The driving for the polishing may be only one of the revolution or the self-rotation. Further, the driving of the polishing plate 5 for the polishing may be a linear movement in the front-and-back direction.

It is also possible to configure a variation of the bearing portion 30 as shown in FIG. 8. In FIG. 5, the polishing plate 5 has the boss portion 5b formed on the bottom surface of the polishing plate 5. On the other hand, in the variation shown in FIG. 8, a connecting boss portion 53 is fixed to the flat bottom surface of the polishing plate 5 by welding, adhesion or the like. The connecting boss portion 53 has a bearing hole 53a which penetrates the connecting boss portion 53 and communicates with the bearing hole 5c. The connecting boss portion 53 is concentrically formed so that the connecting boss portion 53 has the same diameter as the bearing hole 5c. The ball guide 29 between the polishing plate 5 and the revolution drive shaft 23 is mainly supported by the bearing hole 53a.

In this variation, the polishing plate 5 can be formed thinner and this realizes the weight reduction of the polishing plate 5.

[Pressing Force Transmission Mechanism]

Figure 9:
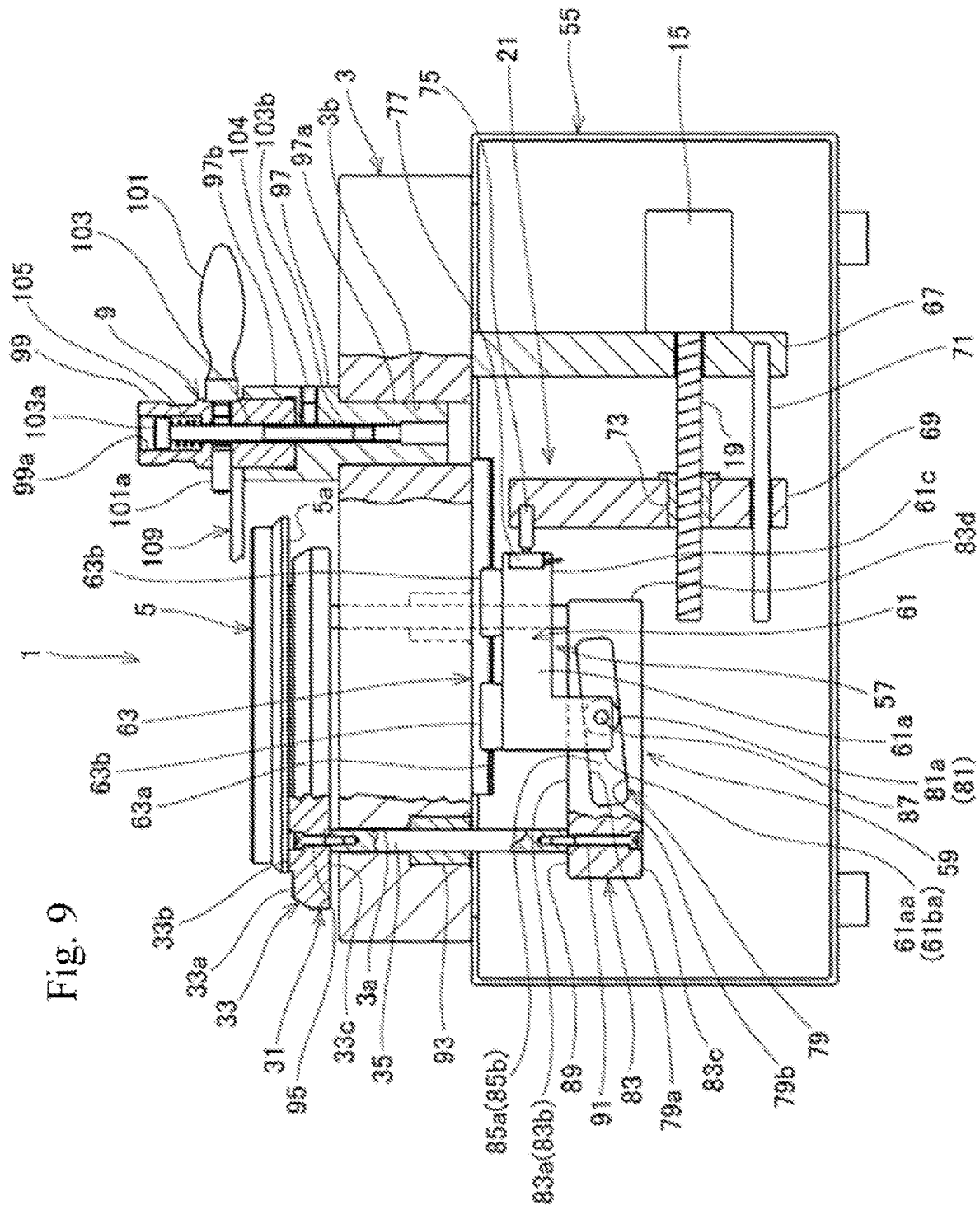
FIG. 9 is a side view schematically showing a part (polishing plate guide supporting portion and pressing force transmission mechanism) of the end face polishing device for optical fiber ferrule, shown partially in cross-section (Embodiment 1).
Figure 10:
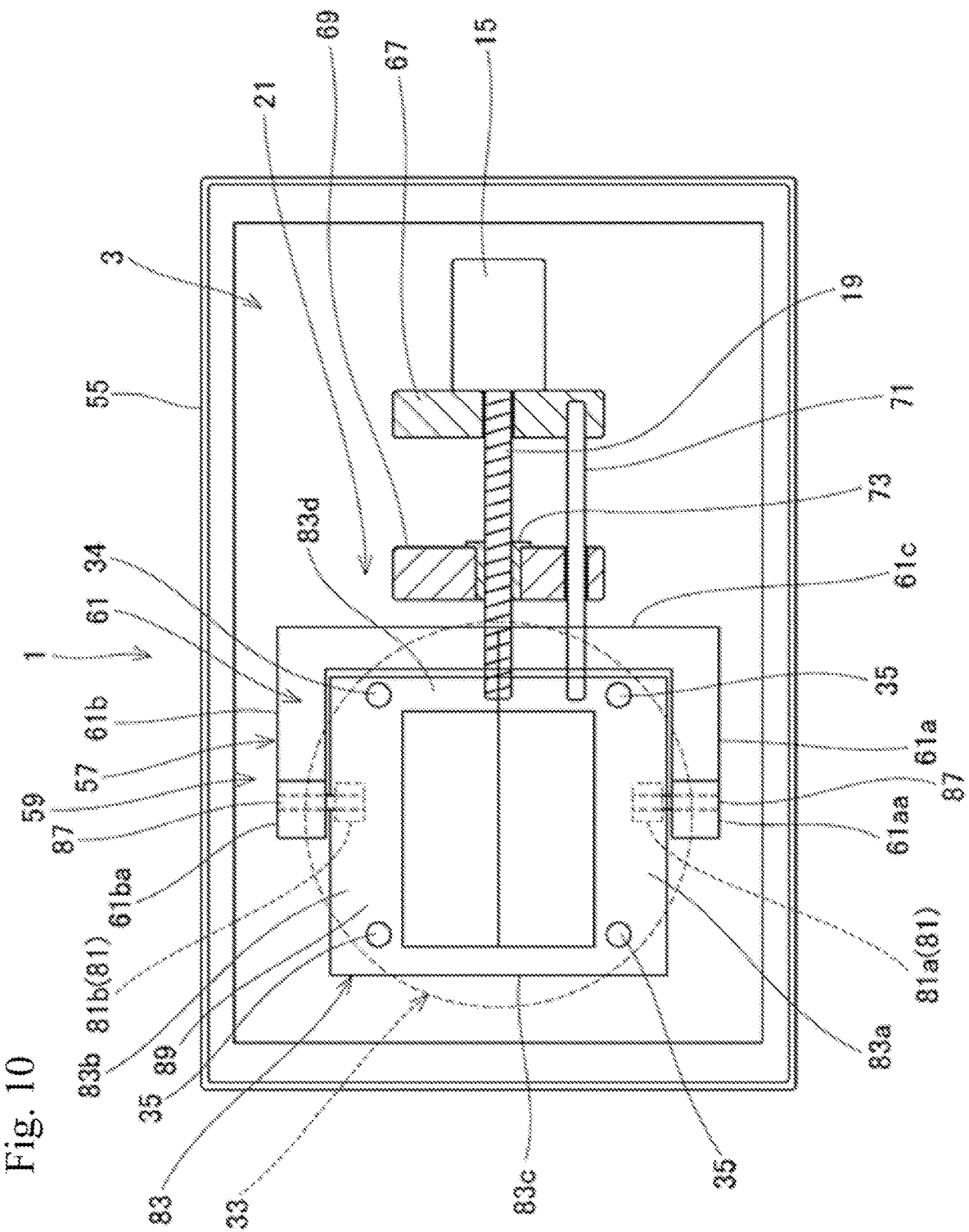
FIG. 10 is a bottom view schematically showing a part (pressing force transmission mechanism) of the end face polishing device for optical fiber ferrule, shown partially in cross-section (Embodiment 1).
Figure 11:
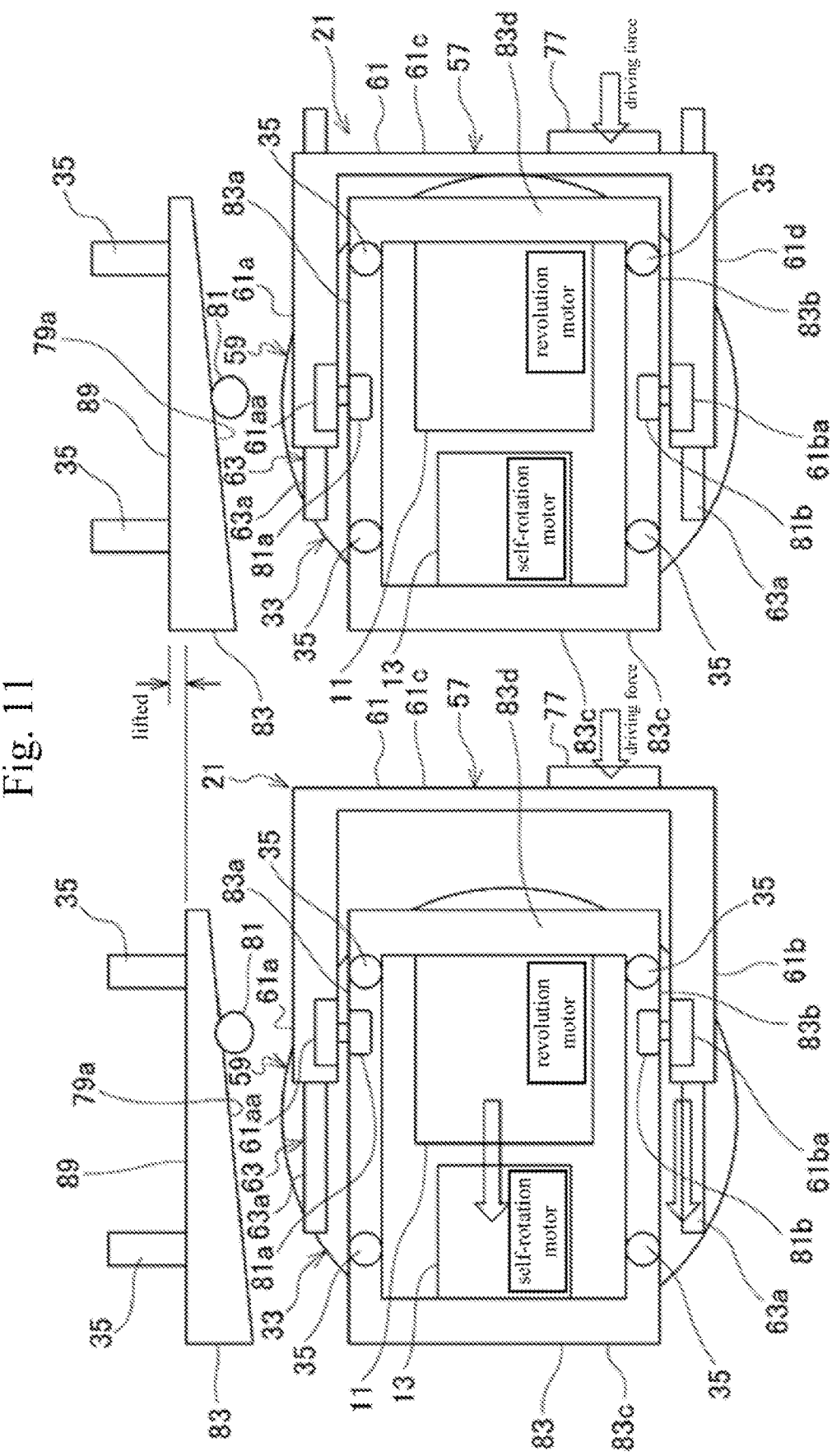
FIG. 11 is an explanatory view showing a layout of the pressing force transmission mechanism (Embodiment 1).
Figure 12:
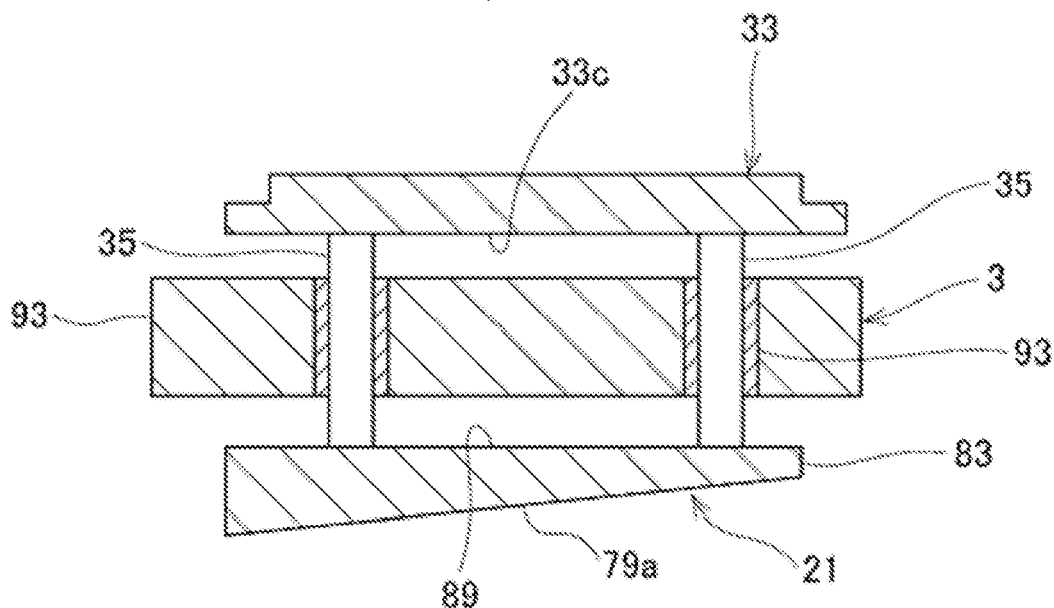
FIG. 12 is a conceptual diagram showing a locked linkage of a cam structure, axial movement guide, and a thrust ring (Embodiment 1).
Figure 13:
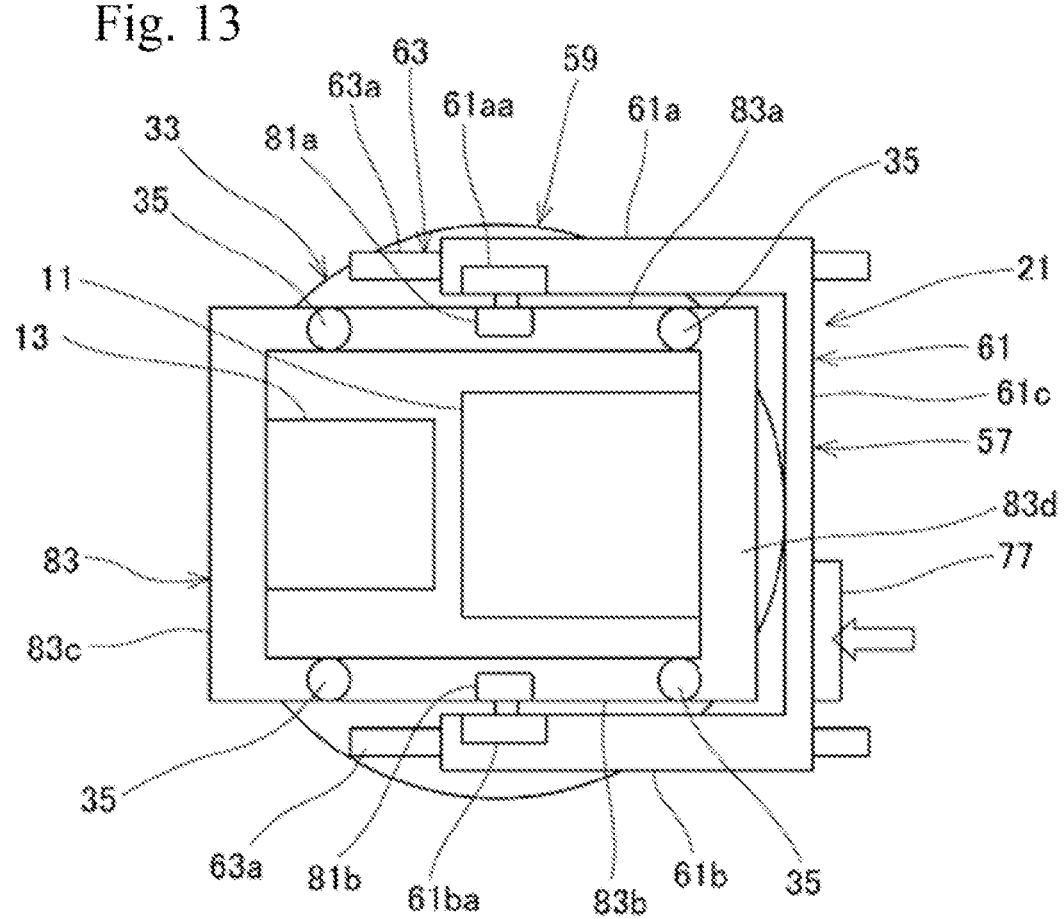
FIG. 13 is an explanatory view showing a lifted state and a layout of the pressing force transmission mechanism (Embodiment 1).

FIG. 9 is a side view schematically showing a part (polishing plate guide supporting portion and pressing force transmission mechanism) of the end face polishing device for optical fiber ferrule, shown partially in cross-section. FIG. 10 is a bottom view schematically showing a part (pressing force transmission mechanism) of the end face polishing device for optical fiber ferrule, shown partially in cross-section. FIG. 11 is an explanatory view showing a lifted state and a layout of the pressing force transmission mechanism. FIG. 12 is a conceptual diagram showing a locked linkage of a cam structure, axial movement guide, and a thrust ring. FIG. 13 is an explanatory view showing a layout of the pressing force transmission mechanism.

As shown in FIG. 9 to FIG. 13, the pressing force transmission mechanism 21 is configured to adjust the polishing pressure. Consequently, the pressing force transmission mechanism 21 transmits the driving force that is output from the pressing drive motor 15 to the polishing plate 5 as a pressing force in the axial movement direction of the polishing plate 5.

The pressing force transmission mechanism 21 is housed in a housing 55 of the device to which the base plate 3 is mounted. The pressing force transmission mechanism 21 includes a direct motion mechanism 57 and a cam mechanism 59. The direct motion mechanism 57 is supported by the base plate 3.

(Direct Motion Mechanism)

The direct motion mechanism 57 includes a direct motion member 61 and a linear motion guide 63.

The direct motion member 61 performs a linear movement in a direction crossing the axial movement direction of the polishing plate 5 by the transmitted pressing force. A front-and-back direction of the linear movement is aligned with the front-and-back direction of the end face polishing device 1. However, the front-and-back direction of the linear movement may be aligned to the left and right direction of the end face polishing device 1 depending on the specification of the end face polishing device 1.

The direct motion member 61 has a pair of arm portions 61a, 61b, and a base portion 61c. The arm portions 61a, 61b are formed integrally with the base portion 61c on the left and right ends of the base portion 61c so that the arm portions 61a, 61b extend along the front-and-back direction of the linear movement. The arm portions 61a, 61b respectively have cam follower support portions 61aa, 61ba at the tip of each arm portion, and each cam follower support portion is projected downward. The cam follower support portions 61aa, 61ba are arranged to face each other so that they are separated on the outer left side and the outer right side of the later-described cam structure.

The linear motion guide 63 is configured to support the direct motion member 61 on the base plate 3 to allow the linear movement of the direct motion member 61. That means the linear motion guide 63 supports the direct motion member 61 on the base plate 3 and allows the linear movement of the direct motion member 61. The linear motion guide 63 may be formed by a ball spline, a ball bush, a linear bush, a cross roller, a linear guide, or the like. In this embodiment, the linear motion guide 63 is configured by a linear guide and the linear guide has guide rails 63a and blocks 63b. The guide rails 63a are fixed to the bottom surface of the base plate 3.

The guide rails 63a extend along the front-and-back direction of the arm portions 61a, 61b so that the left and the right guide rails 63a are parallelly positioned.

The blocks 63b are formed by a hard ball, a holder or the like. Two blocks 63b are provided for each guide rail 63a. However, the number of the blocks 63b is not limited to two and any numbers of the blocks 63b is possible. The blocks 63b provided for each guide rail 63a is attached to each of the left and right arm portions 61a, 61b. In respective arm portions 61a, 61b, one of the blocks 63b is arranged on the top end of respective cam follower support portions 61aa, 61ba and the other is arranged on the base portion 61c side. With this arrangement of the blocks 63b, the moment of each arm portion 61a, 61b generated by a cam action of the cam mechanism 59 is surely transmitted to the guide rails 63a side by the pair of blocks 63b.

Therefore, the direct motion member 61 surely makes the cam mechanism 59 to perform the cam action while performing the linear movement in the front-and-back direction by using the linear motion guide 63.

The pressing drive motor 15 is arranged behind the direct motion mechanism 57 with an interval. The pressing drive motor 15 is fixed to a fixing bracket 67. The fixing bracket 67 is formed into a plate shape and arranged so that the plate surfaces are oriented to the front-and-back direction. The top end of the fixing bracket 67 is fixed to the bottom surface of the base plate 3 so that the fixing bracket 67 is hung down vertically.

A moving bracket 69 is arranged between the fixing bracket 67 and the direct motion mechanism 57. The moving bracket 69 is formed into a plate shape. The moving bracket 69 is arranged parallel to the fixing bracket 67 so that the plate surfaces of the moving bracket 69 are oriented to the front-and-back direction. The bottom end side of the moving bracket 69 is moveably guided by a bracket guide 71. Therefore, the moving bracket 69 can move forward and backward along the bracket guide 71 between the fixing bracket 67 and the direct motion mechanism 57.

The moving bracket 69 has a nut 73 attached above the bracket guide 71 and positioned in the center portion of the bracket guide 71 in the left and right direction. A ball screw 19 is screwed to the nut 73. The ball screw 19 penetrates the fixing bracket 67 with being loosely engaged, and the ball screw 19 is connected to the pressing drive motor 15.

Therefore, when the pressing drive motor 15 starts and rotates, the ball screw 19 is rotated. The moving bracket 69 is moved linearly via the nut 73 between the fixing bracket 67 and the direct motion mechanism 57.

The joining structure between the pressing drive motor 15 and the moving bracket 69 shown in FIG. 9 and FIG. 10 is slightly different from the connection structure shown in FIG. 1 to FIG. 4 in that a timing belt or the like is used in FIG. 1 to FIG. 4. In a schematic configuration shown in FIG. 9 and FIG. 10, the ball screw 19 is directly joined to the pressing drive motor 15. Anyway, a common concept is same as the connection structure of FIG. 1 to FIG. 4 in a point that the rotation force from the pressing drive motor 15 makes the moving bracket 69 move linearly via the ball screw 19. This concept is simplified and shown in FIG. 9, FIG. 10.

The upper part of the moving bracket 69 is interlocked with the side of the base portion 61c of the direct motion member 61 so that the moving bracket 69 can move forward and backward relatively within a predetermined range. In the upper part of the moving bracket 69, a load cell overload protection mechanism 75 is attached. The front edge of the load cell overload protection mechanism 75 abuts with a load cell 77. The load cell 77 is arranged at the back end face of the base portion 61c of the direct motion member 61.

Therefore, when the moving bracket 69 is moved forward, the load cell overload protection mechanism 75 is integrally moved forward. With this movement, the load cell overload protection mechanism 75 presses the load cell 77 to transmit the pressing force to the direct motion member 61. The load cell 77 detects the pressing force transmitted to the direct motion member 61. The detection signal detected by the load cell 77 is input to the controller 22.

In this embodiment, the load cell 77 is provided in the pressing force transmission mechanism 21 and serves as a sensor for indirectly detecting the polishing pressure between the polishing plate 5 and the optical fiber ferrule held by the post 9.

The controller 22 calculates the polishing pressure between the polishing plate 5 and the end face of the optical fiber ferrule by using the input signal. The controller 22 is configured to feedback control the pressing drive motor 15 so that the polishing pressure detected from the calculation becomes a predetermined polishing pressure. This control allows the end face of the optical fiber ferrule to be polished with the predetermined polishing pressure.

The direct motion member 61 is moved along the guide rails 63*a* by the transmitted pressing force. When the direct motion member 61 is moved along the guide rails 63*a*, the blocks 63*b* of the direct motion member 61 is guided and moved by the guide rails 63*a*.

(Cam Mechanism)

As shown in FIG. 9 and FIG. 10, the cam mechanism 59 performs a cam action to convert and transmit the linear movement of the direct motion member 61 to the direction of the axial movement of the polishing plate 5. The axial movement direction corresponds to a top-and-bottom direction in figures.

The cam mechanism 59 includes a cam portion 79 and a cam drive portion 81 which performs the cam action.

The cam portion 79 has inclined surfaces 79*a*, 79*b* that are provided in a cam structure 83. The cam structure 83 is connected to the bottom end (the other end) of the splined shaft 35 in this embodiment, and the cam structure 83 performs the cam action to convert and transmit the pressing force.

Cam followers 81*a*, 81*b* of the cam drive portions 81 are supported by the direct motion member 61 and abut with the inclined surfaces 79*a*, 79*b*. The cam followers 81*a*, 81*b* transmit the force produced by the linear movement of the cam drive portion 81 interlocked with the direct motion member 61 to the inclined surfaces 79*a*, 79*b*. This transmission causes the cam action.

The inclined surfaces 79*a*, 79*b* of the cam portion 79 and the cam followers 81*a*, 81*b* of the cam drive portion 81 are provided on both left and right sides forming a pair on each side.

The cam structure 83 is formed into a frame shape. A pair of inclined surfaces 79*a*, 79*b* are arranged on both left and right sides of the cam structure 83 with respect to the front-and-back direction of the linear movement direction of the direct motion member 61. In this embodiment, the cam structure 83 has left and right portions 83*a*, 83*b* and front and back portions 83*c*, 83*d*. These portions are integrally formed into a rectangle frame shape in a planar view. The left and right portions 83*a*, 83*b* are arranged in parallel to each other, and extends in the front-and-back direction. As described above, the inclined surfaces 79*a*, 79*b* are formed on the left and right portions 83*a*, 83*b*. The front and back portions 83*c*, 83*d* are arranged in parallel to each other, and extends in the left and right direction.

The cam structure 83 is arranged so that the intersection of the diagonals of the rectangular outline corresponds to the center of the circular outline of the thrust ring 33 as seen from a plan view. With this arrangement, the left and right portions 83*a*, 83*b* of the cam structure 83 are positioned on the inside of the left and right arm portions 61*a*, 61*b* of the direct motion member 61. Therefore, the left and right arm portions 61*a*, 61*b* are positioned on the left and right outside of the cam structure 83. The cam follower support portions 61*aa*, 61*ba* of the left and right arm portions 61*a*, 61*b* are arranged to face each other and positioned on the left and right outside of the cam structure 83 while forming a small gap at the inside of respective left and right portions 83*a*, 83*b*.

The inclined surfaces 79*a*, 79*b* of the cam portions 79 are located in an intermediate location in the vertical direction of respective left and light portions 83*a*, 83*b* of the cam structure 83. The inclined surfaces 79*a*, 79*b* are arranged and set in respective openings 85*a*, 85*b* which are formed into a long hole so as to incline downwardly toward the front along the left and right portions 83*a*, 83*b*. The inclined surfaces 79*a*, 79*b* are disposed in parallel so as to be opposed each other, and the inclined surfaces 79*a*, 79*b* incline downwardly toward the front along the inclination of openings 85*a*, 85*b*. Therefore, in this embodiment, the cam portion 79 is formed into a frame cam shape having the upper and lower inclined surfaces 79*a*, 79*b* in respective openings 85*a*, 85*b*.

The cam drive portion 81 is formed by a pair of cam followers 81*a*, 81*b*. The cam followers 81*a*, 81*b* are formed by rollers. The cam followers 81*a*, 81*b* are respectively provided to the left and right arm portions 61*a*, 61*b*, and respectively supported on the support cam follower support portions 61*aa*, 61*ba* by pins 87 so as to be rotatable. The diameter of the roller which forms respective cam followers 81*a*, 81*b* is approximately the same as the vertical interval between the inclined surfaces 79*a* and 79*b*. Since the diameter is set as such, the cam followers 81*a*, 81*b* are capable of rolling between the inclined surfaces 79*a* and 79*b*.

Generally, the cam follower indicates a follower. However, in this embodiment, the cam follower is used as a driving member instead of the follower. In this case, the cam portion 79 serves as the follower. The cam drive portion 81 may be anything which drives the cam portion 79 to perform a cam action by conversion and transmission. Consequently, the present invention may include variants other than the concept of the cam follower described in this embodiment. The variants may not necessarily include the cam action, and any other mode that does not include the cam mechanism may be used. These variants will be described later.

In response to the linear movement of the direct motion member 61 toward the front, the cam followers 81*a*, 81*b* respectively push up upper inclined surfaces 79*a* in each opening 85*a*, 85*b* while rolling toward the front. In response to the linear movement of the direct motion member 61 toward the back, followers 81*a* and 81*b* respectively push down the lower inclined surfaces 79*b* in each opening 85*a*, 85*b* while rolling toward the back.

That is, the force produced by the linear movement of the direct motion member 61 in the front-and-back direction is converted to the pressing force in the top-and-bottom direction and transmitted to the axial movement of the polishing plate 5. Thus, the cam action is performed. This cam action enables the cam structure 83 to be moved and adjusted in the top-and-bottom direction.

(Abutment of Cam Follower Between Splined Shafts)

As shown in FIG. 9 to FIG. 11, the upper part of the cam structure 83 has a flat coupling face 89 which is laid upward and extending along the front-and-back direction of the linear movement of the direct motion member 61.

The above-described four splined shafts 35 are joined and fixed to the coupling face 89 which is laid-upward. The flat bottom face of the splined shaft 35 is abutted and joined to the coupling face 89 and fastened by a bolt 91.

The splined shaft 35 and the cam structure 83 are not necessarily fixed. The spline shaft 35 may be configured to be simply abutted with the cam structure 83. When the splined shaft is simply abutted, the splined shaft 35 is preferably energized downward from the base plate 3 by spring and the like as described above.

The splined shaft 35 is joined to the cam structure 83 so that four splined shafts 35 are arranged symmetrically in the left and right direction and the front-and-back direction of the linear movement direction. The four splined shafts 35 are arranged in each corner side of the coupling face 89 of the cam structure 83 as shown in a plane view of FIG. 10.

In the arrangement of the splined shafts 35 with respect to the cam structure 83, the pair of cam followers 81a, 81b and the inclined surfaces 79a, 79b abut with each other at a position between the splined shafts 35 disposed in the front-and-back direction of the linear movement of the direct motion member 61.

In FIG. 11, the illustration on the left shows the cam structure 83 before it is lifted, and the illustration on the right shows the cam structure 83 after it is lifted.

As shown in FIG. 11, the abutment of the pair of cam followers 81a, 81b with inclined surfaces 79a, 79b is maintained at any positions between the splined shafts 35 disposed in the front-and-back direction of the linear movement of the direct motion member 61.

Therefore, with the cam action performed by the cam mechanism 59, the force produced by the linear movement of the direct motion member 61 is converted to the pressing force in the top-and-bottom direction and the force is surely transmitted to the four splined shafts 35.

(Thrust Ring Input Balance)

As shown in FIG. 9 to FIG. 13, the four splined shafts 35 penetrate vertically through guiding holes 3a of the base plate 3. At the lower end face portion of the guiding holes 3a, a spline bush 93 is attached to each splined shaft 35. The splined shaft 35 penetrating through the guiding hole 3a is fitted to the spline bush 93. The spline bush 93 smoothly guides the splined shaft 35 along the vertical pressing force transmission direction.

The splined shafts 35 are joined and fixed to the inside of the ring-formed flat coupling face 33c of the thrust ring 33 so that four splined shafts 35 are positioned with equal intervals of 90 degrees in a circumferential direction. The splined shaft 35 is fixed in such a way that the flat upper end of the splined shaft 35 is abutted with (in contact with) the coupling face 33c and fastened by a bolt 95.

Therefore, the four splined shafts 35 are fixed in a balanced manner in the circumferential direction of the thrust ring 33.

This balanced arrangement enables the pressing force transmitted by the splined shaft 35 to act on the thrust ring 33 with good load balance. Therefore, the polishing plate 5 can be surely pushed upward with good load balance by the thrust ring 33 while being supported by the plane surface of the thrust ring 33.

(Maximum Load Balance Input)

As shown in FIG. 11, while the four splined shafts 35 are arranged in the balanced manner with respect to the thrust ring 33, the pair of cam followers 81a, 81b is arranged in the center position between the splined shafts 35 in the front-and-back direction of the linear movement of the direct motion member 61 to provide the maximum pressing force against the polishing plate 5 by the cam action. In other words, the center position between the splined shafts 35 in the front-and-back direction serves as a balance position to transmit the pressing force to the thrust ring 33 via the splined shaft 35. Since this balance position is aligned with the center position of the cam followers 81a, 81b, the maximum load can be transmitted.

According to the above-described configuration, the pressing force with the maximum load in the axial movement direction transmitted from the cam follower 81a, 81b via the inclined surface 79a is equally distributed and transmitted from the flat coupling face 89 of the cam structure 83 to the four splined shafts 35.

The pressing force which is equally distributed and transmitted to the four splined shafts 35 is distributed and transmitted from the four splined shafts 35 to four equally placed positions on the outer peripheral portion of the thrust ring 33.

(Locked Linkage)

As described above, the bottom ends of the four splined shafts 35 are abutted and joined with the flat coupling face 89 of the cam structure 83 and fastened and fixed with the bolt 91 as shown in FIG. 12 and FIG. 13.

With such fixing of the splined shaft, the load can be transmitted from the coupling face 89 to the bottom end of the four splined shafts 35 substantially under the same conditions.

Furthermore, the top ends of the four splined shafts 35 are abutted and connected with the flat coupling face 33c of the thrust ring 33 and fastened and fixed with the bolt 95.

With such fixing, the four splined shafts 35, the cam structure 83, and the thrust ring 33 form a locked linkage. The locked linkage allows the load in the top-and-bottom direction received by the cam structure 83 to be transmitted from the coupling face 89 to the polishing plate 5 with rigidity via the four splined shafts 35 and thrust ring 33.

In this case, the cam structure 83 serves as a pressing bottom member of the pressing force transmission mechanism 21 in this embodiment. That means, as described above, the pressing force transmission mechanism 21 has the cam structure 83 for transmitting the pressing force in the axial movement direction on the lower side of the base plate 3.

The thrust ring 33 serves as a pressing upper member of the pressing force transmission mechanism 21 in this embodiment. That means, as described above, the pressing force transmission mechanism 21 has the thrust ring 33 for transmitting the pressing force in the axial movement direction on the upper side of the base plate 3.

The splined shaft 35 may be directly joined to the cam structure 83 and thrust ring 33 as described in this embodiment, and the splined shaft 35 may be indirectly joined via other members. It is also possible to join a pressing bottom member and a pressing upper member, which are formed separately from the cam structure 83 and the thrust ring 33, to the splined shaft 35 to form the locked linkage, and join the pressing bottom member and the pressing upper member to the cam structure 83 and the thrust ring 33 in the axial movement direction.

(Arrangement of Revolution Motor and Self-Rotation Motor)

Although a revolution motor and a self-rotation motor are omitted in FIG. 9 and FIG. 10, they are illustrated in FIG. 1 to FIG. 4 and further in FIG. 11 and FIG. 13. The revolution motor 11 and the self-rotation motor 13 are drive sources which drive the polishing plate 5 for the polishing. The revolution motor 11 and the self-rotation motor 13 are fixed to the base plate 3 so as to be arranged in the front-and-back direction of the linear movement of the direct motion member 61 inside the rectangle frame of the cam structure 83.

The revolution motor 11 is relatively large and arranged at a position near the center portion of the base plate 3 as seen from the plan view. The self-rotation motor 13 which is relatively small is arranged on the front side of the base plate 3 as seen from the plan view. The self-rotation motor 13 and the revolution motor 11 are disposed evenly in the left and right direction so that the center line of the thrust ring 33 in the front-and-back direction aligns with the center of the rotation motor 13 and the revolution motor 11.

[Holding Portion and Polishing Jig]

Figure 14:
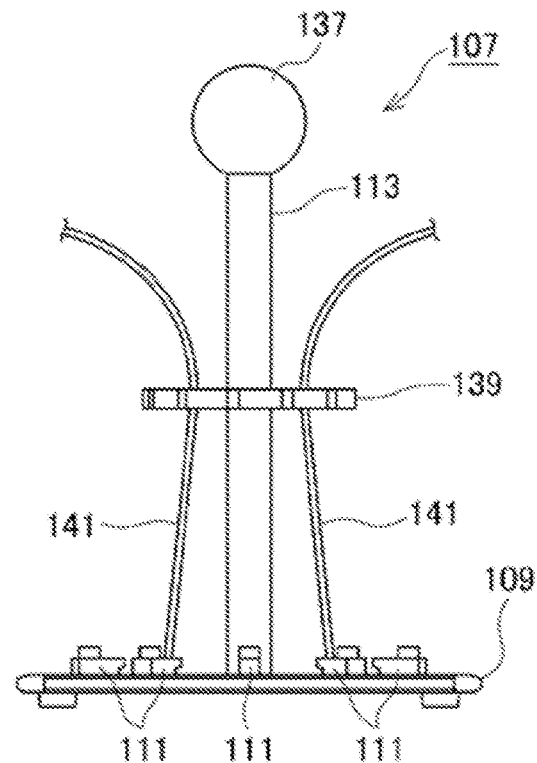
FIG. 14 is a front view of a polishing jig used in the end face polishing device for optical fiber ferrule (Embodiment 1).
Figure 15A:
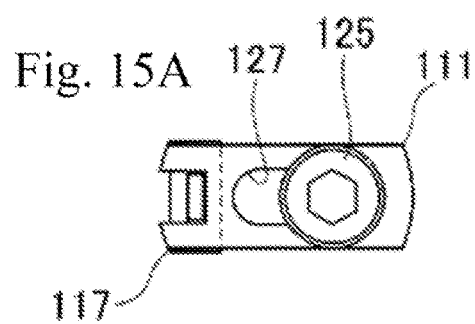
FIG. 15A is an enlarged top view showing a state in which a pressing member of the polishing jig is in a locked position (Embodiment 1).
Figure 15B:
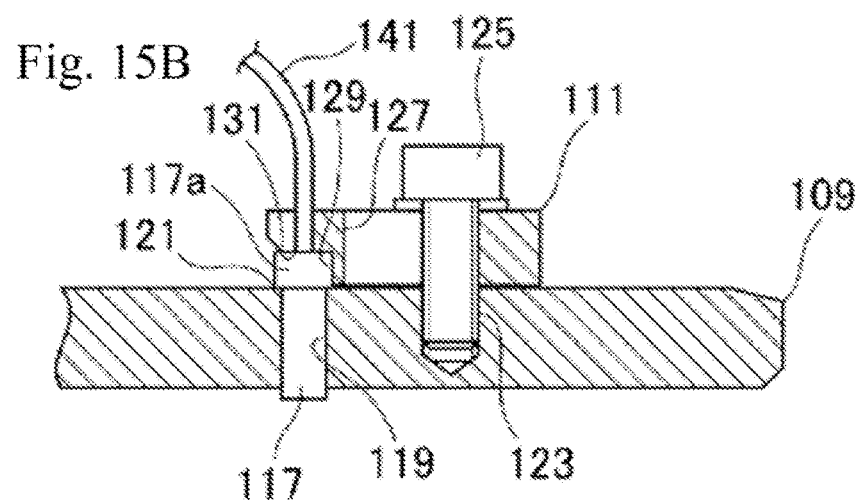
FIG. 15B is a cross-sectional view showing a state in which the pressing member of the polishing jig is in the locked position (Embodiment 1).
Figure 16:
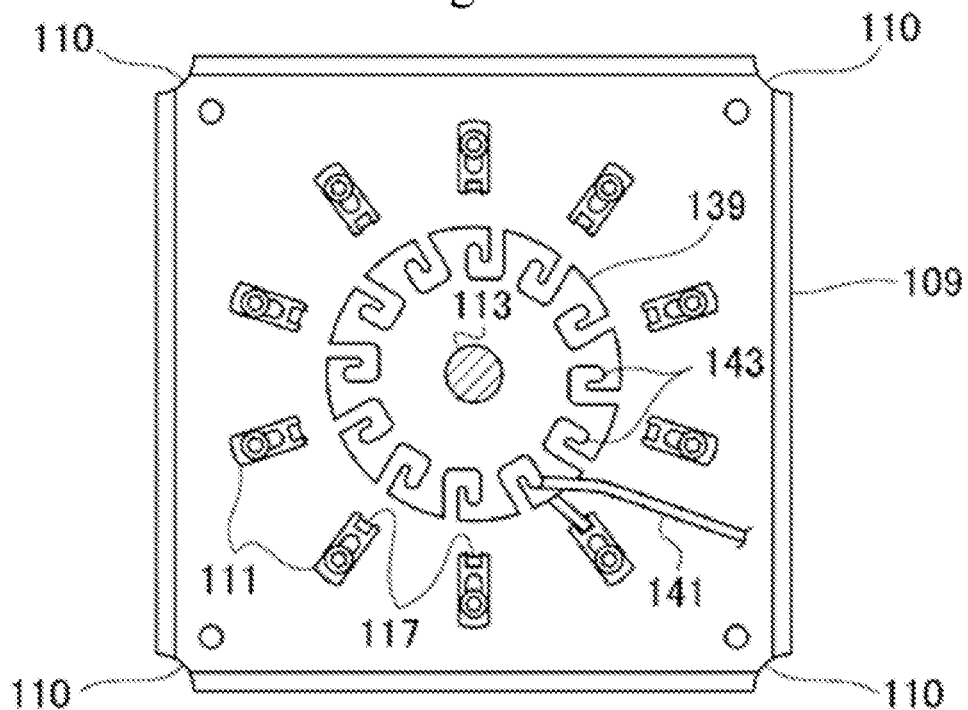
FIG. 16 is a plan view of the polishing jig (Embodiment 1).
Figure 17:
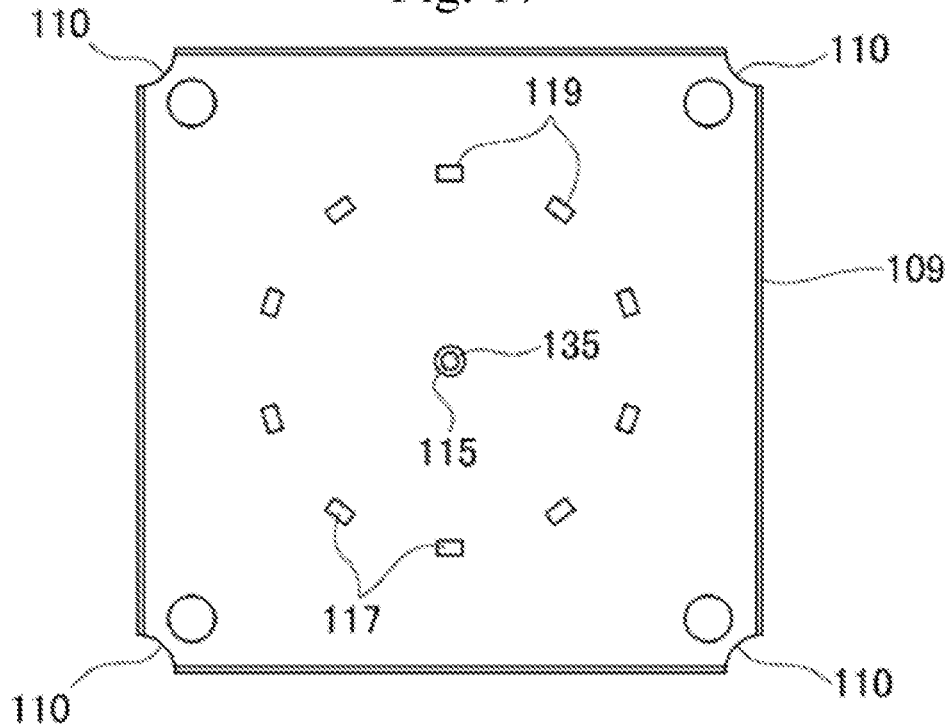
FIG. 17 is a bottom view of the polishing jig (Embodiment 1).
Figure 18:
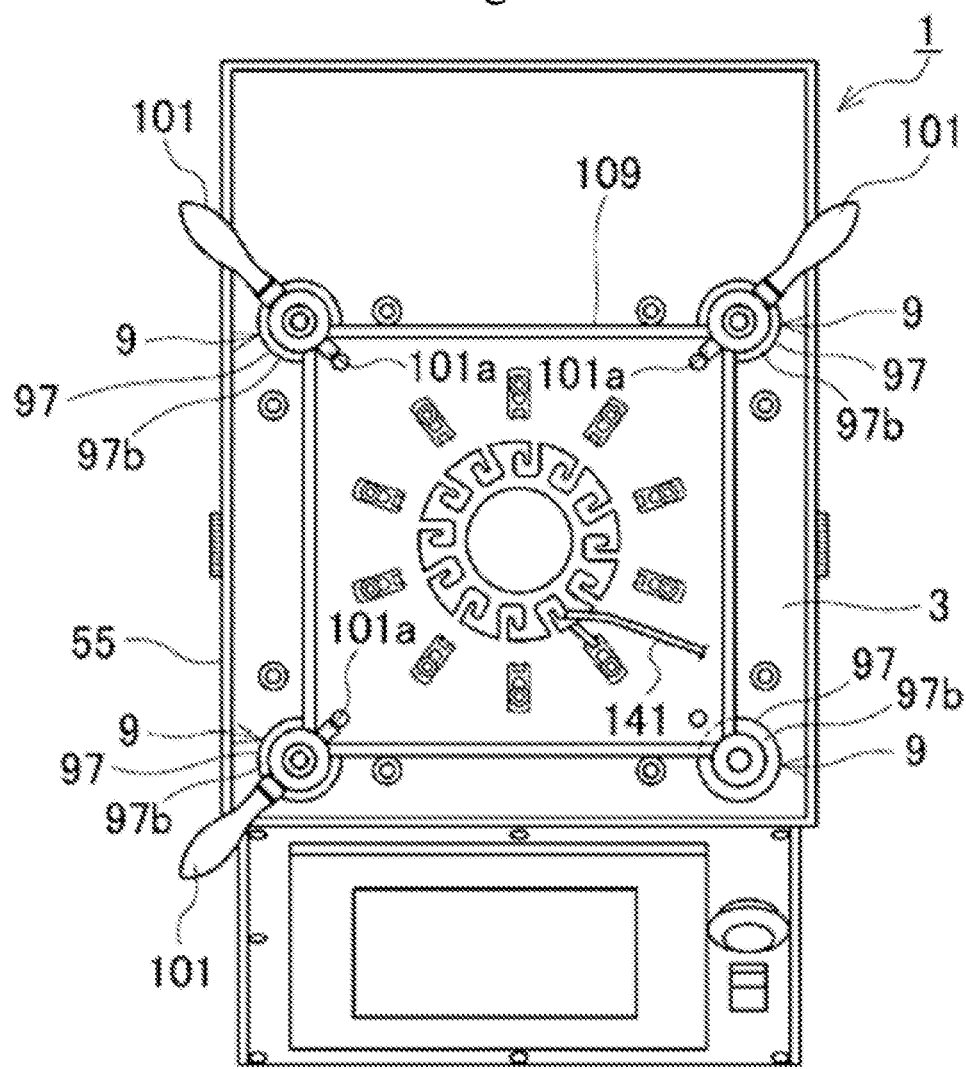
FIG. 18 is a plan view showing a state in which the polishing jig is attached to the end face polishing device for optical fiber ferrule (Embodiment 1).
Figure 19:
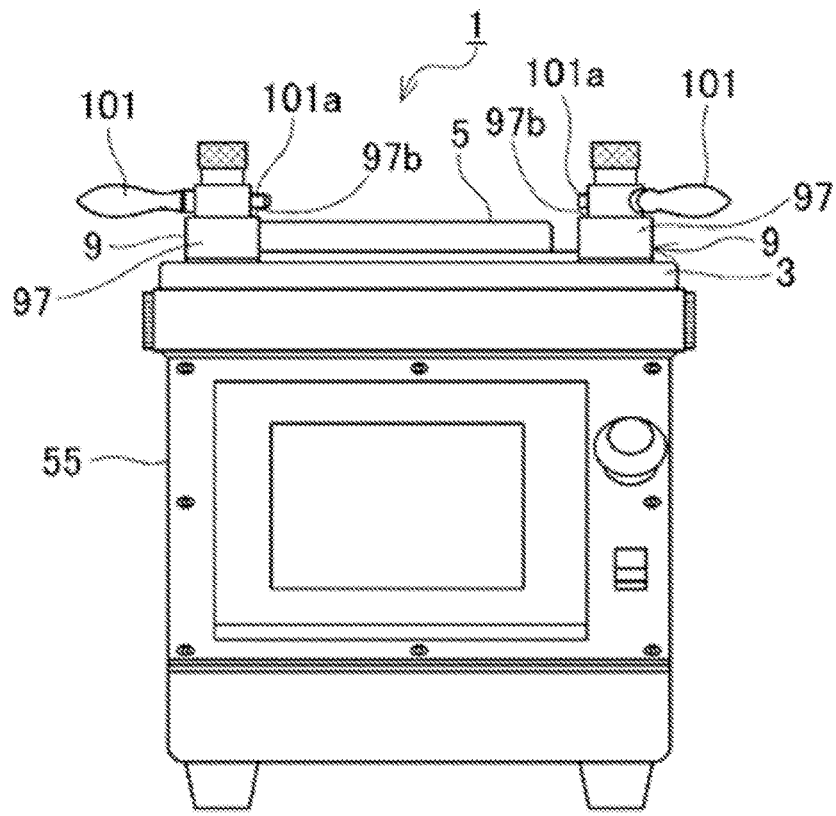
FIG. 19 is a front view showing a state in which the polishing jig is not attached to the end face polishing device for optical fiber ferrule (Embodiment 1).
Figure 20:
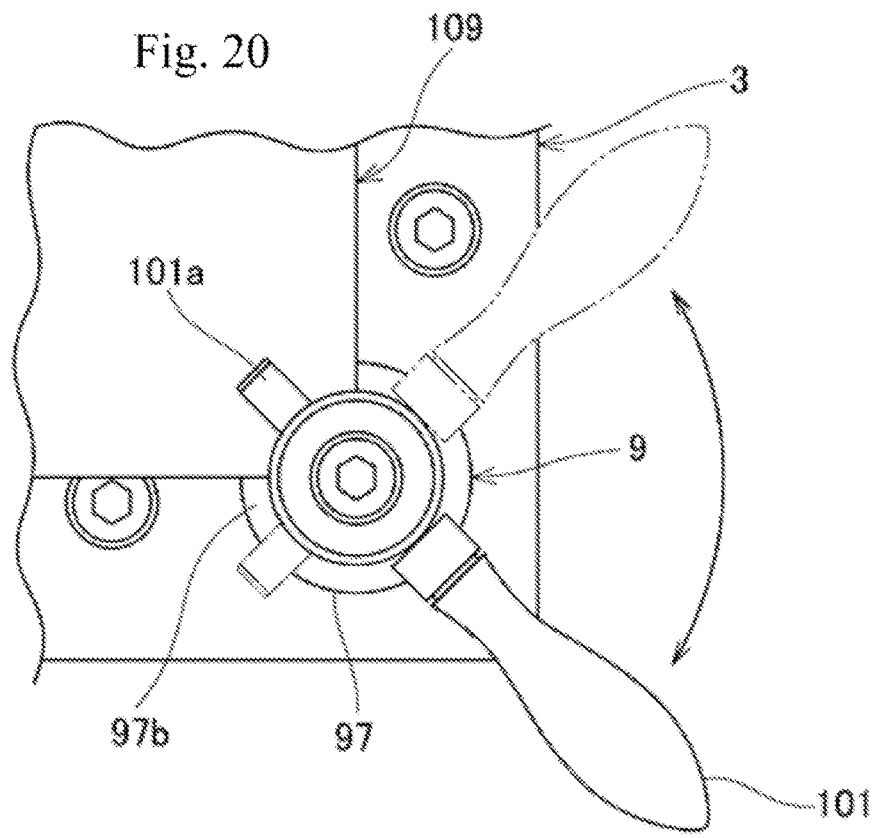
FIG. 20 is a plan view partly showing a state of attaching the polishing jig (Embodiment 1).

FIG. 14 is a front view of a polishing jig used in the end face polishing device for optical fiber ferrule. FIG. 15A is an enlarged plan view showing a state in which a pressing member of the polishing jig is in a locked position. FIG. 15B is a cross-sectional view showing a state in which the pressing member of the polishing jig is in the locked position. FIG. 16 is a plan view of the polishing jig. FIG. 17 is a bottom view of the polishing jig. FIG. 18 is a plan view showing a state in which the polishing jig is attached to the end face polishing device for optical fiber ferrule. FIG. 19 is a front view showing a state in which the polishing jig is not attached to the end face polishing device for optical fiber ferrule. FIG. 20 is a plan view partly showing a state of attaching the polishing jig.

(Holding Portion)

As shown in FIG. 1 to FIG. 4 and FIG. 9, four posts 9 are provided on the base plate 3 around the polishing plate 5 to serve as a holding portion of the optical fiber ferrule. The four posts 9 are arranged at equal intervals centering on the center of the thrust ring 33 so as to form four corners.

The post 9 has a base shaft 97, a lever support shaft 99, a pressurization lever 101, a spring bearing 103, and a pressurization spring 105 to hold the polishing jig.

The base shaft 97 has a fitting shaft portion 97a which is formed into a stepped shape at the bottom part of the base shaft 97a. The base shaft 97 also has a fitting cylindrical portion 97b at the upper part of the base shaft 97a. The fitting shaft portion 97a of the base shaft 97 is fitted and fixed to a fitting hole 3b. The fitting holes 3b are formed in the base plate 3 at the positions where the four posts 9 are located. Here, only single fitting hole 3b and single post 9 are shown in the figure for the purpose of convenience of illustrations.

The bottom part of the lever support shaft 99 is fitted to the fitting cylindrical portion 97b. The lever support shaft 99 is supported by the fitting cylindrical portion 97b so that the lever support shaft 99 can rotate around the shaft and move in the axial direction. At the upper part of the lever support shaft 99, a spring bearing hole 99a is formed.

The intermediate portion of the lever support shaft 99 has a pressurization lever 101 attached in the radial direction. The pressurization lever 101 has a pressurization pin portion 101a which is integrally formed. The pressurization lever 101 is projected to one side of the lever support shaft 99 in the radial direction, and the pressurization pin portion 101a is projected to the other side of the lever support shaft 99.

The spring bearing 103 has a head 103a in one end and a male screw portion 103b in the other end. The spring bearing 103 is disposed in the shaft center portion of the lever support shaft 99 so that the spring bearing 103 can move relatively to the lever support shaft 99 in the axial direction.

The head 103a of the spring bearing 103 is arranged in the spring bearing hole 99a. The male screw portion 103b of the spring bearing 103 is screwed and fixed to the fitting shaft portion 97a. A locking screw 104 is utilized to prevent the male screw portion 103b to be loosened. The pressurization spring 105 is inserted between the head 103a of the spring bearing 103 and the bottom portion of the spring bearing hole 99a.

Therefore, when the pressurization lever 101 is grasped and rotated around the shaft, the lever support shaft 99 is rotated around the shaft center with respect to the fitting cylindrical portion 97b of the base shaft 97. This rotation allows the pressurization lever 101 to rotate around the shaft and the pressurization pin portion 101a is rotated around the shaft center of the lever support shaft 99.

When the pressurization lever 101 is grasped and pulled up upward in the shaft direction, the lever support shaft 99 is moved upward in the axial direction against the biasing force of the pressurization spring 105 with respect to the fitting cylindrical portion 97b. This movement allows the pressurization lever 101 to be pulled up and the pressurization pin portion 101a is moved upward in the axial direction.

(Polishing Jig)

FIG. 14 is a front view of a polishing jig used in the end face polishing device for optical fiber ferrule. FIG. 15A is an enlarged plan view showing a state in which a pressing member of the polishing jig is in a locked position. FIG. 15B is a cross-sectional view showing a state in which the pressing member of the polishing jig is in the locked position. FIG. 16 is a plan view of the polishing jig. FIG. 17 is a bottom view of the polishing jig.

In this embodiment, a MT ferrule having a MT optical connector is used. However, a SC ferrule having a SC optical connector or the like may be similarly used. The MT ferrule is an optical fiber ferrule in which several optical fibers (not illustrated) are bundled into a tape form (i.e., optical fiber tape) and is inserted into a ferrule. The SC ferrule is an optical fiber ferrule in which one optical fiber is inserted into the ferrule. The MT ferrule has a rectangular cross section and the SC ferrule has a circular cross section. Therefore, in the case of using the SC ferrule, the polishing jig has a support insertion hole having a circular cross section.

As shown in FIG. 14 to FIG. 17, the polishing jig 107 has a holder plate 109 to be attached to the end face polishing device 1, a pressing member 111 and a rod member 113.

The holder plate 109 is a square plate as seen from a plan view. The holder plate 109 has arc-shaped edges 110 formed at the four corners of the holder plate 109. The holder plate 109 has a screw hole 115 formed in a center portion of the holder plate 109.

The holder plate 109 has, for example, ten insertion holes 119 in the plane of the holder plate 109. In the insertion hole 119, the MT ferrules 117 are inserted. The insertion holes 119 are arranged in a circumferential direction at equal intervals along the concentric circle of the screw hole 115 (FIG. 17) that is placed in a center portion of the plane. Each insertion hole 119 is formed into a rectangle shape in accordance with the rectangular cross section of the MT ferrule 117. Each insertion hole 119 is configured to have a small gap between the insertion hole 119 and the MT ferrule 117 when the MT ferrule 117 is inserted into the insertion hole 119. Each insertion hole 119 is arranged so that one side of the rectangle insertion hole 119 is aligned parallel to the tangent of the concentric circle.

The top surface of the holder plate 109 has a holding surface 121 around each insertion hole 119. The holding surface 121 intersects the vertical inner wall of the insertion hole 119 at right angles. However, the inner wall of each insertion hole 119 is specified at a predetermined angle with respect to the general surface (top surface) other than the holding surface 121 of the holding plate 109 so that the predetermined angle corresponds to a polishing angle required for the end face of the optical fiber ferrule. Of course, the insertion hole 119 may be formed vertically with respect to the general surface (top surface) of the holder plate 109 depending on the polishing angle.

The holder plate 109 has screw holes 123 arranged so as to correspond to each insertion hole 119. A locking screw 125 is screwed into the screw hole 123 to mount the pressing member 111.

Each pressing member 111 has a long hole 127 penetrated in a center portion of the pressing member 111. The locking screw 125 is inserted into the long hole 127, and the locking screw 125 is screwed into the hole 123.

At the tip of each pressing member 111, a wall surface 129 and a pressing surface 11 are formed. The wall surface 129 is formed to have a height substantially equal to the height of the flange portion 117a of the MT ferrule 117. The pressing surface 131 extends from the upper part of the wall surface 129 in substantially parallel with the holding surface 121.

When the locking screw 125 is loosen without releasing from the screw hole 123, the pressing member 111 can be slid outwardly with respect to the insertion hole 119 by moving the pressing member 111 relatively to the locking screw 125 via the long hole 127. This slide movement makes the pressing surface 131 leave from the region around the insertion hole 119, and the pressing member 111 stays in a standby position. When the pressing member is in the standby position, the MT ferrule 117 can be inserted and removed with respect to the insertion hole 119.

The MT ferrule 117 can be fixed in such a way that the MT ferrule 117 is inserted into the insertion hole 119 and then the pressing member 111 is slid until the wall surface 129 of the pressing member 111 lightly pushes the flange portion 117a of the MT ferrule 117. When the pressing member 111 is slid, the pressing surface 131 is positioned on the flange portion 117a of the MT ferrule 117. While maintaining this state, the locking screw 125 is fastened with a predetermined force using a torque wrench or the like. The fastening makes the pressing surface 131 press the top surface of the flange portion 117a of the MT ferrule 117 downward with a predetermined force. Due to the fastening, the bottom surface of the flange portion 117a of the MT ferrule 117 is held with being closely contact with the holding surface 121.

The rod member 113 has a screw portion 135 (FIG. 17) at the bottom end, a knob 137 at the top end, and a cable hook 139 at the intermediate portion.

The screw portion 135 of the rod member 113 is screwed into the screw hole 115 of the holder plate 109. With this screw-in, the rod member 113 is removably attached to the center of the holder plate 109.

The knob 137 of the rod member 113 is formed so as to be grasped by an operator with one hand.

The cable hook 139 of the rod member 113 locks an optical fiber tape 141 connected to the MT ferrule 117 placed on the holder plate 109. The cable hook 139 is formed by a plate material having a disc shape, for example. Hook portions 143 having a curved shape are formed around the outer periphery of the cable hook 139 so that one end of each hook portion 143 is connected to the cable hook 139. The cable hook 139 has twelve hook portions 143, for example. The optical fiber tapes 141 connected to each MT ferrule 117 are respectively locked to the hook portions 143. This enables all the optical fiber tapes 141 connected to the MT ferrules 117 to be bundled and attached to the polishing jig 107.

(Holding of Optical Fiber Ferrule)

FIG. 18 is a plan view showing a state in which the polishing jig is attached to the end face polishing device for optical fiber ferrule. FIG. 19 is a front view showing a state in which the polishing jig is not attached to the end face polishing device for optical fiber ferrule. FIG. 20 is a plan view partly showing a state of attaching the polishing jig.

As shown in FIG. 18 and FIG. 19, the polishing jig 107 is attached to the end face polishing device 1.

As shown in FIG. 20, when the polishing jig 107 is attached, the four pressurization levers 101 are turned so that all the pressurizing pins 101a are directed outside (shown by a chain line in the figure). The edges 110 of the holder plate 109 (FIG. 16) are placed on the fitting cylindrical portions 97b of four posts 9 to arrange the polishing jig 107 on the end face polishing device 1. Then each pressurization lever 101 is turned while being pulled up so that pressurizing pins 101a are set to push down the four corners of the holder plate 109 (shown by a solid line in the figure). Therefore, in this embodiment, a part of the flat ring-formed surface provided on the top end of the fitting cylindrical portion 97b serves as a jig-mounted portion. However, the jig-mounted portion may be arranged next to the post 9 separate from the fitting cylindrical portion 97b.

When the polishing jig 107 is positioned and fixed to the four posts 9 of the end face polishing device 1 as described above, the tip of the MT ferrule 117 which is projected from the bottom surface of the polishing jig 107 is opposed to a polishing film 27 (FIG. 5).

[Polishing]

As shown in FIG. 14 to FIG. 20, the polishing jig 107 holding several MT ferrules 117 is positioned and fixed to the four posts 9 of the end face polishing device 1.

As shown in FIG. 1 to FIG. 5, FIG. 9 and FIG. 10, when a starting switch is turned on, the revolution motor 11 and the self-rotation motor 13 are driven and controlled by revolution and self-rotation signals output from the controller 22.

With the above described control, the revolution motor 11 and the self-rotation motor 13 are driven and controlled for the revolution and self-rotation. With the above described driving, the polishing plate 5 is driven on the thrust ring 33 for the polishing to exhibit a hypotrochoid motion, for example.

On the other hand, the pressing drive motor 15 (FIG. 2, FIG. 9 and FIG. 10) is driven and controlled by a pressing drive signal output from the controller 22 (FIG. 2).

With the above described driving, the ball screw 19 is rotated and the moving bracket 69 is moved linearly between the fixing bracket 67 and the direct motion mechanism 57 via the nut 73, as described above. With the above described linear movement, the load cell overload protection mechanism 75 presses the load cell 77 to transmit the pressing force to the direct motion member 61. The load cell 77 detects the pressing force transmitted to the direct motion member 61. The above described detection signal is input to the controller 22.

The direct motion member 61 performs the linear motion toward the front along the guide rails 63a of the linear motion guide 63 by the transmitted pressing force.

When the direct motion member 61 is moved linearly toward the front, the cam followers 81a, 81b push up the upper inclined surfaces 79a while the cam followers 81a, 81b are rolling, as described above. When the direct motion member 61 is moved linearly toward the back, the cam followers 81a, 81b push down the inclined surfaces 79b while the cam followers 81a, 81b are rolling, as described above.

That means, as described above, the cam action of the cam mechanism 59 is performed such that the force produced by the linear movement of the direct motion member 61 in the front-and-back direction is converted to the pressing force in the top-and-bottom direction and transmitted to the axial movement of the polishing plate 5.

When the inclined surfaces 79a are pushed upward by the cam followers 81a, 81b, the cam structure 83 is pushed upward and the splined shaft 35 is lifted while being guided by the spline bush 93 to transmit the pressing force to the thrust ring 33.

With the above described transmission of the pressing force, the thrust ring 33 is moved upward to lift the polishing plate 5.

When the polishing plate 5 is lifted, the polishing film 27 of the polishing plate 5 is pressed against the tip of the MT ferrule 117 from below. With the above described pressing, the polishing pressure is applied so that the polishing film 27 is pressed in by 0.1 mm, for example.

In this case, the detection signal of the pressing force detected by the load cell 77 is input to the controller 22, and the controller 22 calculates the current polishing pressure from the detection signal, as described above. Based on the above described calculation, the pressing drive motor 15 is feedback controlled so that the current polishing pressure becomes equal to the predetermined polishing pressure stored in the controller 22. As a result, it is possible to maintain and adjust the polishing pressure.

Effect of Embodiment 1

The end face polishing device 1 for optical fiber ferrule in Embodiment 1 of the present invention has: the bearing portion 30 including the ball guide 29; the polishing plate guide supporting portion 31 including the thrust ring 33 and the splined shaft 35; the pressing drive motor 15; and the pressing force transmission mechanism 21 including the direct motion mechanism 57 and the cam mechanism 59.

The bearing portion 30 is configured to allow the polishing plate 5 to rotate relatively around the shaft and move relatively in the axial direction between the revolution drive shaft 23 and the polishing plate 5. The polishing plate guide supporting portion 31 is configured to movably support the polishing plate 5 on the base plate 3 to apply the polishing pressure while allowing the polishing plate 5 to move with respect to the posts 9. The pressing drive motor 15 is configured to adjustably output the driving force to apply polishing pressure. The pressing force transmission mechanism 21 is configured to transmit the driving force output from the pressing drive motor 15 to the axial movement direction of the polishing plate 5 as the pressing force.

Therefore, the polishing plate 5 can be moved in the axial direction with respect to the posts 9 by the drive force output from the pressing drive motor 15 while the polishing plate 5 is driven for the polishing with the revolution and the self-rotation.

At this time, the axial movement against the base plate 3 can be surely achieved by the thrust ring 33 and the splined shaft 35.

In addition, the revolving polishing plate 5 which is driven by the revolution drive shaft 23 is allowed to rotate relatively around the shaft and move relatively in the and axial direction by use of the ball guide 29 at the time of the axial movement against the posts 9.

Accordingly, the polishing plate 5 can apply the pressing force to the MT ferrule 117 held by the posts 9 from below while the polishing plate 5 is driven for the polishing. Thus, it is possible to precisely adjust the polishing pressure between the polishing plate 5 and the MT ferrule 117 to accurately polish the end of the MT ferrule 117.

Since the polishing pressure is adjusted by the axial movement of the polishing plate 5 in the top-and-bottom direction, the end of the MT ferrule 117 can also be polished while the polishing jig 107 is completely or strongly fixed and held in the posts 9 by omitting the pressurization spring 105 of the posts 9 or by setting the repulsive force of the pressurization spring 105 strong.

By polishing the end face while the polishing jig is held by being completely fixed as described above, it is possible to realize other polishing methods which have not conventionally been made. The polishing methods will be described later.

Further, the pressing drive motor 15 to drive the polishing plate 5, the direct motion mechanism 57, the cam mechanism 59 and the like can be accommodated in the housing 55 located underneath. This makes the upper side of the polishing plate 5 open.

Consequently, it is also possible to place the end face polishing device 1 in a production line and automatically provide and place the polishing jig 107 supporting the MT ferrule 117 on the end face polishing device 1 from upward in the production line. Thus, an automation can be realized.

The thrust ring 33 is configured to support the outer peripheral portion of the bottom surface of the polishing plate 5 by a plane surface to serve as a part of the pressing force transmission mechanism 21 for transmitting the pressing force while allowing the polishing plate 5 to be driven for the polishing. The splined shaft 35 is configured to be connected to the thrust ring 33 at one end and movably supported by the base plate 3 via the ball guide 29 on the other end to serve as a part of the pressing force transmission mechanism 21 for transmitting the pressing force in the axial movement direction.

Therefore, when the splined shaft 35 receives the transmitted pressing force as a part of the pressing force transmission mechanism 21, the splined shaft 35 is smoothly moved upward in the axial direction with respect to the base plate 3 to lift the thrust ring 33.

Consequently, the polishing plate 5, which is driven for the polishing while being revolved and self-rotated on the thrust ring 33, can be lifted by the adjusted pressing force.

The polishing pressure between the polishing plate 5 and the MT ferrule 117 can be precisely adjusted by the pressing force, and the end of the MT ferrule 117 can be accurately polished.

The direct motion mechanism 57 is configured to have: the direct motion member 61 which performs the linear movement in a direction crossing the axial movement direction by the transmitted pressing force; and the linear motion guide 63 which supports the direct motion member 61 on the base plate 3 to allow the linear motion. The cam mechanism 59 is configured to perform the cam action so that the linear movement force of the direct motion member 61 is transmitted in the axial movement direction as the pressing force.

Therefore, when the direct motion member 61 is driven by the driving force output from the pressing drive motor 15, the cam mechanism 59 transmits the force produced by the linear movement of the direct motion member 61 in the axial movement direction of the polishing plate 5 as the pressing force.

Accordingly, the polishing pressure between the polishing plate 5 and the MT ferrule 117 can be precisely adjusted by driving the pressing drive motor 15. Thus, the end of the MT ferrule 117 can be accurately polished.

The cam mechanism 59 is configured to have: the cam portion 79 which performs the cam action; and cam followers 81a, 81b which serve as the cam drive portion 81. The cam portion 79 is configured to have inclined surfaces 79a, 79b formed in the cam structure 83. The cam structure 83 is configured to be connected to the other end of the splined shaft 35 so as to convert and transmit the force as described above. The cam followers 81a, 81b are configured to be supported by the direct motion member 61 and abutted with the inclined surfaces 79a, 79b to transmit the force produced by the linear movement of the direct motion member 61 to the inclined surfaces 79a, 79b.

Therefore, the cam action is performed with the cam followers 81a, 81b being abutted with the inclined surfaces 79a, 79b. That means it is possible to perform the cam action by so-called wedge effect.

Consequently, the driving force output from the pressing drive motor 15 is transmitted to the polishing plate 5 after it is increased. Thus, large load can be obtained.

Further, since the above-described configuration can be realized by small components, the mechanism can be configured to be compact. Because of this, the pressing drive motor 15, the direct motion mechanism 57 and the cam mechanism 59 can be easily accommodated in the housing 55 of the device and thus downsizing of the whole device can be achieved.

A pair of cam portions 79 and a pair of cam drive portions 81 are provided. In the cam structure 83, the pair of cam portions 79 are separately arranged on left and right sides with respect to the front-and-back direction of the linear movement. Thus, the cam structure 83 is formed into a flame shape. The splined shafts 35 are arranged separately on left and right sides and front and back sides in the front-and-back direction. The direct motion member 61 has a pair of arm portions 61a, 61b. Each of the arm portions 61a, 61b is separately arranged on the outside of the left and right sides of the cam structure 83. The followers 81a, 81b are respectively supported by the arm portions 61a, 61b so that cam followers 81a, 81b respectively abut with the inclined surfaces 79a, 79b provided on the pair of the cam portions 79. The cam followers 81a, 81b abut with the inclined surfaces 79a, 79b between the splined shafts 35 arranged in the front-and-back direction of the linear movement.

Therefore, the driving force output from the pressing drive motor 15 is converted and transmitted between the splined shafts 35. Thus, the converted and transmitted pressing force is distributed to the four splined shafts 35 and the distributed pressing force is surely transmitted to the polishing plate 5.

The four splined shafts 35 are arranged in the same radius of the thrust ring 33 at equal intervals in the circumferential direction in a balanced manner.

Therefore, the force converted and transmitted between the splined shafts 35 is transmitted with good balance from the splined shafts 35 to the polishing plate 5 as the pressing force.

The cam followers 81a, 81b are configured to abut with inclined surfaces 79a, 79b in the center position between the splined shafts 35 which are arranged in the front-and-back direction of the linear movement. The center position is determined on the premise that the four splined shafts 35 are arranged in the circumferential direction of the thrust ring 33 in a balanced manner so as to be symmetrically arranged both in the front-and-back and the left-and-right directions.

The center position in such arrangement serves as a balance position of the pressing force when the pressing force is transmitted from the splined shaft 35 to the thrust ring 33.

Therefore, the force that is converted and transmitted at the center position between the splined shafts 35 can be transmitted from the splined shafts 35 to the polishing plate 5 as the pressing force with good balance. That is, it is possible to transmit equal load from four points. The center position serves as a maximum load position, and the pressing force applied to the polishing plate 5 can be surely transmitted as the polishing pressure.

Consequently, the end of the MT ferrule 117 can be accurately polished by precisely adjusting the polishing pressure between the polishing plate 5 and the MT ferrule 117 through the feedback control of the pressing drive motor 15.

The polishing plate 5 is driven for the polishing when the revolution drive shaft 23 and the self-rotation drive shaft 25 are revolved and self-rotated by the revolution motor 11 and the self-rotation motor 13. The revolution motor 11 and the self-rotation motor 13 are fixed to the base plate and arranged inside the flame of the cam structure 83 in the front-and-back direction of the linear movement.

Therefore, the revolution motor 11, the self-rotation motor 13, the direct motion mechanism 57, the cam mechanism 59 and the like can be stored by efficiently utilizing the space.

Consequently, it is possible to reduce wasted space among the revolution motor 11, the self-rotation motor 13, the direct motion mechanism 57, the cam mechanism 59 and the like in the front-back, left-right, and up-down directions. This enables these components to be easily accommodated in the housing 55 and achieves a downsizing of the device as a whole.

The upper part of the cam structure 83 has a flat coupling face 89 which is laid upward and extending along the front-and-back direction of the linear movement. The four splined shafts 35 are fixed to the upward coupling face 89.

Therefore, when the pressing force converted and transmitted by the cam mechanism 59 is transmitted from the cam structure 83 to the four splined shafts 35, the pressing force can be equally distributed and transmitted from the coupling face 89 of the cam structure 83 to the four splined shafts 35.

Since the pressing force is equally distributed and transmitted, the pressing force can be surely transmitted via the four splined shafts 35 to the outer peripheral portion of the thrust ring 33.

Moreover, when the flat ends of the four splined shafts 35 are bonded and fixed to the flat upward coupling face 89, they are prevented or suppressed from being relatively shifted or wobbled.

Consequently, the pressing force converted and transmitted by the cam mechanism 59 can be surely transmitted from the cam structure 83 to the four splined shafts 35 in the top-and-bottom direction with good balance.

The thrust ring 33 has a flat downward coupling face 33c which extends along the front-and-back direction of the linear movement. The four splined shafts 35 are fixed to the downward coupling face 33c. Because of this, the cam structure 83, the splined shaft 35 and the thrust ring 33 are not moved relatively to form a locked linkage.

Therefore, when the pressing force converted and transmitted by the cam mechanism 59 is transmitted from the cam structure 83 to the thrust ring 33 via the four splined shafts 35, the pressing force is transmitted by the locked linkage.

Consequently, the pressing force converted and transmitted by the cam mechanism 59 can be surely transmitted from the cam structure 83 to the thrust ring 33 via the four splined shafts 35 in the top-and-bottom direction with good balance.

Moreover, when the flat ends of the four splined shafts 35 are bonded and fixed to the flat upward coupling face 89, they are prevented or suppressed from being relatively shifted or wobbled.

The end face polishing device 1 has: the load cell 77 which is provided on the direct motion member 61 of the pressing force transmission mechanism 21 to indirectly detect the polishing pressure; and the controller 22 for controlling the pressing drive motor 15 to adjust the polishing pressure to a predetermined polishing pressure.

Therefore, the polishing pressure between the polishing plate 5 and the MT ferrule 117 can be surely controlled through the feedback control of the pressing drive motor 15.

Consequently, the end of the MT ferrule 117 can be accurately polished by precisely adjusting the polishing pressure.

The above described effects can also be obtained in the case of using a SC ferrule with SC connector.

(Polishing Result)

Figure 21:
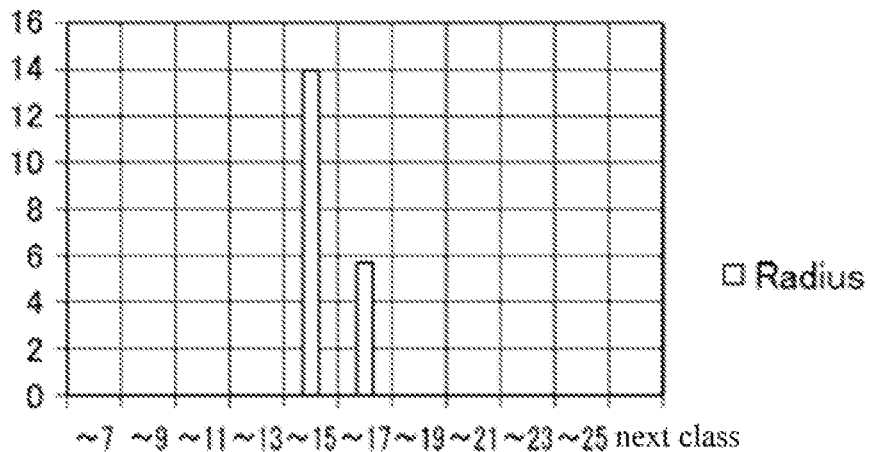
FIG. 21 is a graph showing variations in radius of the optical fiber ferrule end face relating to the polishing results of SC connector.
Figure 22:
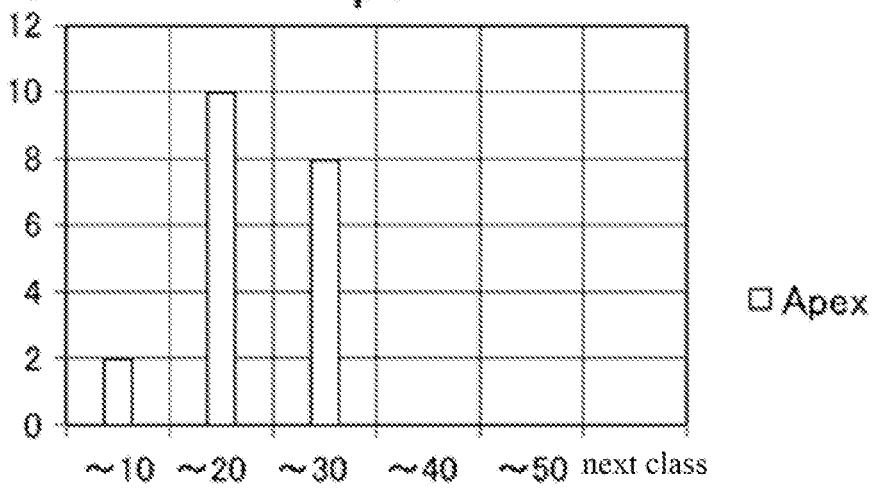
FIG. 22 is a graph showing variations in a deviation amount between an apex and the center point of the optical fiber ferrule relating to the polishing results of SC connector (Embodiment 1).
Figure 23:
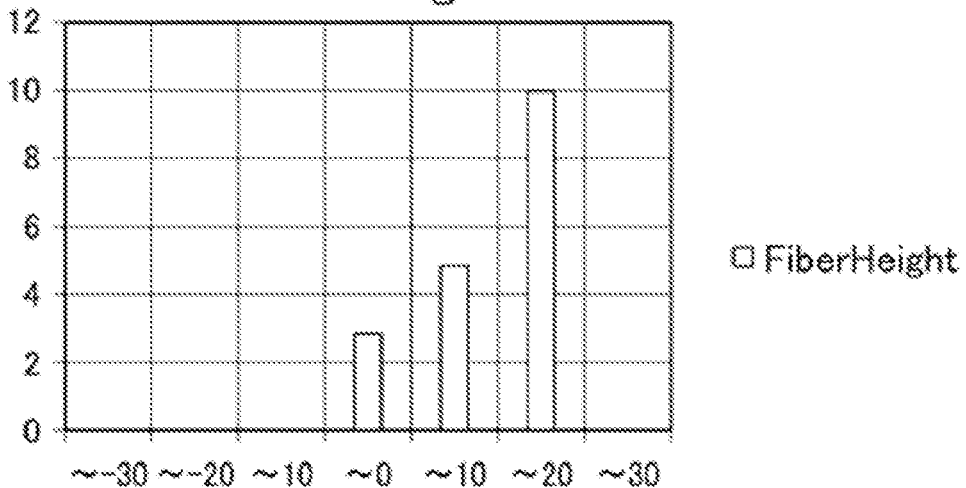
FIG. 23 is a graph showing variations in a protrusion amount of the optical fiber from the optical fiber ferrule relating to the polishing results of SC connector (Embodiment 1).
Figure 24:
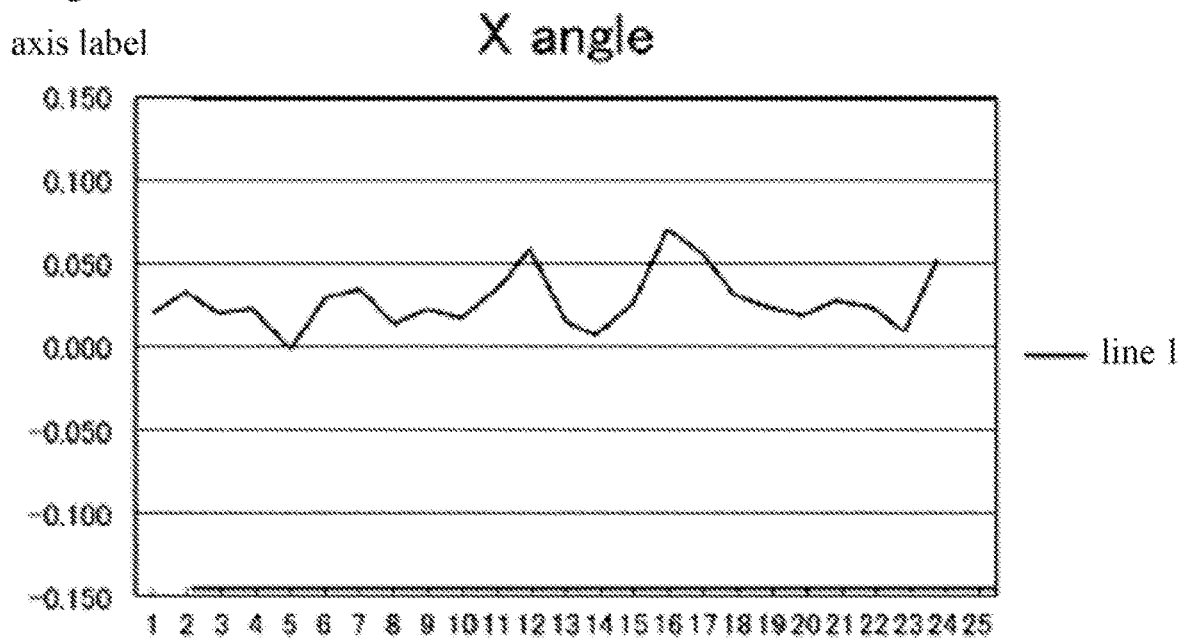
FIG. 24 is a graph showing variations in an angle in X-direction of the end face of optical fiber ferrule relating to the polishing results of MT ferrule (Embodiment 1).
Figure 25:
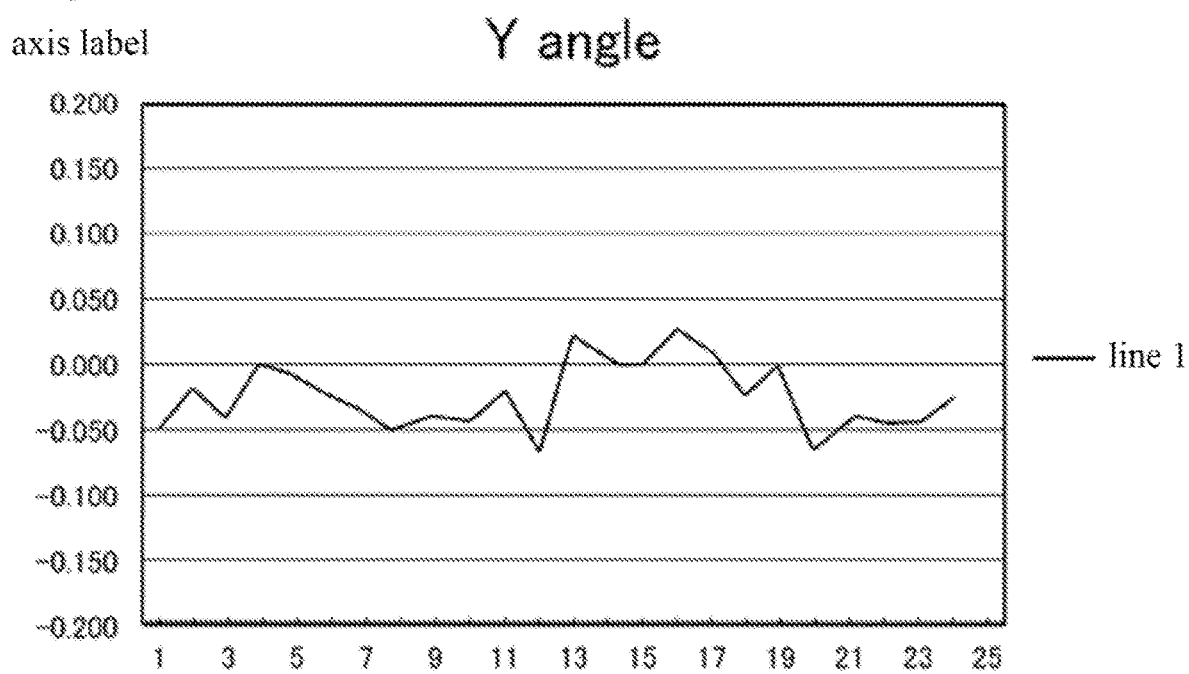
FIG. 25 is a graph showing variations in an angle in Y-direction of the angle of the optical fiber ferrule end face relating to the polishing results of MT ferrule (Embodiment 1).
Figure 26:
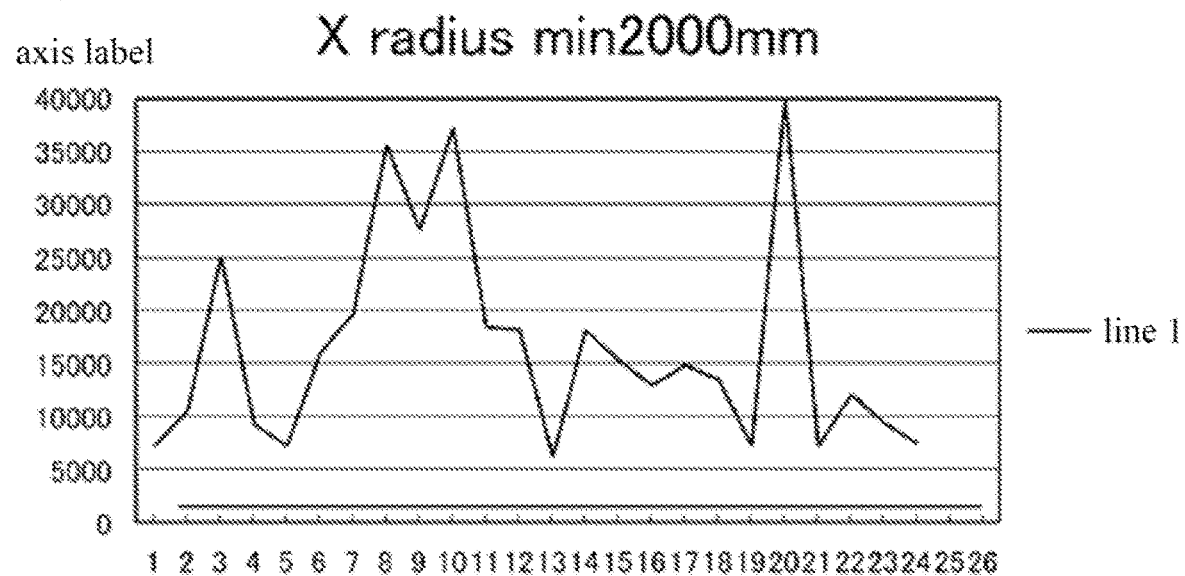
FIG. 26 is a graph showing variations in radius in X-direction in a flatness of the end face of the optical fiber ferrule relating to the polishing results of MT ferrule (Embodiment 1).
Figure 27:
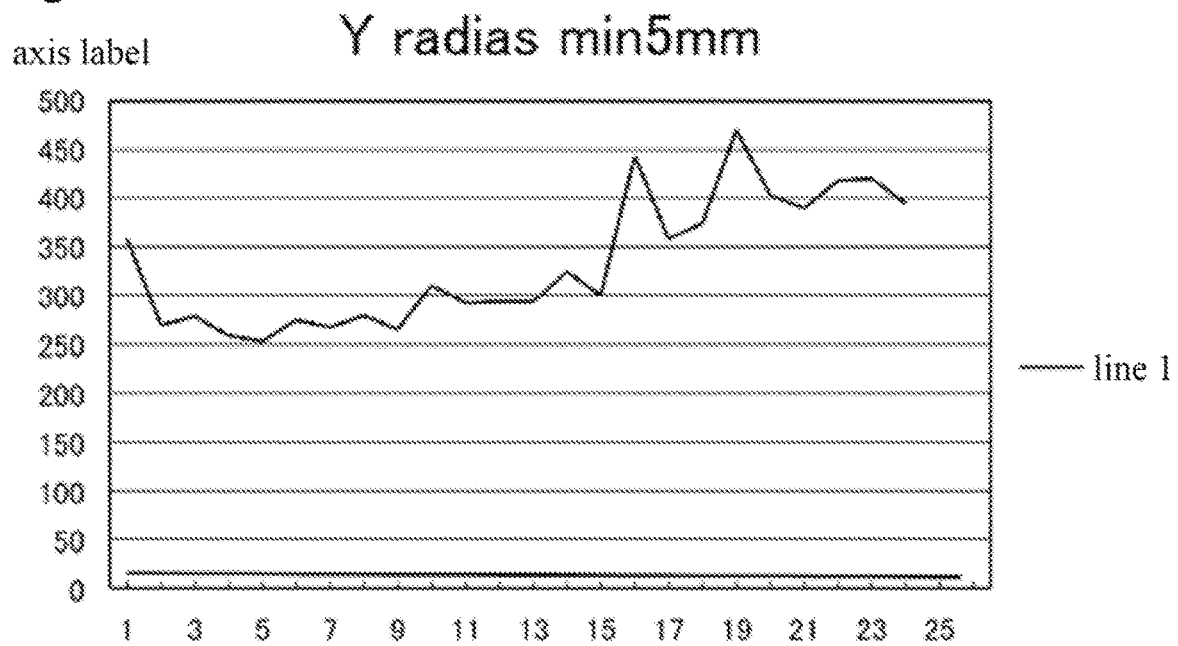
FIG. 27 is a graph showing variations in radius in Y-direction in a flatness of the end face of the optical fiber ferrule relating to the polishing results of MT ferrule (Embodiment 1).

FIG. 21 to FIG. 27 are graphs of the evaluation of the polishing result. FIG. 21 is a graph showing variations in radius of the optical fiber ferrule end face relating to the polishing results of SC connector. FIG. 22 is a graph showing variations in a deviation amount between an apex and the center point of the optical fiber ferrule relating to the polishing results of SC connector. FIG. 23 is a graph showing variations in a protrusion amount of the optical fiber from the optical fiber ferrule relating to the polishing results of SC connector. FIG. 24 is a graph showing variations in an angle in X-direction of the end face of optical fiber ferrule relating to the polishing results of MT ferrule. FIG. 25 is a graph showing variations in an angle in Y-direction of the angle of the optical fiber ferrule end face relating to the polishing results of MT ferrule. FIG. 26 is a graph showing variations in radius in X-direction in a flatness of the end face of the optical fiber ferrule relating to the polishing results of MT ferrule. FIG. 27 is a graph showing variations in radius in Y-direction in a flatness of the end face of the optical fiber ferrule relating to the polishing results of MT ferrule.

FIG. 21 to FIG. 23 show polishing results in IPC mode, and FIG. 24 to FIG. 27 show polishing results in OPC mode.

Here, the IPC mode is a polishing method that the applicant has already described in Japanese Unexamined Patent Application Publication No. 2002-1641. In the IPC mode, a position accuracy is maintained with the polishing plate being a reference position, and a spring is installed in a polishing holder which holds each optical fiber ferrule independently, and a polishing load is applied independently to each optical fiber ferrule.

The OPC mode does not use the polishing plate as a reference position, and the polishing is controlled by a load applied from the polishing plate to the end face of the optical fiber ferrule. The OPC mode is different from the above-described Patent Document in that the optical fiber ferrule is polished while the optical fiber ferrule is completely fixed to the polishing holder. Therefore, it is necessary to control the load by the polishing plate.

FIG. 21 to FIG. 23 show results of the polishing when twenty optical fiber ferrules (SCPC) are held and polished (IPC 20-shaft-SCPC). FIG. 24 to FIG. 27 show results of the polishing when twenty-four MT ferrules described above are fixed and polished (Fixed 24-shaft-MT).

The polishing conditions of IPC 20 shaft-SCPC and Fixed 24 shaft-MT are as shown in following Table 1 and Table 2, for example.

TABLE 1

IPC 20-shaft-SCPC

| | Process | Abrasive grain of polishing film | Polishing base | Pressure per each ferule | Number of rotation | Time | Water |
|---|---|---|---|---|---|---|---|
| 1 | Adhesive agent removal | SiC 15 μm | Rubber plate | 4N | 110 rpm | 30 sec | Distilled water |
| 2 | Rough polishing | Diamond 9 μm | Rubber plate | 4N | 110 rpm | 60 sec | Distilled water |
| 3 | Intermediate polishing | Diamond 1 μm | Rubber plate | 4N | 110 rpm | 120 sec | Distilled water |
| 4 | Finishing polishing | SiO$_2$ | Rubber plate | 4N | 110 rpm | 60 sec | Distilled water |

TABLE 2

Fixed 24-shaft-MT Polishing conditions

| | Process | Abrasive grain of polishing film | Polishing base | Pressure per each ferule | Number of rotation | Time | Water |
|---|---|---|---|---|---|---|---|
| 1 | Adhesive agent removal | SiC 15 μm | Glass plate | 2N | 110 rpm | 30 sec | Distilled water |
| 2 | Rough polishing | SiC 5 μm | Glass plate | 2N | 110 rpm | 60 sec | Distilled water |
| 3 | Intermediate polishing | SiC 3 μm | Glass plate | 2N | 110 rpm | 60 sec | Distilled water |
| 4 | Finishing polishing | SiC 0.5 μm | Glass plate | 2N | 110 rpm | 60 sec | Distilled water |

TABLE 2-continued

Fixed 24-shaft-MT Polishing conditions

| Process | Abrasive grain of polishing film | Polishing base | Pressure per each ferule | Number of rotation | Time | Water |
|---|---|---|---|---|---|---|
| 5 Final polishing | CeO buffing | Glass plate | 2N | 110 rpm | 120 sec | Distilled water |

As shown in FIG. 21 to FIG. 23, results of Radius, Apex and Fiber Height were within the required specifications.

Specifically, Radius in FIG. 21 means the radius of the end face of the ferrule and the result was within the range of the required specification of R10 to 25 mm. Apex of FIG. 22 means an apex offset, which is a deviation amount between the apex of the ferrule and the center of the fiber, and the result was within the range of the required specification of 50 μm or less. Fiber Height of FIG. 23 means a protrusion amount of the fiber protruded from the ferrule, and the result was within the range of the required specification of 0 to 50 nm.

As shown in FIG. 24 to FIG. 27, the results of X angle, Y angle, X radius minimum 2000 mm (X Radius min 2000 mm), Y radius minimum 5 mm (Y Radius min 5 mm) were within the range of the required specifications.

Specifically, X angle of FIG. 24 means the angle of the end face of the ferrule in an X-direction and the result was within the required specification of ±0.15°. Y angle of FIG. 25 means the angle of the end face of the ferrule in a Y-direction and the result was within the required specification of ±0.20°. X radius minimum 2000 mm (X Radius min 2000 mm) of FIG. 26 means a flatness of the end face of the ferrule and the result was within the required specification of radius 2000 mm or more in the X-direction. Y radius minimum 5 mm (Y Radius min 5 mm) of FIG. 27 means a flatness of the end face of the ferrule and the result was within the required specification of radius 5 mm or more in Y-direction.

(Extendibility of Polishing Method)

Figure 28A:
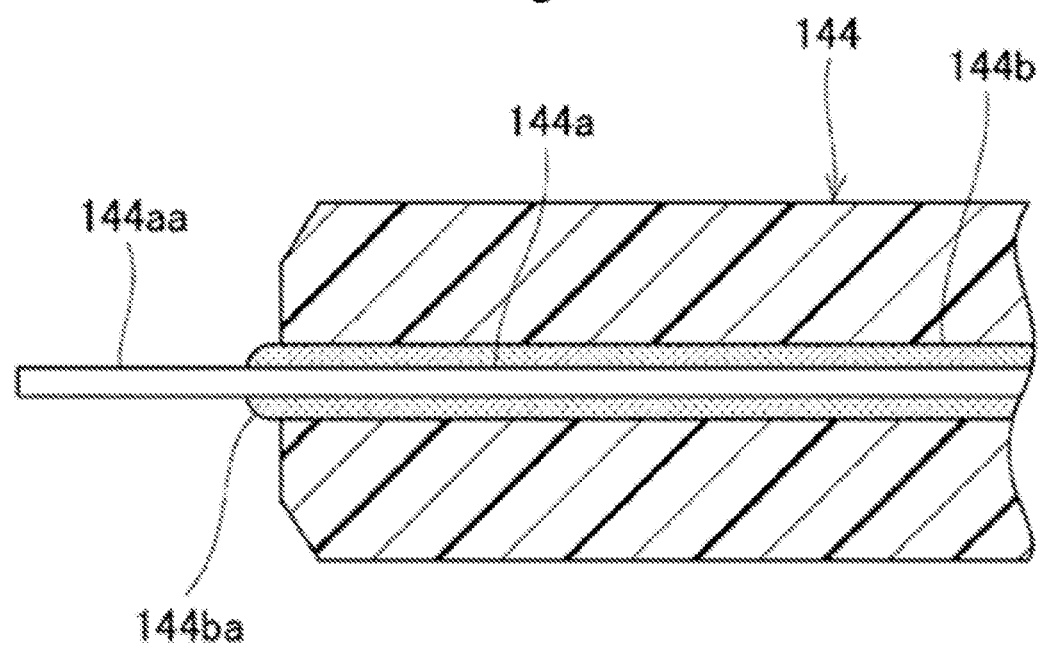
FIG. 28A is a conceptual cross-sectional view partly showing the optical fiber ferrule before the end face is polished
Figure 28B:
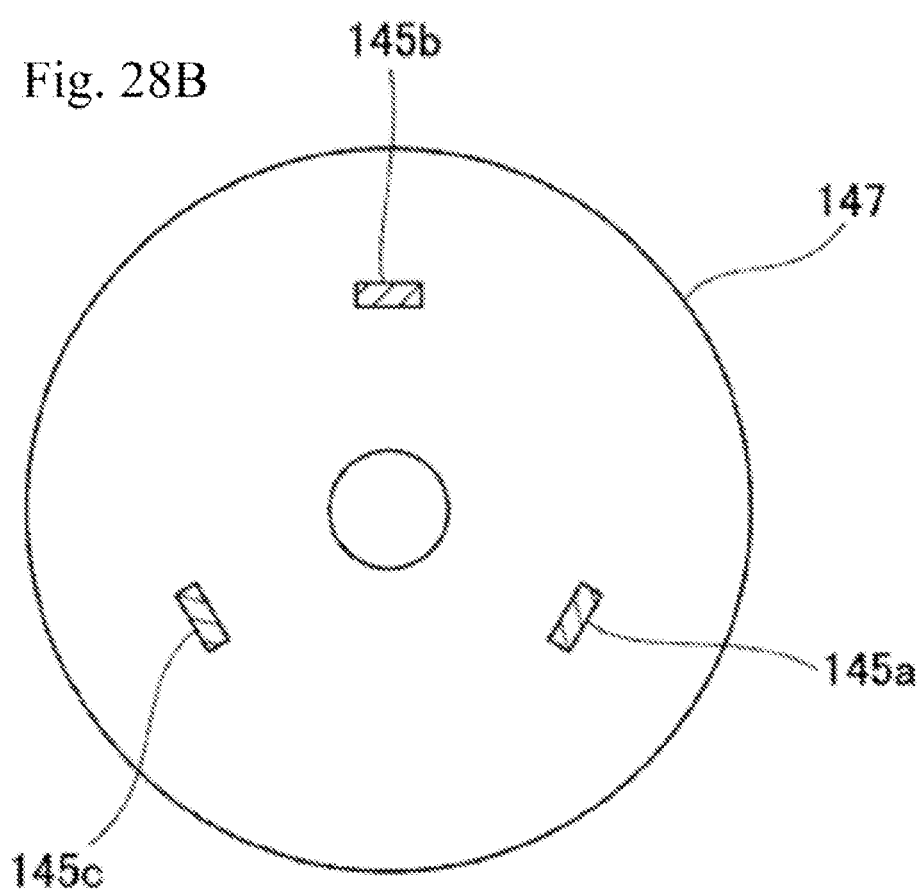
FIG. 28B is a conceptual plan view showing a state of independently polishing the optical ferrule before the end face is polished.

FIG. 28A is a conceptual cross-sectional view partly showing the optical fiber ferrule before the end face is polished. FIG. 28B is a conceptual plan view showing a state of independently polishing the optical ferrule before the end face is polished.

As shown in FIG. 28A, a removal portion 144aa of an optical fiber 144a and a removal portion 144ba of an adhesive agent 144b are exposed at the end face of the optical fiber ferrule 144 before polishing.

Conventionally, the exposed removal portion 144aa of the optical fiber 144a has been manually cut by an operator.

On the other hand, in a polishing method according to the embodiment of the present invention, the polishing jig 107 is fixed to the posts 9, and the polishing plate 5 is lifted from below while being revolved and self-rotated. Therefore, it is possible to polish and remove the removal portion 144aa of the optical fiber 144a which is supported by the polishing jig 107.

As shown in FIG. 28B, when a single optical fiber ferrule 145a is polished, it has been necessary to dispose dummies 145b, 145c in addition to the target optical fiber ferrule 145a supported by the polishing jig 147 in the conventional OPC mode polishing. The disposed dummies 145b, 145c served to regulate the polishing pressure so as not to make the polishing jig 147 be inclined.

On the other hand, in a polishing method according to the embodiment of the present invention, the polishing jig 107 is completely fixed to the posts 9, and it is possible to polish the optical fiber ferrule in a way that the polishing plate 5 is lifted while the polishing plate 5 is revolved and self-rotated. Therefore, it is unnecessary to dispose the dummies 145b, 145c, and the workability of the single ferrule polishing is remarkably improved.

(Direct Detection of Polishing Pressure)

Figure 29:
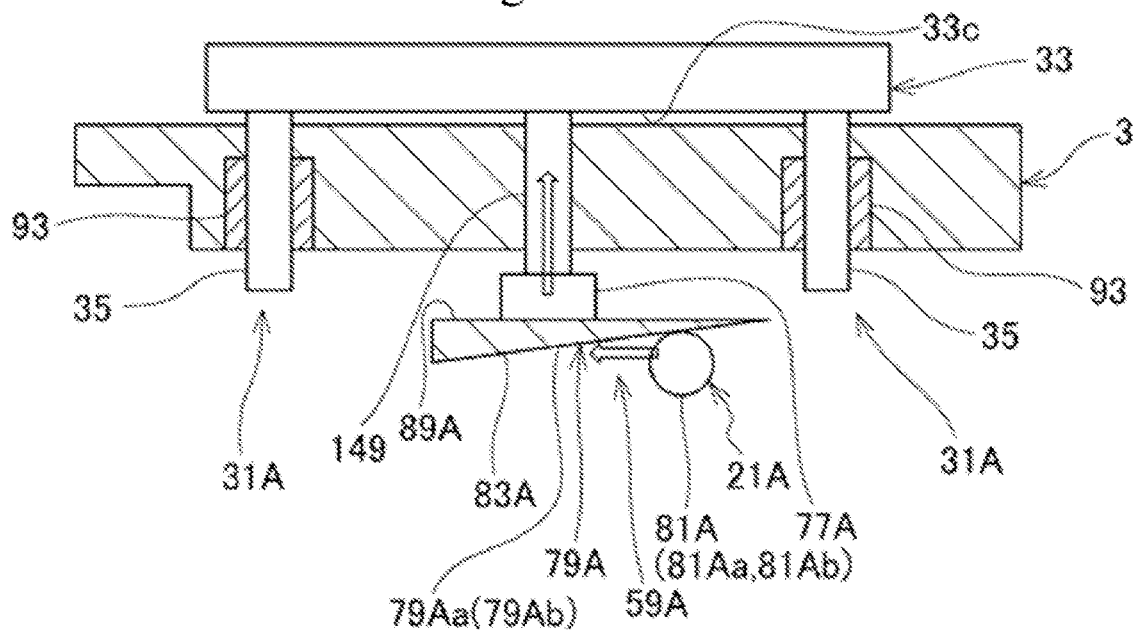
FIG. 29 is a cross-sectional view schematically and partly showing a variation of a load cell arrangement with respect to the pressing force transmission mechanism (Embodiment 1).

FIG. 29 is a cross-sectional view schematically and partly showing a variation of a load cell arrangement with respect to the pressing force transmission mechanism. The basic configuration is similar to that of FIG. 9 and the like. Thus, the same reference numerals are denoted and the overlapped explanations are omitted. With respect to the configurations and reference numerals which are not shown in FIG. 29, refer to FIG. 9 and the like.

In FIG. 9, the load cell 77 which serves as a sensor is attached to the direct motion member 61. The detection at this position is an indirect detection of the polishing pressure between the polishing plate 5 which is driven for the polishing and the optical fiber ferrule held by the posts 9.

On the other hand, in the example of an end face polishing device 1A in FIG. 29, a pressing rod 149 which serves as a pressing force transmission mechanism 21A is included in addition to a polishing plate guide supporting portion 31A. In FIG. 29, a cam structure 83A of a cam mechanism 59A is partially shown in a cam portion 79A, and conceptually illustrated in a wedge plate form.

The pressing rod 149 is arranged on the thrust ring 33 at equal intervals from the four splined shafts 35 of the polishing plate guide supporting portion 31A in a circumferential direction. The pressing rod 149 is connected to the bottom surface of the thrust ring 33. In this variation, the polishing plate guide supporting portion 31A does not transmit the pressing force and does not form a part of the pressing force transmission mechanism 21.

The number and the arrangement of the splined shafts 35 and the pressing rod 149 are not particularly limited as long as it is possible to smoothly guide the polishing plate 5 in the axial movement direction and smoothly transmit the pressing force.

The load cell 77A is fixed between the flat bottom end surface of the pressing rod 149 and the flat coupling face 89A of the cam structure 83A. The flat top end of the pressing rod 149 is connected to the coupling face 33c of the thrust ring 33 and fixed by a bolt as in the case of FIG. 9. The load cell 77A is connected to the controller 22 shown in FIG. 2.

Therefore, the driving force output from the pressing drive motor as described above is transmitted to the cam follower 81Aa, (81Ab). Then, the cam structure 83A is pressed upward by the cam action, and the pressing force is transmitted to the thrust ring 33 via the load cell 77A and the pressing rods 149.

The thrust ring 33 is lifted by the transmitted pressing force, and the polishing plate 5 is pushed and abutted with the end face of the optical fiber ferrule. When the thrust ring 33 is lifted, the splined shafts 35 are guided by the spline bushes 93 as described above. The splined shafts 35 guide the polishing plate 5 to move in the axial movement direction via the thrust ring 33 while the splined shaft 35 are guided as described above. Thus, the splined shafts 35 transmit the pressing force to the polishing plate 5. The polishing plate 5 is driven for the polishing on the thrust ring 33 while receiving the transmitted pressing force in the axial movement direction as described above.

The polishing pressure between the polishing plate 5 and the end face of the optical fiber ferrule held by the posts 9 is adjusted by the pressing force transmitted to the polishing plate 5. The polishing pressure is directly detected by the load cell 77A, and the signal is input to the controller 22. The controller 22 feedback-controls the pressing drive motor 15 by using the above described input.

Therefore, in this variation, it is possible to feedback control the pressing drive motor 15 more directly by detecting the polishing pressure directly.

(Variations of Cam Portion and Cam Drive Portion)

Figure 30A:
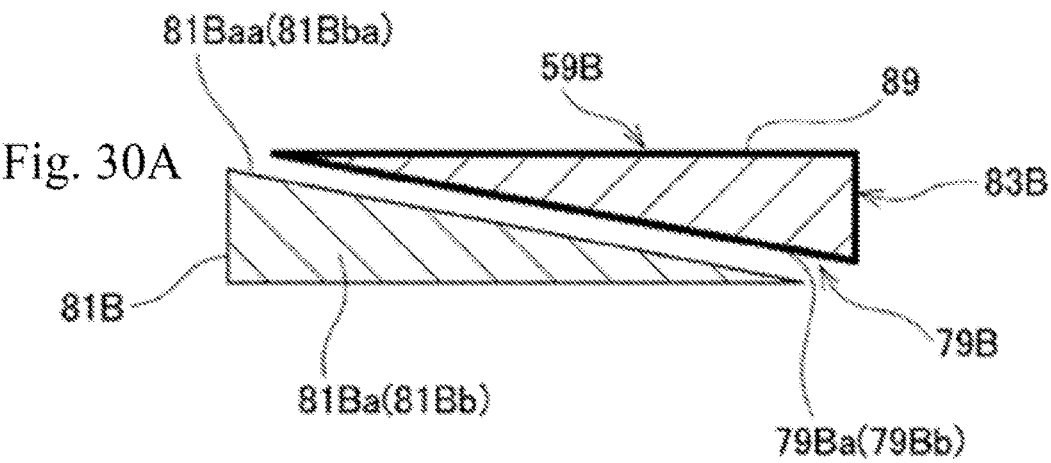
FIG. 30A is a schematic cross-sectional view of the cam portion and a cam drive portion (Embodiment 1).
Figure 30B:
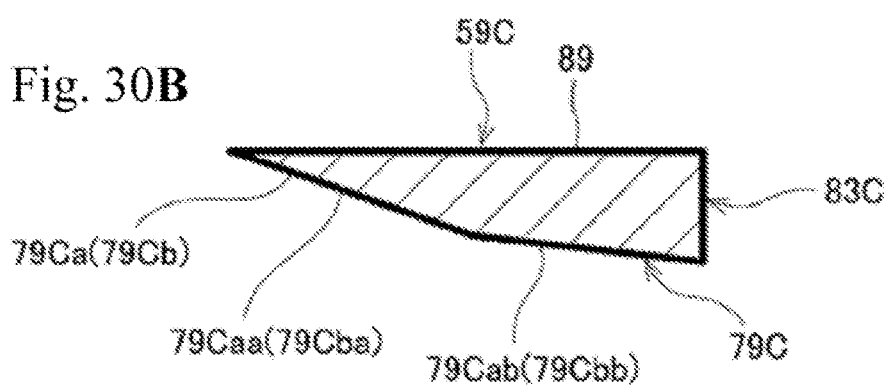
FIG. 30B is a schematic cross-sectional view of the cam portion (Embodiment 1).
Figure 30C:
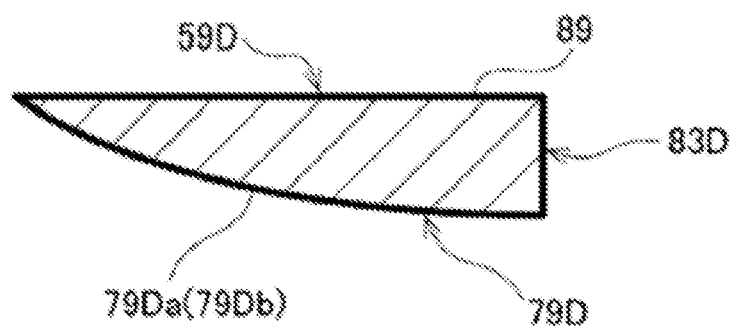
FIG. 30C is a schematic cross-sectional view of the cam portion (Embodiment 1).

FIG. 30A, FIG. 30B and FIG. 30C show variations. FIG. 30A is a schematic cross-sectional view of the cam portion and a cam drive portion. FIG. 30B and FIG. 30C are schematic cross-sectional views of the cam portion.

FIG. 30A partially shows the cam structure 83B in the cam portion 79B, and the cam structure 83B is conceptually illustrated in a wedge plate form. The cam portion 79B has an inclined surface 79Ba (79Bb) formed in a single line shape. The reference numeral in the parenthesis indicates elements on the right side which is not illustrated. The same is applied hereinafter.

The cam drive portion 81B of the cam mechanism 59B is a wedge plate 81Ba (81Bb) and has a single inclined surface 81Baa (81Bba). The inclined surface 81Baa (81Bba) is opposed to the inclined surface 79Ba (79Bb) of the cam portion 79B of the cam structure 83B.

Therefore, as in the case of the above cam follower 81a (81b), when the driving force output from the pressing drive motor is transmitted to the wedge plate 81Ba (81Bb), the force produced by the linear movement by the direct motion member can be converted to the pressing force and transmitted to the polishing plate 5 in the axial movement direction by the cam action between the inclined surface 81Baa (81Bba) and the inclined surface 79Ba (79Bb). The similar operational effect as the above described embodiment can be obtained.

FIG. 30B and FIG. 30C partially show cam structures 83C, 83D of a cam mechanism 59C, 59D similar to FIG. 30A.

In the cam structure 83C in FIG. 30B, an inclined surface 79Ca (79Cb) of the cam portion 79C is formed by two inclined surfaces 79Caa (79Cab) and 79Cba (79Cbb).

Therefore, the inclined surface 79Caa (79Cba) which has a relatively large inclined angle enables the cam structure 83C to move upward rapidly, and the inclined surface 79Cab (79Cbb) which has a relatively small inclined angle enables the large pressing force to be transmitted by a slight movement.

With such a stepwise transmission of the pressing force, the pressing force can be transmitted rapidly and accurately.

In a case of the cam portion 79C, the inclined surface 79Ca (79Cb) is formed by two inclined surfaces 79Caa (79Cab) and 79Cba (79Cbb). However, the inclined surface 79Ca (79Cb) may be configured to have three or more inclined surfaces.

In the cam structure 83D in FIG. 30C, the inclined surface 79Da (79db) of a cam portion 79D is formed into a curved surface.

With the curved inclined surface 79Da (79*db*), the cam structure 83D enables a continuous transmission action in contrast to the stepwise transmission action by the cam structure 83C in FIG. 30B.

Embodiment 2

Figure 31:
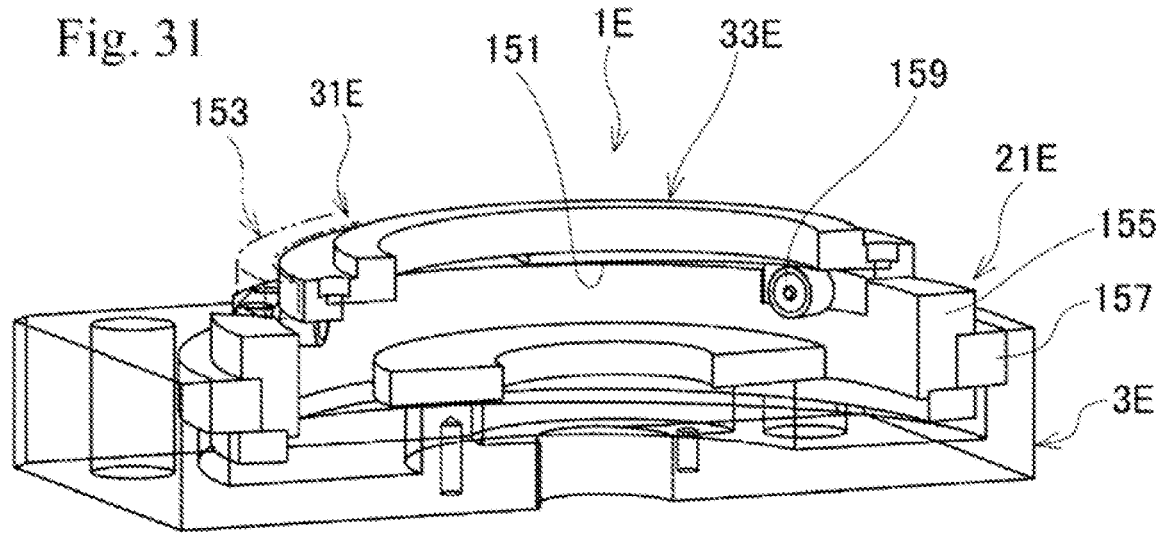
FIG. 31 is a cross-sectional perspective view schematically and partly showing the end face polishing device for optical fiber ferrule (Embodiment 2).

FIG. 31 is a cross-sectional perspective view schematically and partly showing the end face polishing device for optical fiber ferrule in Embodiment 2. The basic configuration is similar to Embodiment 1, and the same reference numerals are denoted and the overlapped explanations are omitted. With respect to the configurations and reference numerals which are not shown in FIG. 31, refer to FIG. 9 and the like explained in Embodiment 1.

An end face polishing device 1E of FIG. 31 is configured to directly transmit a rotational driving force to the thrust ring 33E as a pressing force by the end face cam 151.

The polishing plate guide supporting portion 31E has the thrust ring 33E and the guide ring 153.

The thrust ring 33E is configured to serve as a part of the pressing force transmission mechanism 21E for transmitting the pressing force while allowing the polishing plate 5 to be driven for the polishing as described above. Consequently, the thrust ring 33E supports the outer peripheral portion of the bottom surface of the polishing plate 5 by a plane surface as described above. The concept of the support structure is the same as the above described embodiment.

The guide ring 153 has a ball retainer and movably supports the thrust ring 33E on the base plate 3E. The support structure is different from the above described embodiment in its method, however, the concept is similar to the above described embodiment in that the pressing force is transmitted in the axial movement direction.

Therefore, the thrust ring 33E is capable of moving in the axial movement direction of the polishing plate 5 so as to transmit the pressing force to the polishing plate 5 arranged above the thrust ring 33E while the thrust ring 33E is supported by the guide ring 153.

On the other hand, the pressing force transmission mechanism 21E in this variation has a driving ring 155.

The driving ring 155 is arranged at the bottom part of the thrust ring 33E so as to be opposed to the thrust ring 33E. The driving ring 155 is configured to be driven to rotate around the rotational shaft extending along the axial movement direction of the polishing plate by the driving force output from the pressing drive motor which is a pressing drive source.

The pressing drive motor is interlocked and bonded to the bottom part or the like of the driving ring 155 by a gear, for example. Since the pressing drive motor is interlocked and bonded, the driving ring 155 can be driven to rotate by the driving force output from the rotational drive pressing drive motor. The driving ring 155 is supported on the base plate 3E by a bearing portion 157 and the driving ring 155 is capable of rotating around the shaft.

The driving ring 155 has supporting rollers 159 supported by the driving ring 155. The supporting rollers 159 are supported at equal intervals in the circumferential direction. The supporting rollers 159 support the bottom surface of the thrust ring 33E.

At the bottom surface of the thrust ring 33E, the end face cam 151 is provided and the supporting rollers 159 abut with the end face cam 151.

Therefore, when the driving ring 155 is rotated by the driving force output from the pressing drive motor, the circumferential position of the supporting roller 159 is changed with respect to the end face cam 151 of the thrust ring 33E. The end face cam 151 performs the cam action by the circumferential position of the supporting roller 159, and the thrust ring 33E transmits the pressing force in the axial movement direction of the polishing plate.

With this transmission of the pressing force, the polishing plate is pressed, and the polishing pressure is applied between the polishing plate and end face of the optical fiber ferrule.

Therefore, also in this variation, the operational effect similar to the above described Embodiment 1 can be obtained.

Furthermore, it is possible to transmit the driving force of the pressing drive motor directly to the thrust ring 33E. Therefore, a simple structure having a short transmission path and a smaller number of parts can be realized.

It is also possible to form the end face cam on the driving ring 155 and support the supporting roller 159 on the thrust ring 33E side.

Alternatively, it is also possible to fix the driving ring 155 to the base plate 3E, use the supporting rollers 159 as a plate cam, and form an inclined surface or a plane surface which abuts with the circumferential surface of the plate cam on the bottom surface of the thrust ring 33E. The pressing drive motor and the plate cam can be interlocked by engaging a gear ring which is driven to rotate by the pressing drive motor with a pinion gear attached to each shaft of the plate cam. It is also possible to attach a small sized pressing drive motor to each rotational shaft of the plate cam.

Moreover, a pressurization plate may be fixed to the bottom end of the splined shaft 35 instead of the cam structure of Embodiment 1. In such a case, an end face cam is formed on the bottom surface of the pressurization plate and the structures such as the driving ring 155 and the supporting roller 159 are combined with the pressurization plate having the end face cam.

Embodiment 3

Figure 32:
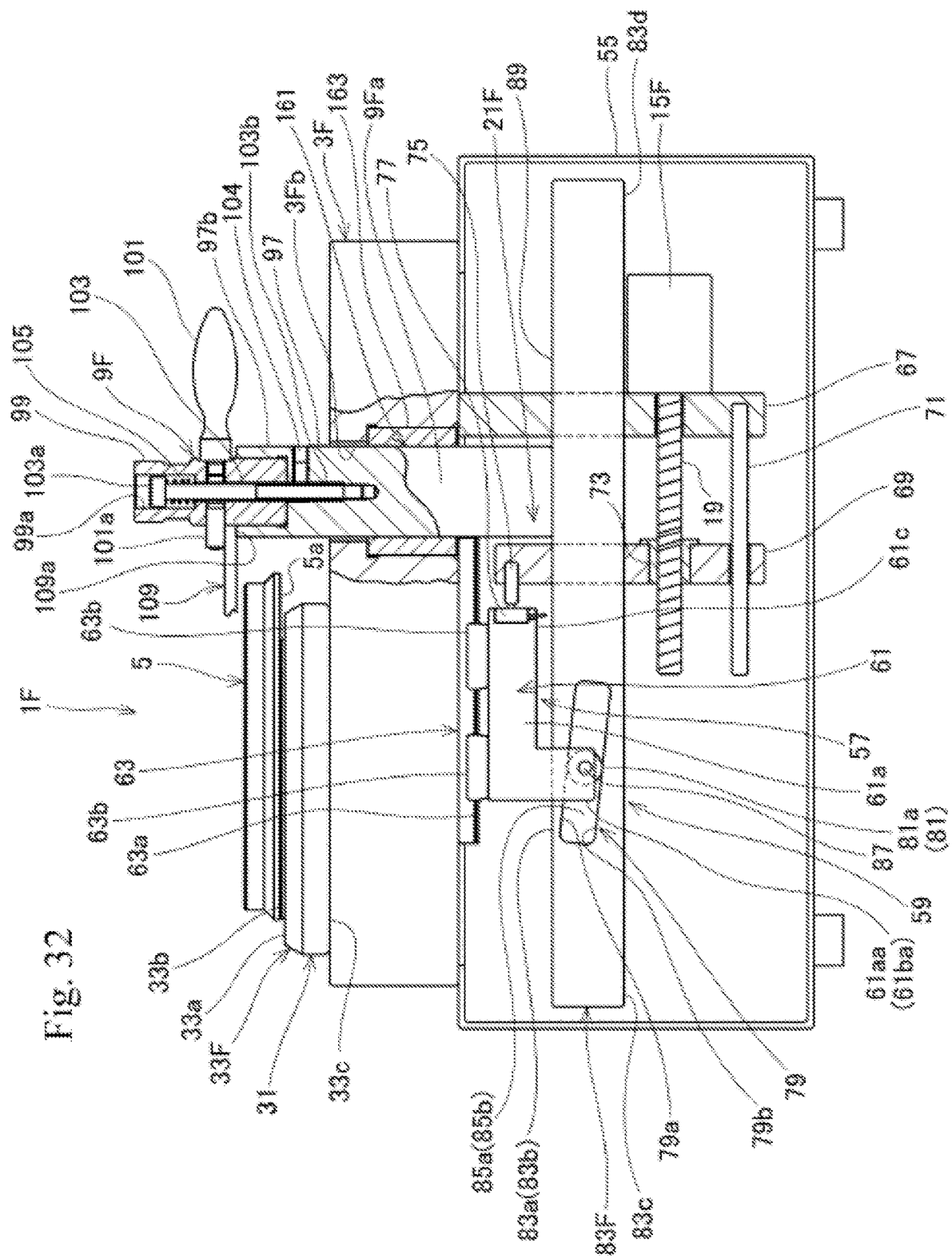
FIG. 32 is a side view schematically showing a part (holding portion guiding support part and pressing force transmission mechanism) of the end face polishing device for optical fiber ferrule, shown partially in cross-section (Embodiment 3).

FIG. 32 is a side view schematically showing a part (holding portion guiding support part and pressing force transmission mechanism) of the end face polishing device for optical fiber ferrule, shown partially in cross-section in Embodiment 3. The basic configuration is similar to that of Embodiment 1, and the same reference numerals are denoted and the overlapped explanations are omitted.

In the end face polishing device 1F of the present embodiment, posts 9F are operable in the top-and-bottom direction with respect to the polishing plate 5 to adjust the polishing pressure.

Therefore, in the end face polishing device 1F of the present embodiment, the thrust ring 33F is positioned on the base plate 3F so as not to be able to change the position vertically.

The end face polishing device 1F of the present embodiment has a holding portion guiding support part 161. The holding portion guiding support part 161 is configured to allow the posts 9F to move with respect to the polishing plate 5 so as to apply the polishing pressure. Consequently, in the end face polishing device 1F, the posts 9F to which the holder plate 109 of the polishing jig 107 is attached are movably supported on the base plate 3F. The basic structure of the posts 9F are similar to that of Embodiment 1, and the end face polishing device 1F has a plurality of posts 9F, for example, four posts 9F.

In each of the posts 9F of the present embodiment, the holder plate 109 of the polishing jig 107 is attached to an upper end portion of one end of the post 9F so that the post 9F serves as a part of the pressing force transmission mechanism 21F to transmit the pressing force in the axial movement direction of the post 9F from an axial movement guide 9Fa located at the other end.

In other words, at the bottom end portion of the post 9F, the axial movement guide 9Fa is formed so as to extend straight downward. The axial movement guide 9Fa of the post 9F is formed integrally and coaxially with the base shaft 97 so as to have the same diameter. Note that the axial movement guide 9Fa may be formed thicker or thinner than the base shaft 97 as long as it is possible to move the post 9F in the axial direction. Also, in the present embodiment, the axial movement guide 9Fa and the post 9F are joined by means of the integral formation. However, it is also possible to form the post 9F and the axial movement guide 9Fa separately and screw the post 9F in the axial movement guide 9Fa for engage them. In case of the screwed engagement, the specification of the device may be changed by selecting the length of the axial movement guide 9Fa.

In the axial movement guide 9Fa, the post 9F is supported in a fitting hole 3Fb of the base plate 3F via a ball bush 163. With the above described support, the axial movement guide 9Fa is configured to be movably supported on the base plate 3F to transmit the pressing force. Since the axial movement guide 9Fa is movably supported, it is possible to operate the post 9F vertically with respect to the polishing plate 5 in the top-and-bottom direction. The other end of the post 9F, which is a flat end face of the axial movement guide 9Fa, is joined and fixed to the upward coupling face 89 of a cam structure 83F in the housing 55. The fixing is made by a bolt as described in Embodiment 1.

Since the axial movement guide 9Fa is joined and fixed as such, it is possible to transmit the force generated by the linear movement of the direct motion member 61 in the axial movement direction of the post 9F as the pressing force by the cam action of the cam mechanism 59.

At the upper part of the post 9F, the holder plate 109 of the polishing jig 107 is arranged as a member of the pressing force transmission mechanism 21F. The holder plate 109 is positioned upper side of the base plate 3F. As described above, the edge 110 of the holder plate 109 (FIG. 16) is mounted on the flat upward coupling face provided on the fitting cylindrical portion 97b of each of four posts 9F, and the edge 110 of the holder plate 109 is fixed by pressurization pin portion 101a. The holder plate 109 has the flat downward coupling face 109a extending along the front-and-back direction of the linear movement of the direct motion member 61. With the coupling face 109a, the holder plate 109 is fixed to the flat upward coupling face provided on the fitting cylindrical portion 97b.

Due to the above described fixing, the axial movement guides 9Fa are structured to be indirectly fixed to the downward coupling face 109a of the holder plate 109 via the post 9F.

In the above described structure, when the pressurization spring 105 is set to be stronger, or the pressurization spring 105 is omitted and the lever support shaft 99 is completely fixed to the base shaft 97 to take a form of a complete fixing, the cam structure 83F, the axial movement guide 9Fa and the holder plate 109 are locked and form a linkage.

Note that the post 9F and the holder plate 109 are not fastened by a bolt. Even in the above described case, when the pressing force is transmitted to the MT ferrule 117 via the holder plate 109, the holder plate 109 does not move relatively to the posts 9F. In this meaning, the locked linkage is formed.

In the above described case, the cam structure 83F forms the pressing bottom member of the pressing force transmission mechanism 21F in this embodiment. That is, the pressing force transmission mechanism 21F is configured to have the cam structure 83F on the lower side of the base plate 3F to transmit the pressing force in the axial movement direction.

Also, the holder plate 109 forms the pressing upper member of the pressing force transmission mechanism 21F in this embodiment. In other words, the pressing force transmission mechanism 21F is configured to have the holder plate 109 on the upper side of the base plate 3F to transmit the pressing force in the axial movement direction.

The axial movement guide 9Fa may be joined to the cam structure 83 directly as described in the embodiment and the axial movement guide 9Fa may also be joined indirectly via other members. Another configuration is possible in which a separate pressing bottom member other than the cam structure 83 is joined to the axial movement guide 9Fa to form a locked linkage, and these pressing bottom members are joined to the cam structure 83 in the axial movement direction.

The structure of the pressing force transmission mechanism 21F is similar to that of Embodiment 1 within the range from the pressing drive motor 15F to the cam structure 83F. Thus, the same reference numerals are denoted to the direct motion mechanism 57 and the cam mechanism 59 and the overlapped explanations are omitted. Various modifications may be adopted in this embodiment as long as they are consistent with Embodiment 1.

As described in Embodiment 1, when the driving force is output from the pressing drive motor 15F, the driving force is converted to the pressing force and the pressing force is transmitted to the cam structure 83F via the direct motion mechanism 57 and the cam mechanism 59 in this embodiment.

In this embodiment, the cam followers 81a, 81b press down the inclined surfaces 79b while the cam followers 81a, 81b are rolled toward the front by the linear movement of the direct motion member 61. When the direct motion member 61 is moved linearly toward the back, the cam follower 81a (81b) push up the inclined surfaces 79a while the cam follower 81a (81b) are rolled.

Therefore, the polishing pressure is applied in such a way that the cam structure 83F is moved in the axial movement direction of the post 9F by the cam action between the cam follower 81a (81b) and the lower inclined surface 79b, and the pressing force is transmitted while the axial movement guide 9Fa of the post 9F is drawn downward.

Moreover, since the flat ends of four axial movement guides 9Fa are bonded and fixed to the flat upward coupling face 89, they are prevented or suppressed from being relatively shifted or wobbled.

Consequently, the pressing force which is converted and transmitted by the cam mechanism 59 can be surely transmitted from the cam structure 83F to the posts 9F in the top-and-bottom direction with good balance via the four axial movement guide 9Fa.

Furthermore, due to the locked linkage formed through the cam structure 83F, the axial movement guide 9Fa, and the holder plate 109, the load received by the cam 83F in the top-and-bottom direction is transmitted from the coupling face 89 to the holder plate 109 with rigidity via the four axial movement guide 9Fa and the post 9F.

Due to the transmission of the pressing force, the posts 9F are surely moved downward.

When the posts 9F are moved downward, the tip of the MT ferrule 117 supported by the polishing jig 107 is pressed from upward onto the polishing film 27 of the polishing plate 5 which is positioned at a predetermined height. This pressing is similar to Embodiment 1, and a predetermined polishing pressure is applied so that the polishing film 27 is pressed in by approximately 0.1 mm, for example.

In this case, as described in Embodiment 1, the detection signal of the pressing force detected by the load cell 77 is input to the controller 22 (shown in FIG. 2), and the controller 22 calculates the current polishing pressure from the detection signal. Based on the above described calculation, the pressing drive motor 15F is feedback controlled as described in Embodiment 1. As a result, the polishing pressure can be maintained and adjusted.

Therefore, in this embodiment, it is not necessary to movably support the thrust ring 33F. Thus, the structure can be simplified.

In addition, other operational effects similar to Embodiment 1 can be achieved.

In this embodiment, it is possible to provide a rod separately from the post 9F to transmit the pressing force, and interlock and join the bottom end of rod to the cam structure 83F, and interlock and join the top end side of the rod to the post 9F. In this case, the axial movement guide 9Fa of the post 9F is not interlocked and joined to the cam structure 83F so as to be freely moved. The rod serves as a part of the locked linkage.

Embodiment 4

Figure 33:
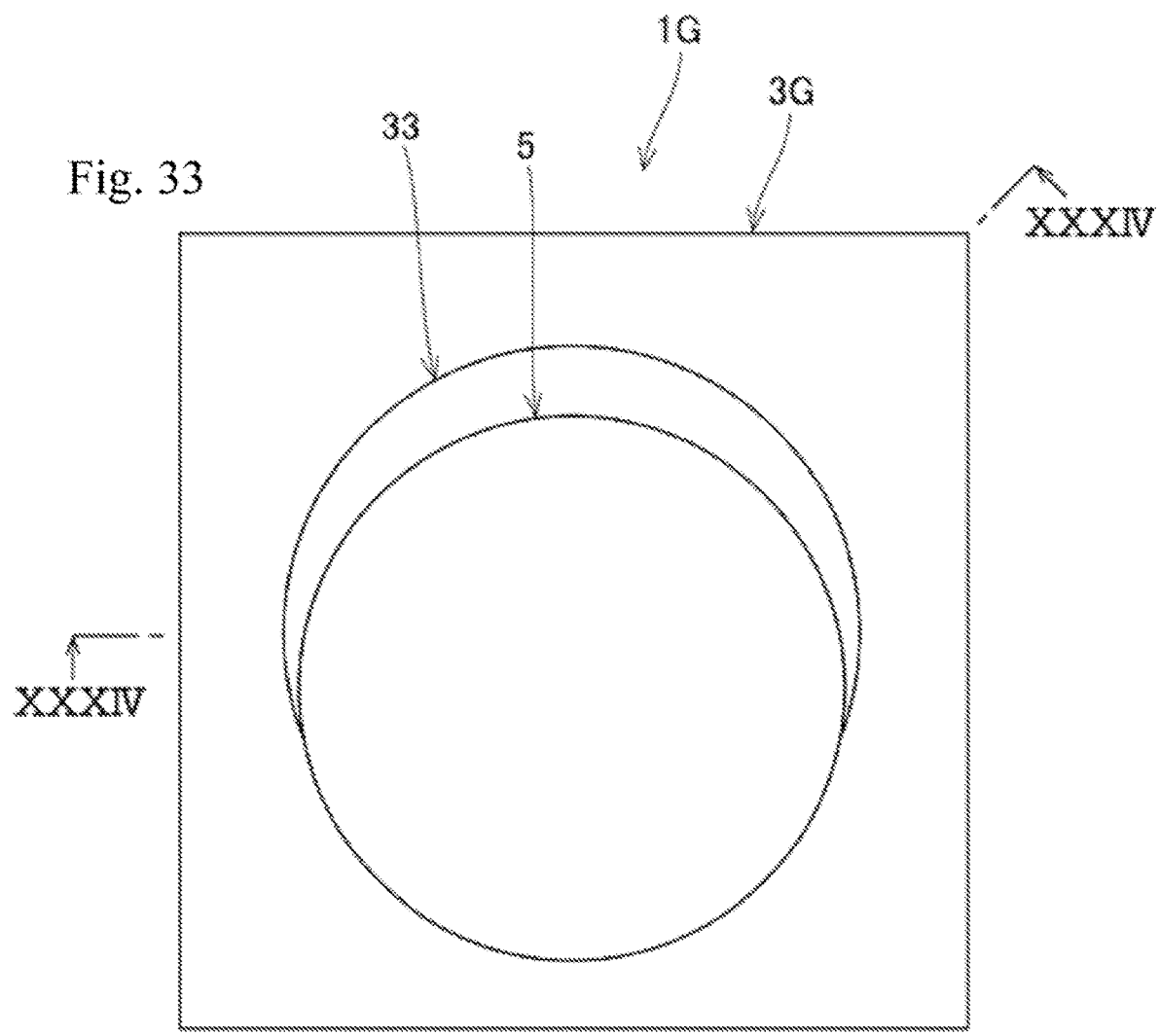
FIG. 33 is a plan view schematically and partly showing the end face polishing device for optical fiber ferrule (Embodiment 4).
Figure 34:
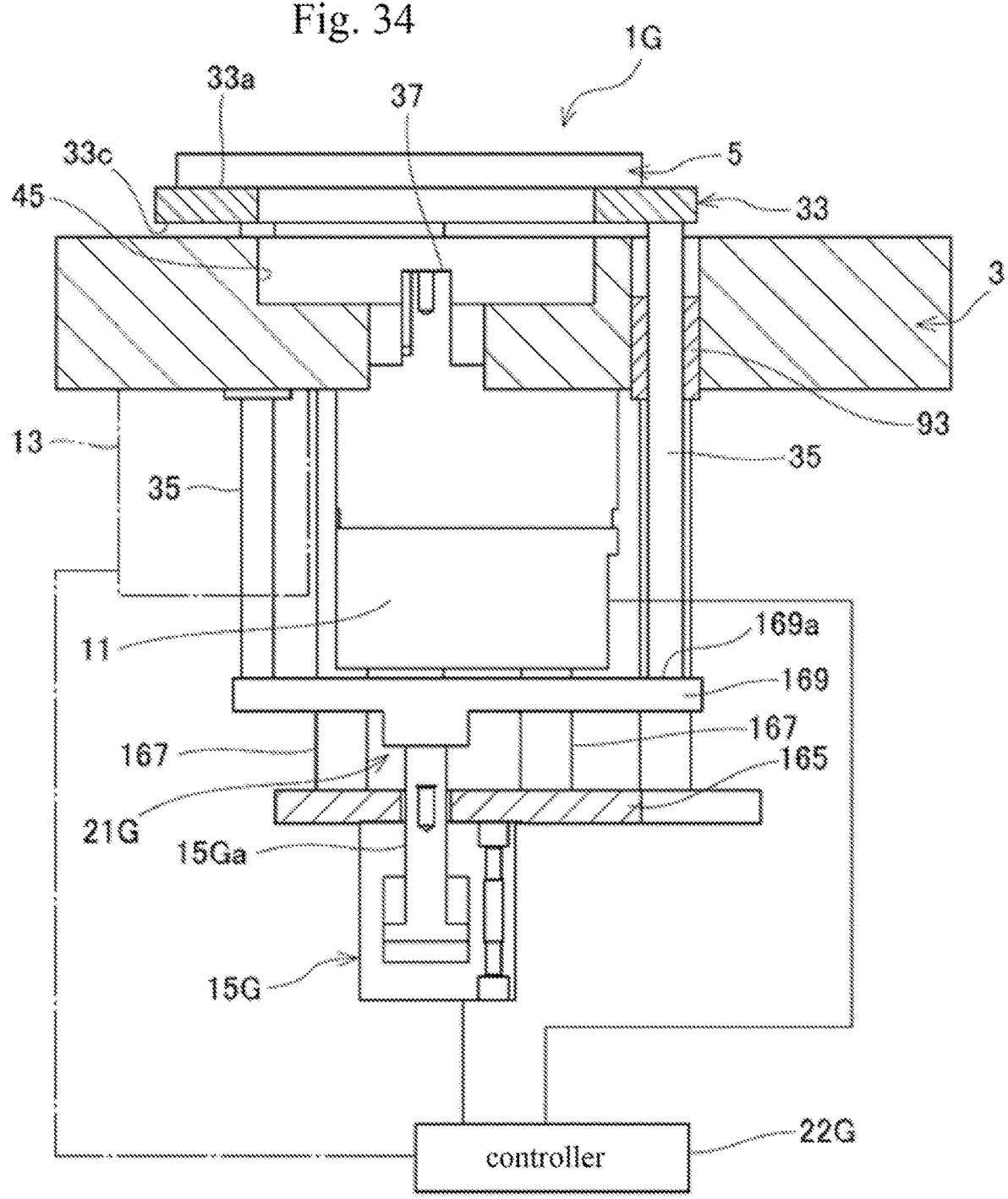
FIG. 34 is a cross-sectional view schematically and partly showing the end face polishing device for optical fiber ferrule taken along a XXXIV-XXXIV line shown in FIG. 33 (Embodiment 4).
Figure 35:
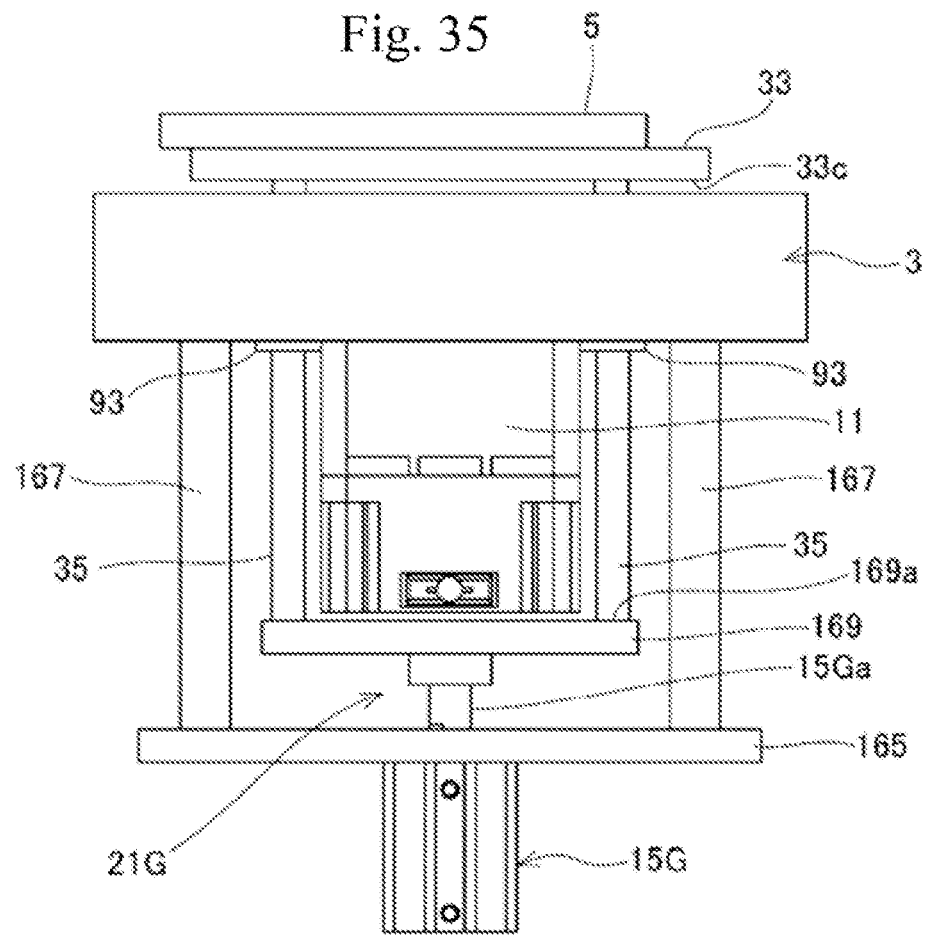
FIG. 35 is a side view schematically and partly showing the end face polishing device for optical fiber ferrule (Embodiment 4).

FIG. 33 to FIG. 35 relate to Embodiment 4. FIG. 33 is a plan view schematically and partly showing the end face polishing device for optical fiber ferrule. FIG. 34 is a cross-sectional view schematically and partly showing the end face polishing device for optical fiber ferrule taken along a XXXIV-XXXIV line shown in FIG. 33. FIG. 35 is a side view schematically and partly showing the end face polishing device for the optical fiber ferrule. Note that the basic configuration is similar to that of Embodiment 1, and the same reference numerals are denoted and the overlapped explanations are omitted. With respect to the configuration and reference numerals not shown in FIG. 33 to FIG. 35, refer to FIG. 9 and the like of Embodiment 1.

As shown in FIG. 33 to FIG. 35, an end face polishing device 1G in this embodiment has an air cylinder 15G as a pressing drive source. The pressing force transmission mechanism 21G is configured to directly transmit the pressing force by aligning the output direction of the air cylinder 15G with the axial movement direction of the polishing plate 5. Therefore, the direct motion mechanism 57 and the cam mechanism 59 described in Embodiment 1 are omitted in the present embodiment.

The air cylinder 15G has a structure in which an internal-pressure is controlled by an electropneumatic regulator. The electropneumatic regulator calculates the polishing pressure from the internal-pressure and a piston diameter of the air cylinder 15G The electropneumatic regulator is connected to the controller 22G The controller 22G feedback controls the electropneumatic regulator so that the polishing pressure calculated by the electropneumatic regulator is adjusted to be the predetermined the polishing pressure.

The air cylinder 15G is attached to the bottom surface of a cylinder mounting plate 165. The cylinder mounting plate 165 is attached to the bottom surface of the base plate 3G by four columns 167, for example.

A piston rod 15Ga of the air cylinder 15G is joined to a pressurization plate 169. The pressurization plate 169 is a part of the pressing force transmission mechanism 21G and the pressurization plate 169 is formed into a circular shape as seen from a plan view, for example. The pressurization plate 169 has flat coupling face 169a on the top surface. In the outer peripheral portion of the pressurization plate 169, the coupling face 169a is joined and fixed to the flat bottom end surface of the splined shaft 35 by a bolt and the like. The joining by the bolt is the same as Embodiment 1.

Similar to Embodiment 1, four splined shafts 35 are arranged at equal intervals on the outer peripheral portion of the thrust ring 33 in the circumferential direction, for example. The shaft center of the piston rod 15Ga is arranged to be aligned with the center of the thrust ring 33.

With the above described arrangement, the driving force from the air cylinder 15G is configured to be transmitted to the thrust ring 33 evenly and in good balance.

As shown in FIG. 34 and FIG. 35, the bottom ends of the four splined shafts 35 are abutted with the flat coupling face 169a of the pressurization plate 169 and are fastened and fixed as described above.

It is similar to Embodiment 1 that a load transmission from the coupling face 169a to the bottom ends of the four splined shafts 35 is achieved under substantially the same conditions by the above described fixing.

Further, it is also the same as Embodiment 1 that the top ends of the four splined shafts 35 and the flat coupling face 33c of the thrust ring 33 are fastened and fixed.

With the above described fixing, the four splined shafts 35, the pressurization plate 169, and the thrust ring 33 form a locked linkage. Due to the above described locked linkage, the load received by the pressurization plate 169 in the top-and-bottom direction can be transmitted from the coupling face 169a to the polishing plate 5 with rigidity via the four splined shafts 35 and the thrust ring 33.

In this case, the pressurization plate 169 forms the pressing bottom member of the pressing force transmission mechanism 21G in this embodiment. That means, as described above, the pressing force transmission mechanism 21G has the pressurization plate 169 on the lower side of the base plate 3. The pressurization plate 169 transmits the pressing force in the axial movement direction.

The thrust ring 33 forms a pressing upper member of the pressing force transmission mechanism 21G in this embodiment. In other words, the pressing force transmission mechanism 21F is configured to have the holder plate 109 on the upper side of the base plate 3F to transmit the pressing force in the axial movement direction.

The splined shaft 35 may be directly joined to the pressurization plate 169 and the thrust ring 33 as described in the embodiments, and the splined shaft 35 may be indirectly joined via other members. It is also possible to join a pressing bottom member and a pressing upper member, which are formed separately from the pressurization plate 169 and the thrust ring 33, to the splined shaft 35 to form a locked linkage, and join the pressing bottom member and the pressing upper member to the pressurization plate 169 and the thrust ring 33 in the axial movement direction.

Also, in this embodiment, similar to Embodiment 1, the splined shafts 35 and the thrust ring 33 serve as a part of the pressing force transmission mechanism 21G in addition to serve as the polishing plate guide supporting portion 31.

In this embodiment, in response to the output from the air cylinder 15Q the piston rod 15Ga projects upward, and the driving force is transmitted to the pressurization plate 169.

The driving force transmitted to the pressurization plate 169 is equally transmitted to the four splined shafts 35 as the pressing force. The four splined shafts 35 move upward against the base plate 3, and equally press the outer peripheral portion of the thrust ring 33 at four points.

When the pressing force is transmitted to the thrust ring 33, the polishing plate 5 is pushed upward, and the polishing pressure is applied as in the case of Embodiment 1.

This polishing pressure is calculated by the electropneumatic regulator, and the controller 22G sends electric signals to the electropneumatic regulator so that the detected polishing pressure is adjusted to the predetermined the polishing pressure. The electropneumatic regulator controls the pressure of the air cylinder 15G to control the axial movement of the piston rod 15Ga.

When the piston rod 15Ga is controlled to move downward, the polishing plate 5 is controlled to move downward by the converse movement of the above described movement. Thus, the polishing pressure decreases or disappears.

Accordingly, the polishing pressure is precisely controlled.

Therefore, in this embodiment, it is possible to omit the direct motion mechanism, the cam mechanism and the like. Thus, a compact device can be realized.

In addition, other operational effects similar to Embodiment 1 can be achieved.

Also, in this embodiment, it is possible to directly or indirectly detect the polishing pressure by the load cell, and control the electropneumatic regulator by the detection signals as in the case of Embodiment 1.

Alternatively, the pressing drive source may be replaced by the air cylinder in Embodiments 1 to 3. In this case, the air cylinder may be horizontally placed in accordance with the output direction.

Embodiment 5

Figure 36:
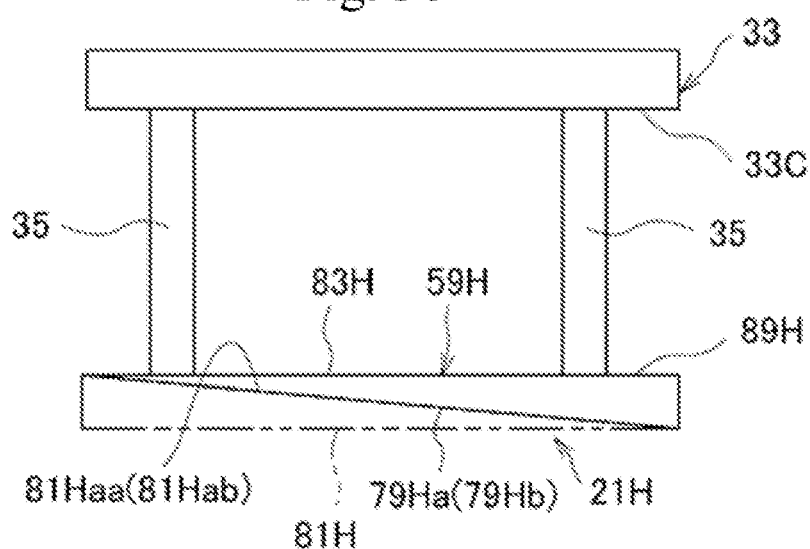
FIG. 36 is a conceptual diagram of a locked linkage in an application to the polishing plate (Embodiment 5).
Figure 37:
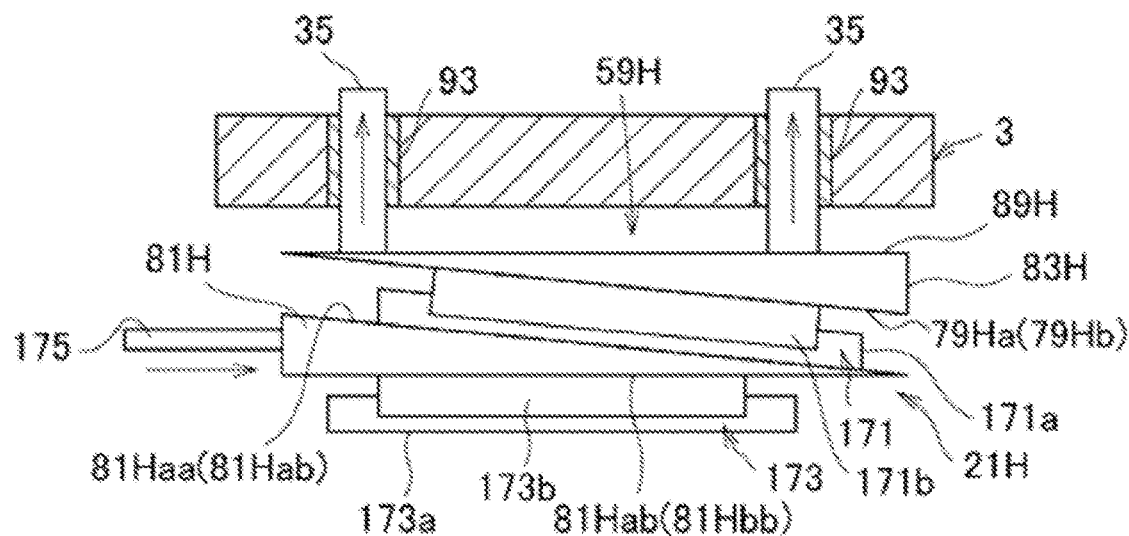
FIG. 37 is a conceptual diagram of a wedge plate and its surrounding structure used for the locked linkage (Embodiment 5).
Figure 38:
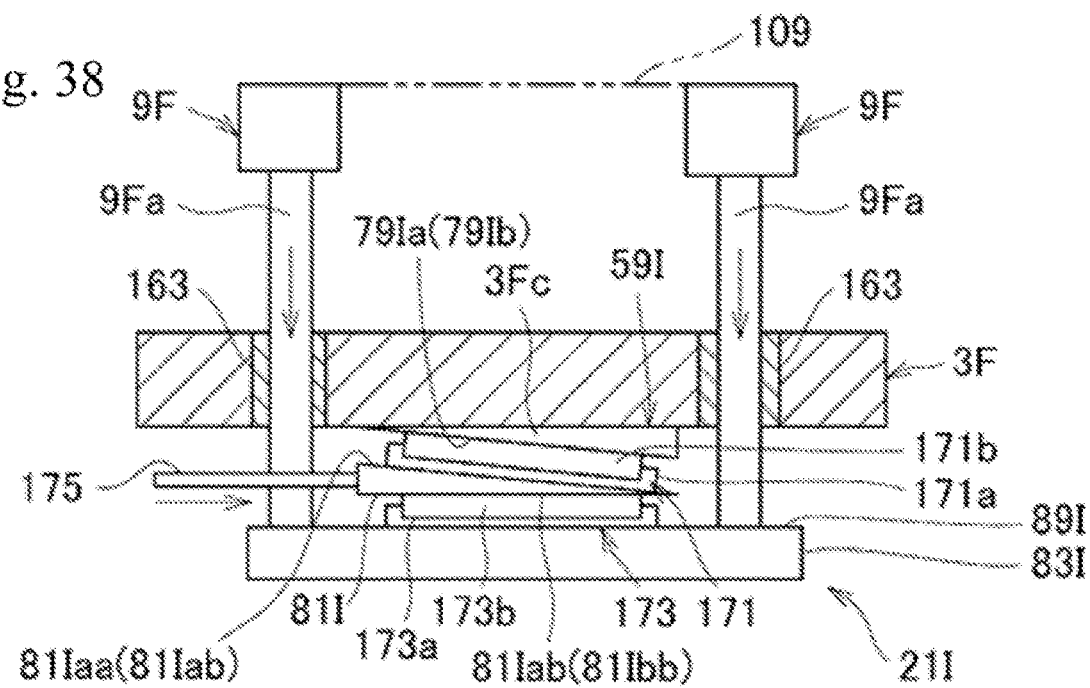
FIG. 38 is a conceptual diagram of the wedge plate and its surrounding structure used for the locked linkage in an application to the post (Embodiment 5).

FIG. 36 to FIG. 38 show a structure of using a wedge plate. FIG. 36 is a conceptual diagram of a locked linkage in an application to the polishing plate. FIG. 37 is a conceptual diagram of a wedge plate and its surrounding structure used for the locked linkage. FIG. 38 is a conceptual diagram of the wedge plate and its surrounding structure used for the locked linkage showing in an application to the post. Note that the basic configuration is similar to that of Embodiment 1 or Embodiment 3, and the same reference numerals are denoted and the overlapped explanations are omitted. With respect to the configuration and reference numerals not shown in FIG. 36 to FIG. 38, refer to FIG. 9, FIG. 32 and the like of Embodiment 1 and Embodiment 3.

In the end face polishing device for optical fiber ferrule shown in FIG. 36, the thrust ring 33 is included in the pressing force transmission mechanism 21H.

As shown in FIG. 36, the pressing force transmission mechanism 21H includes a wedge mechanism 59H. The specific structure of the wedge mechanism 59H will be explained later in the description of FIG. 38. Here, the wedge mechanism 59H will be conceptually explained.

The wedge mechanism 59H includes first and second wedge plates 83H, 81H. The first and second wedge plates 83H, 81H convert a force produced by a linear movement to a pressing force and transmit the pressing force in the axial movement direction of the polishing plate 5 by a wedge effect. The first and second wedge plates 83H, 81H are formed into a frame shape, for example, similar to the cam structure 83 in Embodiment 1.

The bottom end of the splined shaft 35, which is an axial movement guide, is joined and fixed to a flat coupling face 89H of the first wedge plate 83H in a similar structure to Embodiment 1. The first wedge plate 83H has a straight linear inclined surface 79Ha (79Hb) on left and right sides. The reference numeral in the parenthesis indicates elements on the right side which is not shown in the figure. The same is applied hereinafter. The top end of the splined shaft 35 is joined and fixed to the flat coupling face 33c of the thrust ring 33 in a similar structure to Embodiment 1.

With the above described fixing, the four splined shafts 35, the first wedge plate 83H, and the thrust ring 33 form a locked linkage. Due to the above described locked linkage, the load received by the first wedge plate 83H in the top-and-bottom direction can be transmitted from the coupling face 89H to the polishing plate 5 with rigidity via the four splined shafts 35 and thrust ring 33.

In this case, the first wedge plate 83H forms the pressing bottom member of the pressing force transmission mechanism 21H in this embodiment. That means, as described above, the pressing force transmission mechanism 21H has the first wedge plate 83H on the lower side of the base plate 3 to transmit the pressing force in the axial movement direction.

The thrust ring 33 forms a pressing upper member of the pressing force transmission mechanism 21H in this embodiment. That means, as described above, the pressing force transmission mechanism 21H has the thrust ring 33 on the upper side of the base plate 3 to transmit the pressing force in the axial movement direction.

The splined shaft 35 may be directly joined to the first wedge plate 83H and the thrust ring 33 as described in the embodiments, and the splined shaft 35 may be indirectly joined via other members. It is also possible to join a pressing bottom member and a pressing upper member, which are formed separately from the first wedge plate 83H and the thrust ring 33, to the splined shaft 35 to form a locked linkage, and join the pressing bottom member and the pressing upper member to the first wedge plate 83H and the thrust ring 33 in the axial movement direction.

The second wedge plate 81H converts and transmits the force by its wedge effect against the first wedge plate 83H by the driving force output from the pressing drive source such as the pressing drive motor and the air cylinder. The second wedge plate 81H is formed into a substantially same shape as the first wedge plate 83H.

The second wedge plate 81H has an inclined surface 81Haa (81Hba). The inclined surface 81Haa (81Hba) is opposed to the inclined surface 79Ha (79Hb) of the first wedge plate 83H.

Therefore, when the driving force output from the pressing drive motor or the air cylinder is transmitted to the second wedge plate 81H, the force produced by the linear movement of the second wedge plate 81H can be transmitted as the pressing force in the axial movement direction of the polishing plate 5 via the first wedge plate 83H by the wedge effect between the inclined surface 81Haa (81Hba) and the inclined surface 79Ha (79Hb). Thus, the operational effect similar to the above-described embodiments can be obtained.

In the wedge plate and the surrounding structure shown in FIG. 37, the first and second wedge plates 83H, 81H are respectively supported by first and second linear guides 171, 173. The first linear guide 171 is formed by a guide rail 171a and a block 171b, and the second linear guide 173 is formed by a guide rail 173a and a block 173b.

The guide rail 171a of the first linear guide 171 is fixed to each of inclined surfaces 81Haa, (81Hba) of the second wedge plate 81.

The block 171b of the first linear guide 171 is fixed to each of the inclined surfaces 79Ha, (79Hb) of the first wedge plate 83H.

The block 173b of the second linear guide 173 is fixed to each of the flat bottom surfaces 81Hab, (81Hbb) of the second wedge plate 81H.

The guide rail 173a of the second linear guide 173 is attached to a fixed side such as a base plate 3 side via a bracket and the like.

The second wedge plate 81H is joined to a direct motion member having a similar structure to the direct motion member 61 in Embodiment 1 or joined to the piston rod of the air cylinder via a connection member 175.

Therefore, the driving force output from the pressing drive motor or the air cylinder is transmitted to the second wedge plate 81H and the second wedge plate 81H is moved. The second wedge plate 81H is moved smoothly by the block 173b running on the guide rail 173a of the second linear guide 173.

When the second wedge plate 81H is moved, the guide rail 171a of the first linear guide 171 is integrally moved.

The block 171b of the first linear guide 171 is not moved in the linear movement direction of the second wedge plate 81H. Therefore, in response to the movement of the guide rail 171a, the wedge effect occurs, and the first wedge plate 83H transmits the pressing force in a direction shown by an arrow in the splined shaft 35. The transmission of the pressing force causes the pressing force transmission mechanism 21H in FIG. 36 to function, for example.

The wedge mechanism 59H may be arranged upside down. In such arrangement, the first wedge plate 83H is joined to the fixed side, and the guide rail 173a of the second linear guide 173 is joined and fixed to the splined shaft 35. The wedge mechanism 59H may be formed into a unit, and the unit may be removably arranged between the splined shaft 35 and the base plate 3.

In the end face polishing device for optical fiber ferrule in FIG. 38, the holder plate 109 is included in a pressing force transmission mechanism 21I. The basic structure of a wedge mechanism 59I is similar to the wedge mechanism 59H in FIG. 37. Therefore, the same reference numerals are denoted to the corresponding components. For some reference numerals, "I" is denoted instead of "H", and the overlapped explanations are omitted.

In FIG. 38, the wedge mechanism 59I is used for a structure of moving the post 9F shown in FIG. 32 vertically in the top-and-bottom direction with respect to the polishing plate 5.

In this case, a first wedge plate 3Fc is fixed to a base plate 3F on the fixed side unlike the first wedge plate 83H in FIG. 37, and the first wedge plate 3Fc serves as a member on the fixed side. Consequently, the reference numeral of the first wedge plate 3Fc is changed from the reference numeral of the corresponding member.

The guide rail 173a of the second linear guide 173 is fixed to a transmission plate 83I. In this example, the transmission plate 83I corresponds to the cam structure 83 shown in FIG. 9 of Embodiment 1. Therefore, a flat upward coupling face 89I is formed on the transmission plate 83I.

The bottom end of the axial movement guide 9Fa is joined and fixed to the flat coupling face 89I of the first wedge plate 83I in a similar structure to Embodiment 1.

With the above described fixing, four axial movement guide 9Fa and the posts 9F, the transmission plate 83I, and the holder plate 109 form a locked linkage. In the above described locked linkage, when the second wedge plate 81I is driven, a load received by the first wedge plate 3Fc in the top-and-bottom direction is received by the base plate 3F. The load received by the base plate 3F is transmitted as a reaction force with rigidity via the wedge mechanism 59I to the coupling face 89I, the four axial movement guide 9Fa, the posts 9F and the holder plate 109.

In this case, the transmission plate 83I forms a pressing bottom member of the pressing force transmission mechanism 21I in this embodiment. That means, as described above, the pressing force transmission mechanism 21I has the transmission plate 83I on the lower side of the base plate 3F to transmit the pressing force in the axial movement direction.

In addition, the holder plate 109 forms a pressing upper member of the pressing force transmission mechanism 21I in this embodiment. That means, as described above, the pressing force transmission mechanism 21I has the holder plate 109 on the upper side of the base plate 3F to transmit the pressing force in the axial movement direction.

The axial movement guide 9Fa may be directly joined to the transmission plate 83I as described in the embodiments, and the axial movement guide 9Fa may be indirectly joined via other members.

The wedge mechanism 59I may be arranged upside down. In such arrangement, the first wedge plate 3Fc is joined and fixed to the transmission plate 83I, and the guide rail 173a of the second linear guide 173 is joined and fixed to the base plate 3F. The wedge mechanism 59I may be formed into a unit, and the unit may be removably arranged between the transmission plate 83I and the base plate 3F. Therefore, in this embodiment, it is possible to generate a large pressing load from a small driving force by the use of the wedge mechanisms 59H, 59I. This effect contributes to simplify the structure and realize a compact device.

Further, the operational effect similar to Embodiment 1 can be obtained.

DESCRIPTION OF THE REFERENCE NUMERALS 1, 1A, 1E, 1F, 1G: end face polishing device for optical fiber ferrule,
3, 3E, 3F: base plate (base portion),
5, 5F: polishing plate,
5c: bearing hole (bearing portion)
9: post (holding portion)
9F: post (holding portion, pressing force transmission mechanism),
9Fa: axial movement guide (holding portion guiding support part (pressing force transmission mechanism),
15: pressing drive motor (pressing drive source),
15G: air cylinder (pressing drive source),
21, 21A, 21G, 21H, 21I: pressing force transmission mechanism,
22, 22G: controller,
23: revolution drive shaft,
29: ball guide (bearing portion),
30: bearing portion,
33, 33E, 33F, 33G: thrust ring (polishing plate guide supporting portion, pressing force transmission mechanism, pressing upper member),
33c: downward coupling face,
35: splined shaft (axial movement guide, polishing plate guide supporting portion, pressing force transmission mechanism),
57: direct motion mechanism,
59, 59A, 59B: cam mechanism,
59H, 59I: wedge mechanism,
61: direct motion member,
63: linear motion guide,
77, 77A: load cell (sensor),
79, 79A, 79B, 79C, 79D: cam portion (cam mechanism),
79a, 79b, 79Aa, 79Ab, 79Ba, 79Bb, 79Ca, 79Cb, 79Da, 79db: inclined surface (cam mechanism),
81, 81A, 81B: cam drive portion (cam mechanism),
81a, 81b, 81Aa, 81Ab, 81Ba, 81Bb: cam follower (cam mechanism),
83, 83A, 83B, 83C, 83D, 83F: cam structure (cam mechanism, pressing bottom member),
81H, 81I: second wedge plate,
83H: first wedge plate (pressing bottom member),
83I: transmission plate (pressing bottom member),
89, 89A: upward coupling face,
107: polishing jig,
109 holder plate (pressing upper member)
109a: downward coupling face,
169: pressurization plate (pressing bottom member).

The invention claimed is:

1. An end face polishing device for optical fiber ferrule for polishing an end face of an optical fiber ferrule by applying a polishing pressure between a polishing plate driven by a polishing drive shaft and an optical fiber ferrule held by a holding portion, the end face polishing device for optical fiber ferrule comprising:
a bearing portion for allowing the polishing plate to rotate relatively around the polishing drive shaft and to move relatively to the polishing drive shaft in an axial direction;
a polishing plate guide supporting portion movable only in an axial movement direction of the polishing plate for movably supporting the polishing plate on a base portion to apply the polishing pressure to the holding portion by allowing the polishing plate to move in the axial direction;
a pressing drive source for outputting a driving force to apply the polishing pressure; and
a pressing force transmission mechanism for transmitting the driving force output from the pressing drive source as a pressing force in the axial movement direction of the polishing plate.

2. The end face polishing device for optical fiber ferrule according to claim 1, wherein
the polishing drive shaft includes a revolution drive shaft fitted in a center portion of the polishing plate to make the polishing plate revolve while allowing a self-rotation of the polishing plate, and
the bearing portion allows the polishing plate to rotate relatively around the revolution drive shaft and to move relatively to the revolution drive shaft in the axial direction.

3. The end face polishing device for optical fiber ferrule according to claim 1, wherein
the polishing plate guide supporting portion has a thrust ring and an axial movement guide,
the thrust ring supports an outer peripheral portion of a bottom surface of the polishing plate by a plane surface to serve as a part of the pressing force transmission mechanism for transmitting the pressing force while allowing the polishing plate to be driven, and
the axial movement guide is joined to the thrust ring at one end of the axial movement guide and movably supported by the base portion to serve as a part of the pressing force transmission mechanism for transmitting the pressing force from the other end of the axial movement guide.

4. The end face polishing device for optical fiber ferrule according to claim 3, wherein
the pressing force transmission mechanism includes a direct motion mechanism and a cam mechanism, the direct motion mechanism being supported by the base portion,
the direct motion mechanism includes:
a direct motion member which performs a linear movement in a direction crossing the axial movement direction by the transmitted pressing force; and
a linear motion guide for supporting the direct motion member on the base portion to allow the linear movement, and
the cam mechanism performs a cam action to convert and transmit a force generated by the linear movement of the direct motion member to the pressing force in the axial movement direction.

5. The end face polishing device for optical fiber ferrule according to claim 4, wherein
the cam mechanism includes a cam portion and a cam drive portion which perform the cam action,
the cam portion includes an inclined surface provided in a cam structure,
the cam structure is joined to the other end of the axial movement guide to convert and transmit the force generated by the linear movement of the direct motion member, and
the cam drive portion is supported by the direct motion member and abutted with the inclined surface to transmit the force generated by the linear movement of the direct motion member to the inclined surface.

6. The end face polishing device for optical fiber ferrule according to claim 3, wherein
the pressing force transmission mechanism includes a wedge mechanism which performs a wedge effect for transmitting a force generated by a linear movement as the pressing force in the axial movement direction.

7. The end face polishing device for optical fiber ferrule according to claim 3, wherein
the pressing force transmission mechanism has a pressing bottom member on a lower side of the base portion for transmitting the pressing force in the axial movement direction,
the pressing bottom member has a flat upward coupling face which extends in a front-and-back direction of the linear movement so as to cross the axial movement direction, and
the axial movement guides are fixed directly or indirectly to the upward coupling face.

8. The end face polishing device for optical fiber ferrule according to claim 7, wherein
the pressing force transmission mechanism has a pressing upper member on an upper side of the base portion for transmitting the pressing force in the axial movement direction,
the pressing upper member has a downward coupling face which extends in the front-and-back direction of the linear movement,
the axial movement guides are fixed directly or indirectly to the downward coupling face, and
the pressing bottom member, the axial movement guides and the pressing upper member form a locked linkage.

9. The end face polishing device for optical fiber ferrule according to claim 1, wherein
the polishing plate guide supporting portion has a thrust ring and a guide ring,
the thrust ring supports an outer peripheral portion of a bottom surface of the polishing plate by a plane surface to serve as a part of the pressing force transmission mechanism for transmitting the pressing force while allowing the polishing plate to be driven,
the guide ring movably supports the thrust ring on the base portion to transmit the pressing force in the axial movement direction,
the pressing force transmission mechanism has a driving ring on the base portion, the driving ring being arranged at a bottom part of the thrust ring so as to be opposed to the thrust ring, the driving ring being driven by the driving force to rotate around a rotational shaft extending along the axial movement direction, and
the thrust ring has an end face cam provided between the thrust ring and the driving ring to make the thrust ring move in the axial movement direction for transmitting the pressing force when the driving ring rotates.

10. The end face polishing device for optical fiber ferrule according to claim 1, wherein
the pressing drive source is a pressing drive motor or an air cylinder.

11. The end face polishing device for optical fiber ferrule according to claim 1, wherein,
the pressing drive source is an air cylinder, and
the pressing force transmission mechanism transmits the pressing force so that an output direction of the air cylinder coincides with the axial movement direction.

12. The end face polishing device for optical fiber ferrule according to claim 1, further comprising:
a sensor provided in the pressing force transmission mechanism, the sensor detecting the polishing pressure directly or indirectly,
a controller for controlling the pressing drive source to adjust the polishing pressure detected by the sensor to a predetermined polishing pressure.

13. An end face polishing device for optical fiber ferrule for polishing an end face of an optical fiber ferrule by applying a polishing pressure between a polishing plate driven by a polishing drive shaft and an optical fiber ferrule held by a holding portion, the end face polishing device for optical fiber ferrule comprising:
a bearing portion for allowing the polishing plate to rotate relatively around the polishing drive shaft and to move relatively to the polishing drive shaft in an axial direction;
a polishing plate guide supporting portion for movably supporting the polishing plate on a base portion to apply the polishing pressure to the holding portion by allowing the polishing plate to move in the axial direction;
a pressing drive source for outputting a driving force to apply the polishing pressure; and
a pressing force transmission mechanism for transmitting the driving force output from the pressing drive source as a pressing force in an axial movement direction of the polishing plate, wherein
a drive source to rotate the polishing drive shaft is fixed on the base portion.

14. An end face polishing device for optical fiber ferrule for polishing an end face of an optical fiber ferrule by applying a polishing pressure between a polishing plate driven by a polishing drive shaft and an optical fiber ferrule held by a holding portion, comprising:
- a holding portion guiding support part for movably supporting the holding portion on a base portion to apply the polishing pressure to the polishing plate by allowing the holding portion to move in an axial direction;
- a pressing drive source for outputting a driving force to apply the polishing pressure; and
- a pressing force transmission mechanism for transmitting the driving force output from the pressing drive source as the pressing force in an axial movement direction of the holding portion, wherein
- the holding portion guiding support part has axial movement guides,
- one end side of each of the axial movement guides is joined to a post for attaching a polishing jig used for fixing the optical fiber ferrule, and
- each of the axial movement guides is movably supported by the base portion to serve as a part of the pressing force transmission mechanism for transmitting the pressing force from the other end.

15. The end face polishing device for optical fiber ferrule according to claim 14, wherein
    the pressing force transmission mechanism includes a direct motion mechanism and a cam mechanism, the direct motion mechanism being supported by the base portion,
    the direct motion mechanism includes:
    - a direct motion member which performs a linear movement in a direction crossing the axial movement direction by the transmitted pressing force; and
    - a linear motion guide for supporting the direct motion member on the base portion to allow the linear movement; and
    the cam mechanism performs a cam action to convert and transmit a force generated by the linear movement of the direct motion member to a pressing force in the axial movement direction.

16. The end face polishing device for optical fiber ferrule according to claim 15, wherein
    the cam mechanism includes a cam portion and a cam drive portion which perform the cam action,
    the cam portion includes an inclined surface provided in a cam structure,
    the cam structure is joined to the other end of the axial movement guide to convert and transmit the force generated by the linear movement of the direct motion member, and
    the cam drive portion is supported by the direct motion member and abutted with the inclined surface to transmit the force generated by the linear movement of the direct motion member to the inclined surface.

* * * * *